(12) United States Patent
Bhansali et al.

(10) Patent No.: US 8,137,410 B2
(45) Date of Patent: Mar. 20, 2012

(54) ELECTRONIC DEVICE DISABLING SYSTEM AND METHOD

(75) Inventors: Apurva Mahendrakumar Bhansali, Austin, TX (US); Manoj Kumar Jain, Austin, TX (US); Shradha Dube, Austin, TX (US); Gayathri Rangarajan, Austin, TX (US); Mehul Ramjibhai Patel, Austin, TX (US); Rayesh Kashinath Raikar, Austin, TX (US); Kamal Mansukhlal Dhanani, Austin, TX (US); Ranjit Kapila, Austin, TX (US); Elza Abraham Varghese, Houston, TX (US); Thomas David Tucker, Austin, TX (US)

(73) Assignee: Softex Incorporated, Austin, TX (US)

(*) Notice: Subject to any disclaimer, the term of this patent is extended or adjusted under 35 U.S.C. 154(b) by 926 days.

(21) Appl. No.: 12/166,783

(22) Filed: Jul. 2, 2008

(65) Prior Publication Data

US 2008/0276326 A1 Nov. 6, 2008

Related U.S. Application Data

(62) Division of application No. 10/925,161, filed on Aug. 23, 2004, now Pat. No. 7,590,837.

(60) Provisional application No. 60/497,182, filed on Aug. 23, 2003.

(51) Int. Cl.
*G06F 1/26* (2006.01)

(52) U.S. Cl. ............ 726/35; 726/34; 379/37; 379/38; 379/39; 379/40; 379/41; 379/42; 379/43; 379/44; 379/45; 340/287; 340/288; 340/289; 340/290; 340/291

(58) Field of Classification Search .................. 726/34, 726/35; 379/37–51; 340/287–309
See application file for complete search history.

(56) References Cited

U.S. PATENT DOCUMENTS

| | | | |
|---|---|---|---|
| 5,555,373 A * | 9/1996 | Dayan et al. ................... 726/34 |
| 5,680,547 A | 10/1997 | Chang | |
| 5,715,174 A | 2/1998 | Cotichini et al. | |
| 5,748,084 A * | 5/1998 | Isikoff ..................... 340/568.1 |
| 5,764,892 A | 6/1998 | Cain et al. | |
| 5,802,280 A | 9/1998 | Cotichini et al. | |
| 6,167,494 A * | 12/2000 | Cheston et al. .............. 711/162 |
| 6,244,758 B1 | 6/2001 | Solymar et al. | |
| 6,269,392 B1 | 7/2001 | Cotichini et al. | |
| 6,300,863 B1 | 10/2001 | Cotichini et al. | |
| 6,304,970 B1 * | 10/2001 | Bizzaro et al. ................... 726/2 |
| 6,370,649 B1 | 4/2002 | Angelo et al. | |
| 6,453,469 B1 * | 9/2002 | Jystad ........................ 717/174 |
| 6,507,914 B1 | 1/2003 | Cain et al. | |
| 6,523,079 B2 | 2/2003 | Kikinis et al. | |
| 6,715,074 B1 | 3/2004 | Chaiken | |
| 7,096,366 B1 | 8/2006 | Watanabe | |

(Continued)

FOREIGN PATENT DOCUMENTS
WO WO98/43151 A1 10/1998

*Primary Examiner* — Michael Simitoski
*Assistant Examiner* — Roderick Tolentino
(74) *Attorney, Agent, or Firm* — Chowdhury & Georgakis, P.C.

(57) ABSTRACT

A method for tracking, locating and disabling an electronic device. A method includes checking if an application component operated correctly during last power-up of the device; and placing the device under control of power on self test to proceed with powering-up the device if the application component operated correctly during last device power-up.

20 Claims, 90 Drawing Sheets

---

ESTSM REGISTRATION REMINDER

WOULD YOU LIKE TO REGISTER NOW?

YOUR COMPUTER IS EQUIPPED WITH THE SOFTEX E S T S M "ANTI-THEFT" SECURITY SYSTEM. E S T S M WILL PROTECT YOUR SYSTEM IN THE EVENT OF THEFT BY DISABLING YOUR COMPUTER AND POTENTIALLY RECOVERING OR DESTROYING YOUR VALUABLE DATA. (CLICK FOR MORE INFO)

YOU MUST FIRST COMPLETE THE REGISTRATION PROCESS TO ACTIVATE E S T S M ON YOUR MACHINE. UNTIL YOU REGISTER, YOUR COMPUTER WILL NOT BE PROTECTED.

⦿ YES, REGISTER ME NOW!
○ REMIND ME AFTER A WEEK.
○ REMIND ME AFTER A MONTH.
○ DO NOT REMIND ME AGAIN. YOU CAN ALWAYS REGISTER LATER BY RIGHT-CLICKING ON THE TASKBAR ICON.

PRIVACY / TERMS / COPYRIGHT

U.S. PATENT DOCUMENTS

| | | |
|---|---|---|
| 7,159,120 B2 | 1/2007 | Muratov et al. |
| 7,181,008 B1 | 2/2007 | Kamibayashi et al. |
| 7,239,346 B1 | 7/2007 | Priddy |
| 7,404,202 B2 | 7/2008 | Hamilton et al. |
| 7,674,298 B1 | 3/2010 | Cambridge |
| 2002/0010865 A1 | 1/2002 | Fulton et al. |
| 2002/0019238 A1 | 2/2002 | McDonnell et al. |
| 2002/0023215 A1 | 2/2002 | Wang et al. |
| 2002/0045437 A1 | 4/2002 | Kesler |
| 2002/0058497 A1 | 5/2002 | Jeong |
| 2002/0112047 A1 | 8/2002 | Kushwaha et al. |
| 2002/0194500 A1 | 12/2002 | Bajikar |
| 2003/0005316 A1 | 1/2003 | Girard |
| 2003/0037246 A1 | 2/2003 | Goodman et al. |
| 2003/0051090 A1 | 3/2003 | Bonnett et al. |
| 2003/0097398 A1 | 5/2003 | Knox et al. |
| 2003/0105935 A1 | 6/2003 | Moore |
| 2003/0117316 A1 | 6/2003 | Tischer |
| 2003/0131246 A1 | 7/2003 | Reeves et al. |
| 2003/0172306 A1 | 9/2003 | Cain et al. |
| 2004/0002902 A1 | 1/2004 | Muehlhaeuser |
| 2004/0003282 A1 | 1/2004 | Smith |
| 2004/0078572 A1 | 4/2004 | Pearson et al. |
| 2004/0103298 A1 | 5/2004 | Hafeman |
| 2004/0192303 A1 | 9/2004 | Puthenkulam |
| 2004/0268148 A1 | 12/2004 | Karjala et al. |
| 2005/0216757 A1 | 9/2005 | Gardner |

* cited by examiner

E S T S M SERVICE OFFERINGS

PLEASE CHOOSE A SERVICE

THE FOLLOWING ARE ADDITIONAL E S T S M SERVICES THAT CAN HELP SECURE YOUR COMPUTER. SOME OPTIONS HAVE YEARLY SERVICE FEES WHICH CAN BE BILLED TO YOUR CREDIT CARD.

☐ DATA DESTROY SERVICES - THE DATA DESTROY SERVICES WILL ERASE YOUR HARDDISK COMPLETELY AND HENCE PREVENT YOUR DATA FROM GETTING INTO THE WRONG HANDS (MORE INFO)

○ MANUAL ERASE

○ AUTOMATIC ERASE

☐ INSURANCE SERVICE - THE INSURANCE SERVICE OPTION ALLOWS YOU TO SIGN UP FOR THEFT INSURANCE FOR YOUR COMPUTER. THE THEFT INSURANCE WILL GIVE YOU A QUICK REPLACEMENT OF YOUR COMPUTER IF IT IS STOLEN. (MORE INFO)

☐ DATA ENCRYPTION SERVICE - ALLOWS YOU TO ENCRYPT IMPORTANT FILES AND FOLDERS SO THIEF DOES NOT GET ACCESS TO IT EASILY IF SYSTEM IS STOLEN.

PRIVACY / TERMS / COPYRIGHT

FIGURE 2b

LOGIN INFORMATION

PLEASE ENTER A UNIQUE USERNAME AND PASSWORD

IN THIS STEP YOU NEED TO PROVIDE A USERNAME AND PASSWORD THAT WILL BE USED TO MANAGE YOUR E S T S M ENABLED SYSTEMS. YOU MUST ALSO PROVIDE A SECRET QUESTION AND ANSWER FOR IDENTIFICATION PURPOSES.

USERNAME: [ ] *

PASSWORD: [ ] *

CONFIRM PASSWORD: [ ] *

SECRET QUESTION: [----SELECT A SECURITY QUESTION----▼] *

SECRET ANSWER: [ ] *

\* REQUIRED FIELDS

PRIVACY / TERMS / COPYRIGHT

| FIG 4A |
| FIG 4B |

---

NEW REGISTRATION INFORMATION - MESSAGE (HTML)

FILE   EDIT   VIEW   INSERT   FORMAT   TOOLS   ACTIONS   HELP

REPLY   REPLY TO ALL   FORWARD

FROM:
TO:
CC:
SUBJECT: NEW REGISTRATION INFORMATION

DEAR ETST TETST,

THANK YOU FOR REGISTERING YOUR MACHINE WITH E S T S M. YOU MUST CLICK THE LINK AT THE END OF THIS EMAIL TO COMPLETE THE ACTIVATION PROCESS.

PLEASE TAKE A MOMENT TO VERIFY TO YOUR USER INFORMATION BELOW. IT IS IMPORTANT THAT YOU KEEP THIS INFORMATION UPDATED, BECAUSE IF YOUR COMPUTER IS EVER STOLEN, YOU WILL NEED TO PROVIDE US WITH THE INFORMATION BELOW SO THAT WE CAN VERIFY THAT YOU ARE THE REAL OWNER OF THE COMPUTER.

ADDRESS: TEST TETST,TETST, AUSTIN, AK 67777
MODEL DESCRIPTION: PC
SYSTEM DESCRIPTION: ANTI ESTSM SYSTEM
SELECTED SERVICES: BASIC SERVICE
INSURANCE OPTION: NOT SELECTED
AMOUNT: FREE!! NO CHARGE FOR SELECTED SERVICES

TO REPORT A COMPUTER STOLEN OR TO MODIFY YOUR USER INFORMATION, YOU SHOULD PERFORM THE FOLLOWING STEPS:

1. GO TO HTTP://TEST.MYESTSM.COM AND LOGIN IN USING THE USERNAME AND PASSWORD YOU CREATED DURING REGISTRATION. FROM THERE, YOU CAN FOLLOW THE INSTRUCTIONS TO REPORT YOUR SYSTEM STOLEN OR PERFORM OTHER ESTSM RELATED FUNCTIONS.

2. CALL THE ESTSM HOTLINE AT (111) 111-1111. THE ESTSM HOTLINE IS AVAILBALE FROM 9:00AM TO 6:00PM CENTRAL TIME. A ESTSM REPRESENTATIVE WILL HELP YOU AS NEEDED.

FINALLY, TO COMPLETE YOUR ACTIVATION OF ESTSM, CLICK THE "ACTIVATE ESTSM" LINK BELOW.

ACTIVATE ESTSM

SINCERELY,
ESTSM

FIGURE 4B

MICROSOFT INTERNET EXPLORER
FILE EDIT VIEW FAVORITES TOOLS HELP
◀ BACK ▲ ↑ SEARCH FAVORITES MEDIA
ADDRESS [         ]  GO  LINKS
[HOME] PRESS ROOM PRODUCTS SERVICES SUPPORT PARTNERS

ESTSM OPTIONS

( MAIN MENU )

( ▶ DEVICE REGISTRY )

( SYSTEM MANAGEMENT )
- REPORT A STOLEN DEVICE
- UPGRADE AND VIEW ESTSM SERVICES
- SHOW HISTORY
- REGISTER A PHONE PDA
- REGISTER A POCKETPC ( USER MANAGEMENT )
- MODIFY USER INFORMATION
- CHANGE PASSWORD
- MODIFY CREDIT CARD INFORMATION ( ADDITIONAL INFORMATION )
- CONTACT US
- LOGOUT

[ DEVICE REGISTRY ]                    [BUY DIRECT 🛒]

DEVICES CONTROLLED BY ESTSM

BELOW IS A LIST OF ALL THE DEVICES THAT ARE CURRENTLY SECURED USING ESTSM. FOR EACH DEVICE, YOU CAN SEE THE MODEL IMAGE AND SYSTEM DESCRIPTION AS WELL AS THE CURRENT STATUS. FOR EACH SYSTEM, CLICK ON THE MACHINE IMAGE FOR DETAILED STATUS OF PERFORM ANY ACTION.

THE FOLLOWING ARE THE DIFFERENT MACHINES REGISTERED.

[laptop image]          [phone image]
...STATUS                ...ACTIVE
ALL LAPTOPS    ANTI ESTSM SYSTEM

FIGURE 6

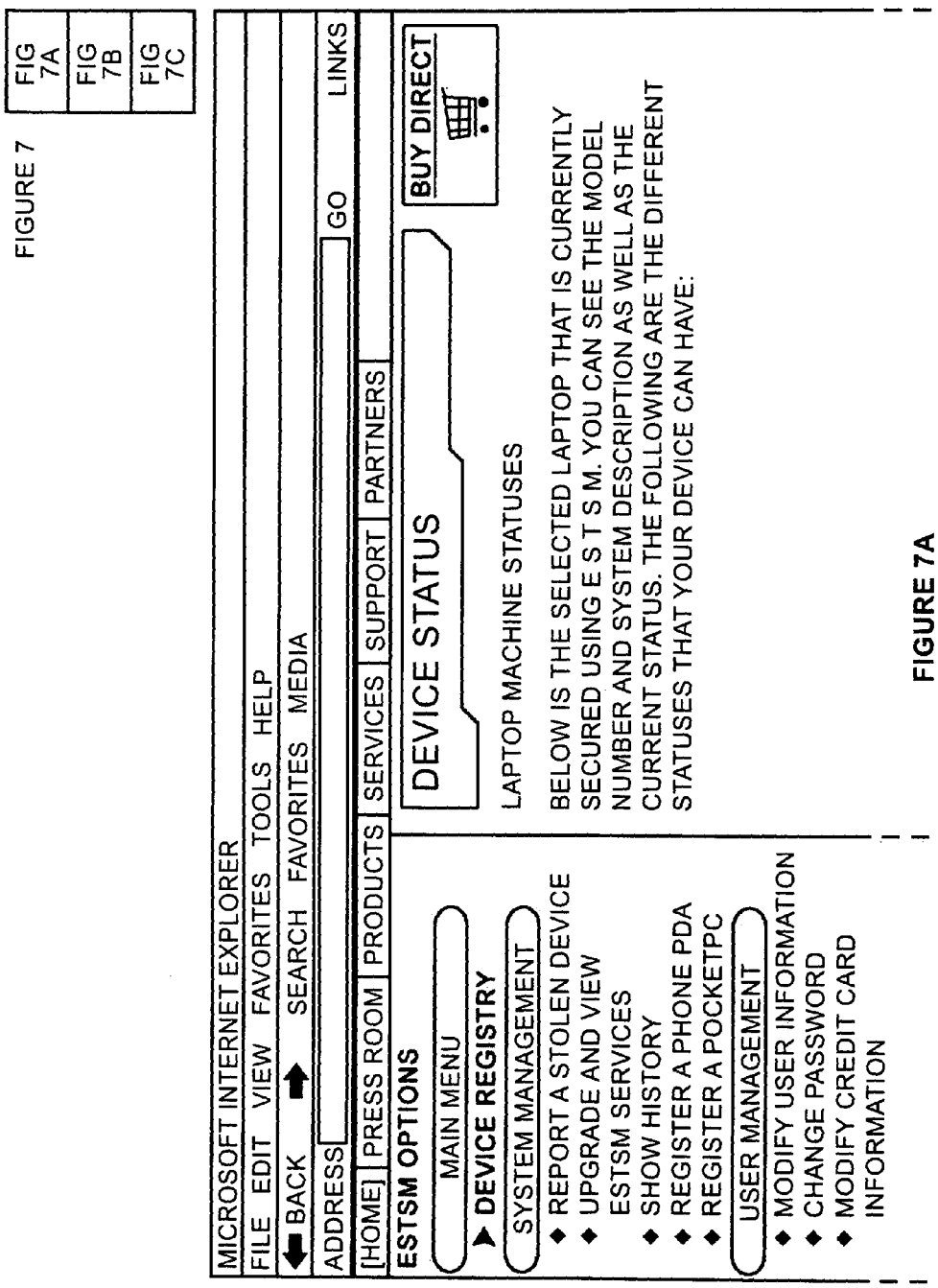

| ACTIVE: | YOUR LAPTOP IS CURRENTLY SECURED AND NOT STOLEN |
|---|---|
| BEING TRACKED: | YOUR STOLEN LAPTOP BEEN CONNECTED TO THE INTERNET AND ITS LOCATION IS BEING TRACKED. |
| REPORTED STOLEN: | YOU HAVE REPORTED YOUR LAPTOP STOLEN. |
| DISABLED: | YOUR STOLEN LAPTOP HAS BEEN DISABLED AND RENDERED UNUSABLE TO THE THIEF. |
| HALF RECOVERED STATE: | YOUR LAPTOP HAS NOT YET BEEN TOTALLY RECOVERED. YOU NEED TO RE-ENTER ACTIVATION PASSWORD IF SYSTEM IS ASKING FOR THE SAME. |
| REGISTERED BUT NOT ACTIVE: | YOUR LAPTOP HAS NOT YET BEEN ACTIVATED. CHECK YOUR EMAIL ACCOUNT FOR A CONFIRMATION EMAIL IN ORDER TO ACTIVATE THE DEVICE. |

ADDITIONAL INFORMATION
- CONTACT US
- LOGOUT

FIGURE 7B

FOR EACH SYSTEM, CLICK ON THE ACTION YOU WANT TO HAVE PERFORMED.

| MODEL | P C |
|---|---|
| SYSTEM DESCRIPTION | ANTI E S T S M SYSTEM |
| CURRENT STATE | ACTIVE |
| SERVICE | BASIC SERVICE + CONTINUOUS TRACK |
| LAST CONNECTED TO THEFTGUARD SERVER | 7/21/2003 4:28:11 PM |

( UPGRADE SERVICE )  ( REPORT STOLEN )  ( STOP E S T S M )

( BILLING HISTORY )  ( STATUS HISTORY )

WHAT IS THE DATE AND TIME THAT THIS INCIDENT OCCURED?
DATE (MM/DD/YYYY) [        ] *TIME [        ] AM ▼

PLEASE PROVIDE A BRIEF SUMMARY OF THE INCIDENT:
[        ] *

DO YOU HAVE AN ALTERNATE CONTACT NUMBER WHERE YOU CAN BE REACHED?
[        ]

PLEASE ENTER THE DATE OF THIS REPORT (MM/DD/YYYY):
7/21/2003

PLEASE GIVE A COMPLETE PHYSICAL DESCRIPTION OF THE PROPERTY THAT WAS STOLEN:
[        ] *

WHAT IS THE TOTAL VALUE OF THE ITEM (DESCRIBED ABOVE)?
$ [        ] *

[SUBMIT]  [RESET]

| FIG 9A |
| FIG 9B |
| FIG 9C |

| FILE  EDIT  VIEW  INSERT  FORMAT  TOOLS  ACTIONS  HELP |
| REPLY  REPLY TO ALL  FORWARD |
| SUBJECT: NOTIFICATION - SYSTEM LOCATION INFORMATION |

DEAR USER,

YOUR STOLEN EQUIPMENT IS CURRENTLY BEING TRACKED BY ESTSM. BELOW ARE THE DETAILS OF THE MACHINE RETRIEVED WHEN IT WAS LAST CONNECTED TO THE INTERNET.

COMPUTER NAME: TGTEST
DESCRIPTION: DEVLAB: FIRST RIGHT M/C WHILE ENTRY
IP ADDRESS: 192.168.0.62
CONNECT DATE/TIME: 7/2/2003 12:30:16 PM

THE IP ADDRESS REPRESENTS THE 'LOCATION' ON THE INTERNET FROM WHICH THE STOLEN EQUIPMENT WAS CONNECTED. THE INFORMATION BELOW INDICATES THE OWNER(S) OF THE IP ADDRESS. THESE OWNERS(S) ARE TYPICALLY A COMPANY OR AN INTERNET PROVIDER. THE OWNER(S) OF THE IP ADDRESS SHOULD BE ABLE TO PROVIDE MORE INFORMATION AS TO THE 'PHYSICAL' LOCATION OF THE COMPUTER. PLEASE CONTACT THE IP ADDRESS OWNER(S) SHOWN BELOW, OR PROVIDE THIS INFORMATION TO YOUR LOCAL AUTHORITIES TO HELP RECOVER YOUR STOLEN EQUIPMENT.

------------------IP ADDRESS OWNER # 1 --------------------

ORGNAME: INTERNET ASSIGNED NUMBERS AUTHORITY
ORGID: IANA
ADDRESS: 4676 ADMIRALTY WAY, SUITE 330
CITY: MARINA DEL REY
STATEPROV: CA
POSTALCODE: 90292-6695
COUNTRY:US

FIGURE 9A

```
NETRANGE: 192.168.0.0 - 192.168.255.255
CIDR: 192.168.0.0/16
NETNAME: IANA-CBLK1
NETHANDLE: NET-192-168-0-0-1
PARENT: NET-192-0-0-0-0
NETTYPE:IANA SPECIAL USE
NAMESERVER: BLACKHOLE-1 IANA ORG
NAMESERVER: BLACKHOLE-2 IANA ORG
COMMENT: THIS BLOCK IS RESERVED FOR SPECIAL
PURPOSES.
COMMENT: PLEASE SEE RFC 1918 FOR ADDITIONAL
INFORMATION.
COMMENT:
REGDATE: 1994-03-15
UPDATED: 2002-09-16
NETTYPE: IANA SPECIAL USE
NAMESERVER: BLACKHOLE-1 IANA ORG
NAMESERVER: BLACKHOLE-2 IANA ORG
COMMENT: THIS BLOCK IS RESERVED FOR SPECIAL
PURPOSES.
COMMENT: PLEASE SEE RFC 1918 FOR ADDITIONAL
INFORMATION.
COMMENT:
REGDATE: 1994-03-15
UPDATED: 2002-09-16

ORGTECHHANDLE: IANA-ARIN
ORGTECHNAME: INTERNET   CORPORATION   FOR
ASSIGNED NAMES AND NUMBER
ORGTECHPHONE: +1-310-823-9358
ORGTECHEMAIL: RES-IP@IANA.ORG

#  ARIN WHOIS DATABASE, LAST UPDATED 2003-07-01
   21.05
#  ENTER? FOR ADDITIONAL HINTS ON SEARCHING
   ARINS WHOIS DATABASE.

IF YOU HAVE ANY MORE QUESTIONS ABOUT THIS LOCATION INFORMATION REPORT, PLEASE CONTACT ESTSM AT (111) 111-1111 OR SEND A REPLY EMAIL TO ADMIN@ADMINESTSM.COM. THANK YOU FOR USING ESTSM SERVICES.

SINCERELY.

ESTSM

FIGURE 9C

ESTSM REGISTRATION

SETUP OR MODIFY YOUR ACCOUNT NOW!

THE FIRST STEP IN THE REGISTRATION PROCESS IS TO CREATE AN E S T S M ACCOUNT.

⦿ I'M A NEW USER - FIRST TIME REGISTRATION.
○ I'M AN EXISTING USER - REGISTER A NEW MACHINE TO YOUR CURRENT ACCOUNT.

USERNAME: [          ]

PASSWORD: [          ]

☐ REGISTERING UNDER A CORPORATION

LICENSE KEY: [          ]

NOTE: IF YOU ARE REGISTERING YOUR ACCOUNT UNDER THE CORPORATION, THEN THE LICENSE KEY HAS TO BE SPECIFIED.

PRIVACY / TERMS / COPYRIGHT

FIGURE 10

POCKET PC E S T S M SERVICE OFFERINGS

PLEASE CHOOSE A SERVICE

THE FOLLOWING SERVICES CAN HELP SECURE YOUR POCKET PC. SOME OPTIONS HAVE YEARLY SERVICE FEES WHICH CAN BE BILLED TO YOUR CREDIT CARD.

☐ BASIC SERVICE - AFTER YOUR POCKET PC IS REPORTED STOLEN, THIS SERVICE DISABLES YOUR POCKET PC WHEN IT IS CONNECTED TO THE INTERNET. THIS WILL IMMEDIATELY PREVENT THE THIEF FROM USING THE POCKET PC AND ACCESSING YOUR INFORMATION.

☐ DATA BACKUP SERVICE - IF YOU SELECT THIS SERVICE, ONCE YOUR POCKET PC IS REPORTED STOLEN THEN E S T S M WILL BACKUP ADDRESS BOOK ENTRIES FROM THE POCKET PC AND THEN DISABLES IT. LATER YOU CAN REINSTALL THE DATA TO NEW POCKET PC.

PRIVACY / TERMS / COPYRIGHT

FIGURE 11

POCKET PC REGISTRATION

PLEASE EXECUTE THE E S T S M APPLICATION ON YOUR POCKET PC AT THIS TIME. CLICK ' REGISTER NOW' BUTTON, AND ENTER THE REGISTRATION KEY SHOWN BELOW.

REGISTRATION KEY: 17d6a2795-9

NOTE: MAKE SURE YOU HAVE CONFIGURED INTERNET SETTINGS PROPERLY. FOR MORE DETAILS REFER MANUFACTURER REFERENCE MANUAL.

\* REQUIRED FIELDS   PRIVACY / TERMS / COPYRIGHT

FIGURE 12

POCKET PC VERIFICATION

ENTER THE CONFIRMATION KEY THAT IS CURRENTLY DISPLAYED ON YOUR POCKET PC. IF YOU DO NOT SEE AN CONFIRMATION CODE, PLEASE GO BACK AND ENTER THE REGISTRATION KEY ON YOUR POCKET PC AGAIN.

SYSTEM DESCRIPTION OR NICK NAME HELPS YOU TO IDENTIFY MULTIPLE POCKET PCS OF SAME TYPE

CONFIRMATION KEY: 356793

SYSTEM DESCRIPTION: NEW PDA

* REQUIRED FIELDS

PRIVACY / TERMS / COPYRIGHT

FIGURE 15

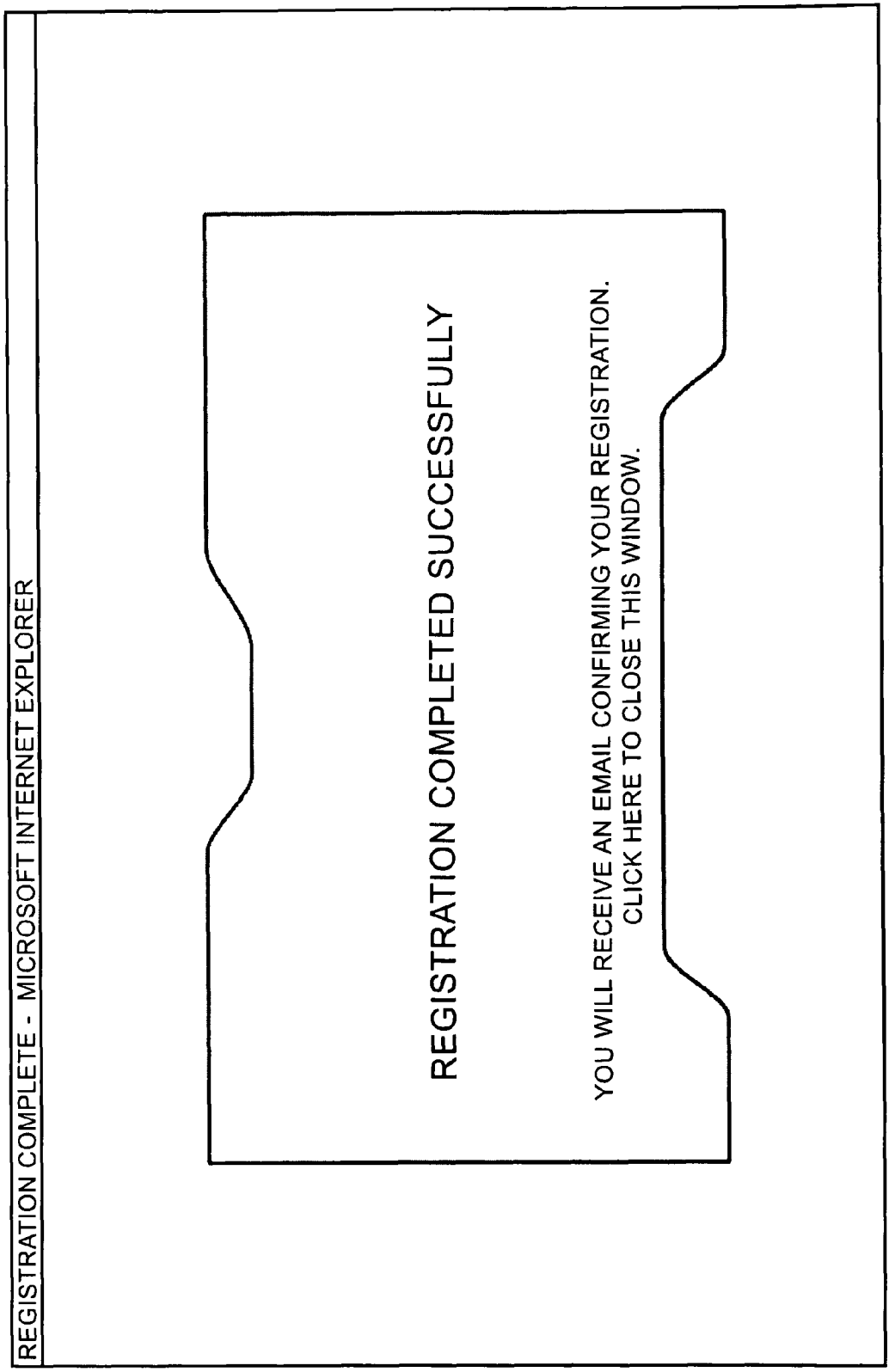

FIGURE 20

MICROSOFT INTERNET EXPLORER

FILE  EDIT  VIEW  FAVORITES  TOOLS  HELP

← BACK  ↑  SEARCH  FAVORITES  MEDIA
↓

ADDRESS [                    ]  GO   LINKS

[HOME] PRESS ROOM | PRODUCTS | SERVICES | SUPPORT | PARTNERS

CORPORATE USER OPTIONS

( MAIN MENU )
- MAIN PAGE ( COMPANY MANAGEMENT )
- MODIFY COMPANY INFORMATION ( USER MANAGEMENT )
▲ ADD A USER
- REMOVE A USER ( SYSTEM MANAGEMENT )
- CREATE NEW ORDERS
- UPGRADE SERVICES ( SYSTEM MANAGEMENT )
- REPORT YOUR COMPUTER STOLEN ( ADDITIONAL INFORMATION )
- CONTACT US

CORPORATE ADMINISTRATION   BUY DIRECT 🛒

PLEASE ADD A USER BELOW USING FIELDS BELOW

MANAGER:         MANAGER - IT
FIRST NAME:      [            ] *
LAST NAME:       [            ] *
USER NAME:       [            ] *
PASSWORD:        [            ] *
RE-ENTER PASSWORD: [          ] *
EMAIL:           [            ] *
PHONE:           [            ] *

ACCESS PERMISSIONS
○ GLOBAL ACCESS  ○ DEPARTMENTAL ACCESS  ⦿ SELF ACCESS
SERVICE PERMISSIONS

USER MANAGEMENT
☐ ADD A USER   ☐ REMOVE A USER   ☐ MODIFY A USER
SYSTEM MANAGEMENT
☐ REPORT/RECOVER A SYSTEM

[SUBMIT]

FIGURE 21

- ◆ OTHER OPTIONS
  - ◆ SERVER SETTINGS
  - ◆ CHANGE PASSWORD
    - ◆ LOGIN
    - ◆ MASTER
    - ◆ LOGOUT

PLEASE REGISTER THE SUPER-USER

FIRST NAME : [_____]*
LAST NAME : [_____]*
USER NAME : [_____]*
PASSWORD : [_____]*
RE-ENTER PASSWORD : [_____]*
PHONE : [_____]*
EMAIL : [_____]*

[SUBMIT]

FIGURE 27B

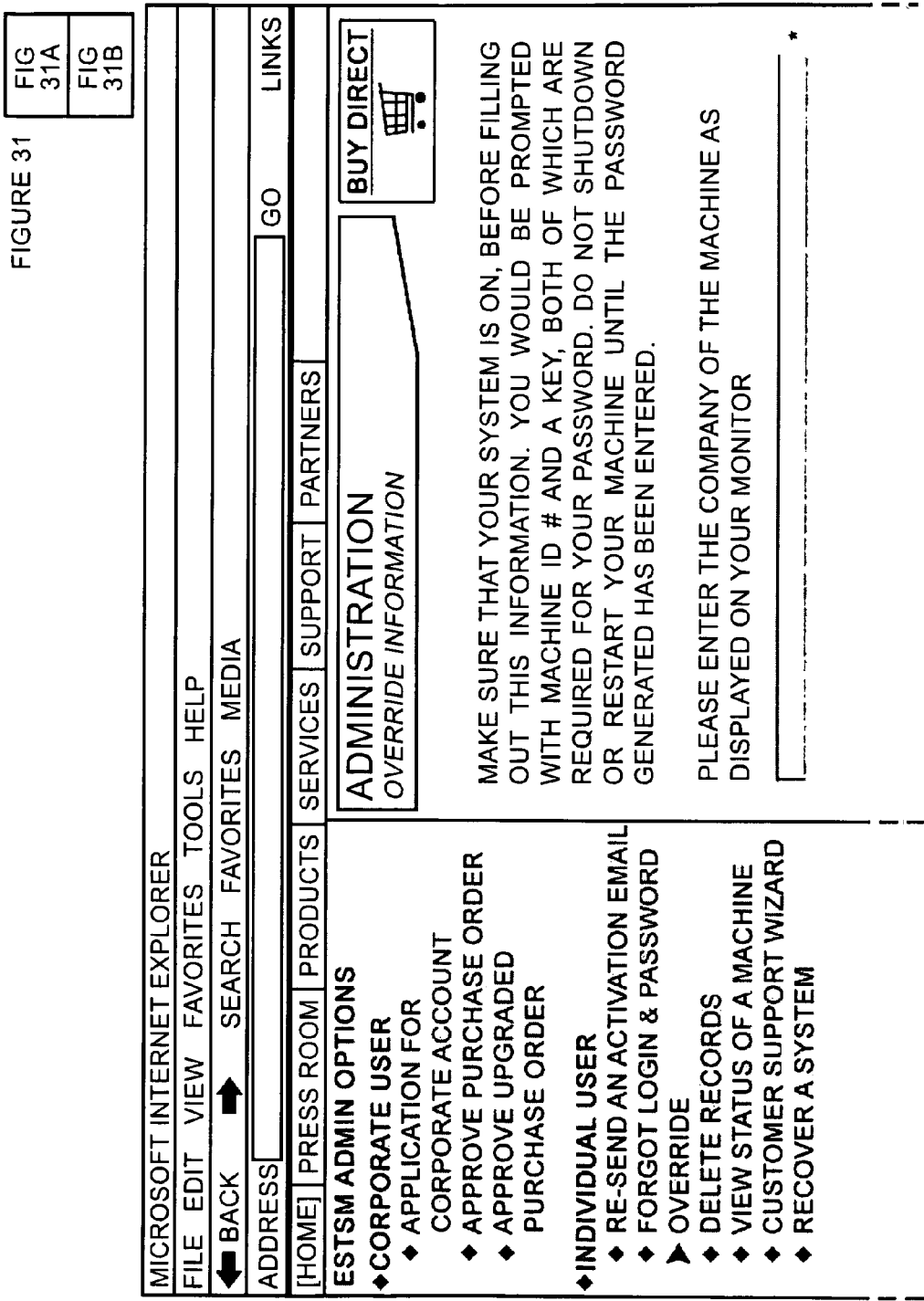

FIGURE 33

NOT REGISTERED TO ACTIVE

REGISTERED AND ACTIVE TO DE REGISTERED

REGISTERED AND ACTIVE TO USER REMOVED

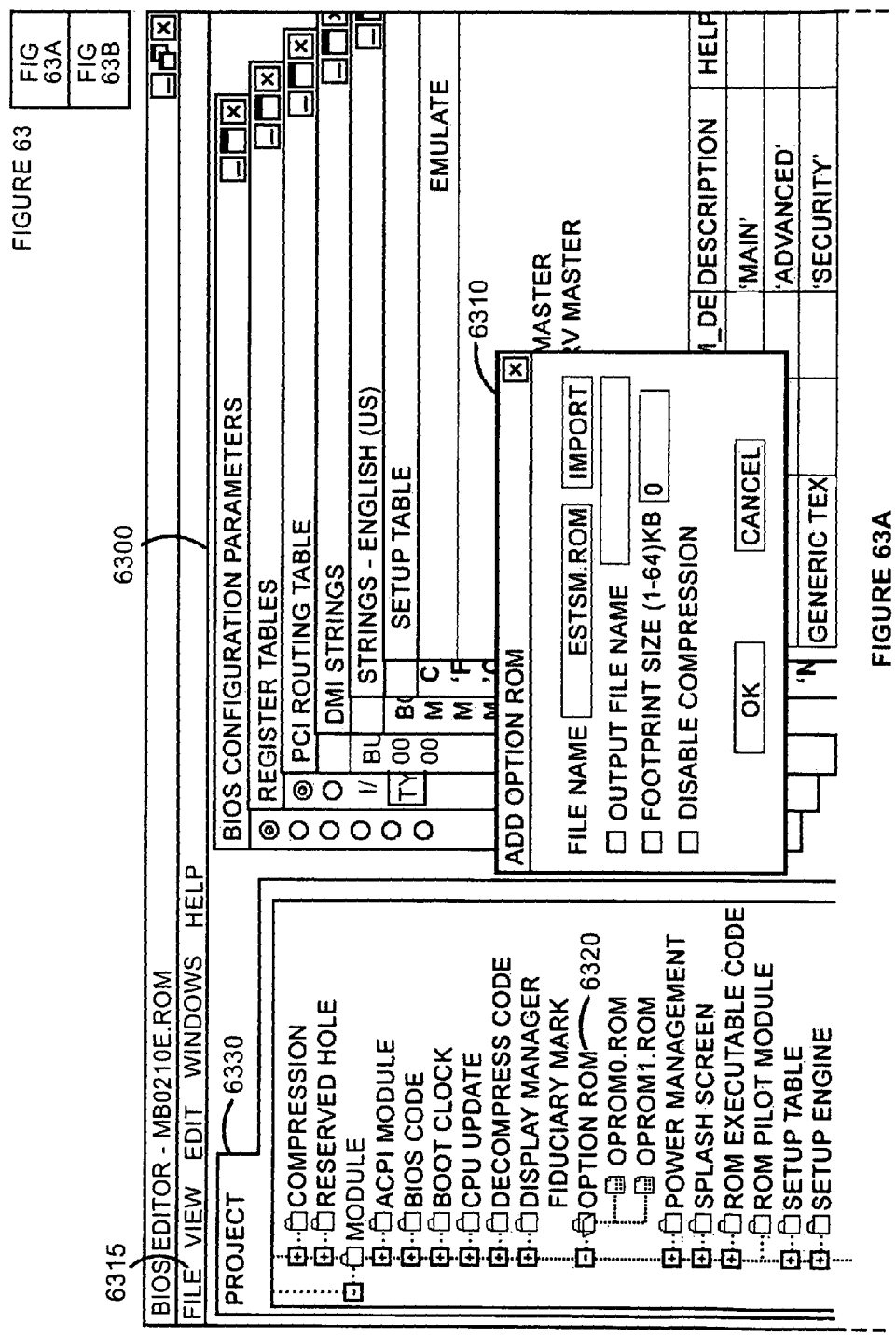

E S T S M SERVICE OFFERINGS

PLEASE CHOOSE A SERVICE

THE FOLLOWING SERVICES CAN HELP SECURE YOUR MOBILE PHONE. SOME OPTIONS HAVE MONTHLY SERVICE FEES WHICH CAN BE BILLED TO YOUR CREDIT CARD.

☑ BASIC SERVICE - IF YOUR PHONE IS EVER STOLEN OR LOST, THIS SERVICE WILL DISABLE YOUR PHONE SO THAT IT WILL NOT BE USABLE BY ANYONE. ALL THE INFORMATION ON YOUR PHONE IS SECURED SO THAT IT CAN NOT BE ACCESSED BY SOMEONE WHO STOLE OR FINDS YOUR PHONE.

☑ DATA RECOVERY SERVICE - IF YOUR PHONE IS LOST OR STOLEN, THIS SERVICE WILL RECOVER YOUR CONTACTS, CALENDAR, AND OTHER KEY DATA (SUCH AS PICTURES) FROM YOUR PHONE. YOU CAN THEN RESTORE THIS DATA ONTO THE NEW REPLCAEMENT PHONE THAT YOU PURCHASE.

PRIVACY / TERMS / COPYRIGHT

FIGURE 65

ESTSM

DEVICE HAS BEEN DISABLED.

FIGURE 70

ELECTRONIC DEVICE DISABLING SYSTEM AND METHOD

CROSS REFERENCE TO RELATED APPLICATION

This application is a divisional of U.S. application Ser. No. 10/925,161, filed on Aug. 23, 2004, incorporated herein by reference, which in turn claims priority under 35 USC §119 (e)(1) to Provisional Application No. 60/497,182, filed Aug. 23, 2003, incorporated herein by reference.

BACKGROUND

Theft of electronic devices containing costly hardware and software has become increasingly common. Such thefts may occur because of the value of the electronic device hardware or for access to information contained on the electronic device's storage accessories such as credit card information, confidential and proprietary business information, and so on. Another use of the stolen device may be to gain access to servers containing confidential information through the electronic device.

Physical attachment of the electronic device to the user or an immovable object is one way of preventing theft. Password protection schemes may also be used to discourage theft or at least stop the thief from accessing the information stored on the electronic device. Motion sensors or alarms placed on the electronic device may be another impediment to the would be thief. However, such techniques do not always prevent theft, are costly and once the electronic device is stolen, do not allow tracking or recovery.

SUMMARY

The problems noted above are solved in large part by the electronic device security and tracking system and method (ESTSM) that includes a plurality of hardware, software and firmware components that cooperate to allow tracking, disabling, and other interaction with the stolen electronic device. The ESTSM electronic device (hereinafter "electronic device") and the ESTSM server computer system communicate over a communication channel to determine if the user has registered for ESTSM services. The user may be an individual consumer user or a corporate/government user. The corporate/government user's electronic device may be part of a corporation's or government organization's customized ESTSM system. If the electronic device is not registered for ESTSM services, then upon first time power-on and connection to the ESTSM server of the electronic device that includes ESTSM software and firmware, the user is prompted to register for different ESTSM services. Alternatively, ESTSM may remain disabled and the user may register using techniques that include but are not limited to selecting a menu option for registration or selecting an icon on the electronic device's desktop, or via World Wide Web pages from a remote system other than the ESTSM device itself. The electronic device may be a laptop computer, desktop computer, wearable computer, server computer system, personal digital assistant (PDA), cellular telephone, WLAN capable computer, Smart Phone, tablet personal computer, palm top device and so forth. Each of the services may consist of different monthly, yearly or multi-year service fees or a one time fee for the life of the electronic device. After registration is complete, the ESTSM server computer system communicates over the Internet or another communication protocol such as Short Messaging Service (SMS) with the user to determine if an electronic device has been reported stolen. In accordance with some embodiments of the invention, if the device is reported stolen, the ESTSM server may inform the ESTSM device via a secure communications channel to take the appropriate action based on the service options selected by the user (e.g. disabling the electronic device, destroying the storage device (e.g. hard disk drive (HDD)) data, recovering data, encrypting data and more). In some other embodiments of the invention, an automated voice prompting system at a call center or live call center operator after authentication of the user may communicate with the user to perform ESTSM activities. All ESTSM activities performed through the Internet may also be performed by the call center including registration, reporting a system stolen, reporting system has been recovered and so forth.

The ESTSM system may include an electronic device with three components and a server computer system. The three components may be an application component, a non-viewable component and a Basic Input/Output System (BIOS) component. In some embodiments of the invention, the application component includes ESTSM application software that executes under any Windows® operating system (OS). In other embodiments of the invention, the application component software may execute under the Disk Operating System (DOS), Linux operating system, Windows® CE (and its derivatives such as Windows® Mobile, Smart Phone, Pocket PC, and so on), Symbian and Palm operating system and others. In some embodiments of the invention, the application component is responsible for communicating over the Internet with the ESTSM server computer system to determine if the electronic device has been reported stolen. If the device has been reported stolen, the application component along with the ESTSM server computer system will determine what services the user has registered for and will take the appropriate action (e.g. disable the device, communicate identifying information to the server, erase the storage device, recover data, encrypt data, etc).

In some embodiments of the invention, the communication medium may be a messaging protocol such as Short Messaging Service (SMS) used in mobile devices such as cell phones and computers using Wireless Local Area Networks (WLAN) services from wireless service providers such as Verizon Wireless®. In such systems, the server computer system would inform the application component that the device had been reported stolen without the application component querying the server system to determine if the electronic device has been reported stolen.

In some embodiments of the invention, the non-viewable component may reside in a hidden partition on the hard disk drive HDD. Alternatively, in some other embodiments of the invention, the non-viewable component may reside in the Host Protected Area (HPA) of the HDD that is not accessible by the operating system of the electronic device. The non-viewable component may include a VALIDATOR program that inspects an ESTSM Communications Area (ECA) to determine if the ESTSM application components have run correctly during the last system boot. The non-viewable component may also contain a copy of the original application component software fileset if the files need to be re-installed to the HDD.

ESTSM also consists of a BIOS component that maintains the secured environment of the ESTSM application component. The BIOS component includes a secure nonvolatile area that stores critical information present after electronic device power-off and accessible during electronic device power-on and boot. If only the application component was provided, a simple low level format of the hard disk drive would remove the application and bypass all the security features. ESTSM implements an "application, BIOS and non-viewable component" based solution to electronic device security. The ESTSM BIOS components ensure that a thief cannot bypass or circumvent the ESTSM application from running.

On every boot, the BIOS component will check and ensure that the ESTSM application components have not been deleted or tampered with. If the BIOS component detects a problem with any of the application components, it will restore the components from a special hidden partition on the hard disk drive or from system recovery media. In some embodiments of the invention, the recovery media may be a floppy diskette but in other embodiments the recovery media may be a Compact Disc-Read Only Memory (CD-ROM), Universal Serial Bus (USB) key storage device, or other storage device accessible during device boot.

In other embodiments of the invention as mentioned above, the electronic device in the ESTSM may include a HDD that contains a HPA. The HPA is not accessible by the operating system of the electronic device or by the user of the electronic device. An ESTSM application component including ESTSM application software may be present on the HDD. The HPA may include an ESTSM non-viewable component. The ESTSM electronic device may also include an ESTSM BIOS component that is capable of communicating with the non-viewable component and application component. An ESTSM server computer system communicates with the other components through an ESTSM Communications Area (ECA) located on the HDD.

In some embodiments of the invention, the ESTSM system may include an electronic device with a BIOS component, an application component and a server computer system. On every boot, the BIOS component will check and ensure that the ESTSM application components have not been deleted or tampered with. If the BIOS component detects a problem with any of the application components, it will assume that the ESTSM application components will be installed by the user of the electronic device. If the application component is not installed after a number of unsuccessful attempts, the BIOS component will prevent the user from accessing the electronic device. The application component may be installed by downloading from the ESTSM website or from recovery media that came with the device.

In some other embodiments of the invention, the electronic device in the ESTSM includes a Flash memory and may be a PDA, mobile cellular telephone or WLAN capable computer. The Flash memory may contain a changeable area and a system area. The system area is not changeable by the user of the electronic device. The ESTSM application software may reside in the changeable area or the system area depending on the security requirements of the device implementation. An ESTSM server computer system communicates to the ESTSM application software on the electronic device through communication channels that may be the Internet, a wireless medium (such as SMS), a combination of the two, and so on. The PDA, mobile cellular telephone or WLAN capable computer may be continuously connected to the ESTSM server computer system through an always-on Internet connection or other mobile device communication protocols such as Short Messaging Service (SMS).

In some aspects of the invention, a non-transitory machine-readable medium that provides instructions, which when executed by a machine, cause said machine to perform operations, includes instructions for checking if an application component operated correctly during last power-up of an electronic device; and placing the device under control of power on self test to proceed with powering-up the device if the application component operated correctly during last device power-up.

In addition to the foregoing, other method, system, and non-transitory machine-readable medium aspects of the invention are described in the claims, drawings, and text forming a part of the present disclosure.

BRIEF DESCRIPTION OF THE DRAWINGS

FIGS. 2a-2b show screen shots of the service offerings and selection page for the ESTSM;

FIGS. 3a-3c shows screen shots of the user registration and information input pages for the ESTSM;

FIG. 4 shows a screen shot of a new user registration email sent to a user after they have registered their electronic device with ESTSM;

FIG. 6 shows a screen shot of the device registry web page that resides in the ESTSM server computer system in accordance with one embodiment of the invention;

FIG. 7 shows a screen shot of the electronic device status web page that resides in the ESTSM server computer system in accordance with one embodiment of the invention;

FIGS. 8a-8b show screen shots of web pages that allow a user to report a stolen electronic device in accordance with one embodiment of the invention;

FIG. 9 shows a screen shot of an email containing location identification information for a stolen electronic device in accordance with one embodiment of the invention;

FIG. 10 shows a screen shot from another computer system that can display web pages of a registration web page for ESTSM on a PDA;

FIG. 11 shows a screen shot of the service offerings for an ESTSM enabled PDA using another computer system capable of displaying web pages;

FIG. 12 shows a screen shot for registration of a PDA with ESTSM in accordance with one embodiment of the invention that requests the user enter the registration key on their PDA;

FIG. 15 shows a screen shot from a computer system capable of displaying web pages of Pocket PC verification requesting the user enter the confirmation key from the Pocket PC display;

FIG. 16 shows a screen shot from a computer system capable of displaying web pages of a successful registration message for a PDA;

FIG. 20 shows a screen shot of corporate information input and modification by the administrator;

FIG. 21 shows a screen shot of a web page that allows a corporate administrator to register a user for ESTSM;

FIG. 33 shows a screen shot of a web page that allows a corporate administrator to view the status of an electronic device using the machine id or a user login assigned to the device;

FIG. 65 show screen shots of the service offerings for the ESTSM mobile device;

FIG. 70 shows a screen shot from a mobile device indicating that the device has been disabled;

DETAILED DESCRIPTION

The ESTSM consumer user (i.e. non-corporate user) experience consists of two phases: (1) the registration phase and (2) administration phase via the ESTSM website. In the registration phase, the user creates an account with ESTSM, specifies what ESTSM services he wishes to purchase, and provides user and billing information to complete the registration.

Once registration is complete, the typical user will not interact with ESTSM until the electronic device is stolen. At that time, the user can log into the ESTSM website. Once logged in, the user can report the device as stolen, disable the device, or perform other device administration tasks. The user may also initiate all ESTSM device administration tasks through a call center that can validate the identity of the user and perform administrative tasks on the user's behalf.

After registration is complete, the ESTSM server computer system communicates over the Internet with the user to determine if the electronic device has been reported stolen. In accordance with some embodiments of the invention, if the device is reported stolen, the ESTSM server will instruct the electronic device to take the appropriate action based on the service options selected by the user (e.g. disabling the electronic device, destroying the hard disk drive (HDD) data, recovering data, encrypting data and more).

Figure 1:
FIG. 1 shows a screen shot of the registration reminder for the ESTSM.

When the user purchases the electronic device, the ESTSM components may be pre-installed by the manufacturer of the electronic device. In some embodiments of the invention, the ESTSM registration screen shown in FIG. 1 will come up when the user starts using his electronic device and the ESTSM system determines that the electronic device is not registered. The ESTSM system determines if the electronic device is registered or not by communicating with the ESTSM server computer system.

In some embodiments of the invention, the user may request the manufacturer of the device to preregister the user for ESTSM services after the manufacturer builds the electronic device. In some alternative embodiments of the invention, the device may be preregistered for ESTSM services at the location (e.g. retail store) where the device is purchased. In some embodiments of the invention, the initial fees for the ESTSM services as described below may be included by the manufacturer in the price of the electronic device or may be discounted as a sales promotion for the device.

In some other embodiments of the invention, the ESTSM system may be provided to the manufacturer of the electronic device without charge or for a very small fee. The user of the device may select the ESTSM services they want and the revenue generated may be shared by the manufacturer and ESTSM administrator. Thus, the user may "opt-in" to purchase the ESTSM services. In some embodiments of the invention, the ESTSM services may be offered to the user of the electronic device on a trial basis for a limited time.

The user can proceed with the registration process at this point, or choose to register at a later time or never. If the user chooses to register at a later time, the ESTSM will remain disabled and the user may register using techniques that include but are not limited to selecting a menu option for registration or selecting an icon on the electronic device's desktop. If the user proceeds with the registration process, the user will be asked to specify if they are a "new user" or an "existing user" that has other electronic devices running ESTSM. The next stage as shown in FIGS. 2a-2b is to choose the ESTSM services for the electronic device.

Figure 2A:

FIGS. 2a-2b shows the service selection screen that may include the cost of each service and the number of services offered. The services offered and the cost of each service may vary based on the manufacturer and model of the electronic device, the market segment of the electronic device (i.e. business device, home use device) and what the manufacturer has chosen to include for the device. Some manufacturers may want to change the pricing of the services, or offer bundled services to the user. For some embodiments of the invention, as shown below, is a list of the typical services available to the user and the associated costs.

1. Basic Service—with this service the user has the ability to have the electronic device disabled when it is stolen. However, the location of the stolen electronic device is not tracked and no other operation is performed.
2. Tracking Service—with this service, the location of the stolen electronic device will be tracked and the location report information is sent to the user of the electronic device via email (or the user can call a monitoring station to get the information). There are two sub-options under the tracking service: Track-and-Disable or Continuous Track. In the Track-and-Disable option, the location of the electronic device is captured one time and then the electronic device is disabled. In the Continuous Track option, the location of the electronic device is constantly tracked until the user manually disables the electronic device from the ESTSM website. Electronic devices such as cell phones because they are mobile and cannot be easily tracked may not offer this service.
3. Data Destroy Service—with this service, the hard disk of the stolen electronic device is erased when the thief connects the electronic device to the Internet. This service has two sub-options: (1) Automatically Erase when the electronic device is connected to the Internet, or (2) Manual Erase, the user must manually specify when to erase the hard disk drive via the ESTSM website.
4. Third Party Insurance Signup—with this service, ESTSM will re-direct the user to the website of third party companies that will assist the user in signing up for theft and damage replacement insurance for their electronic device.

In some embodiments of the invention, due to the extendible design of ESTSM, new services can be added into the ESTSM registration process as given below:

1. Data Encryption Service—with this service, a virtual file folder called "My Encrypted Documents" is created on the desktop of the electronic device. In some embodiments of the invention, all files saved in this folder are encrypted by encryption techniques built into the operating system. Access to the folder is denied unless the system is connected to the Internet and the electronic device has not been reported stolen. If the system is not connected to the Internet, the user can optionally enter the ESTSM username and password to get access. In some embodiments of the invention, the user may designate any virtual file folder in the electronic device as an "ESTSM Encrypted Folder."
2. Data Recovery Service—this service will allow a user to specify critical files and in the case of theft, the software will first recover these files to the ESTSM server computer system, before performing other service option actions. In some embodiments of the invention, a virtual file folder called "My Critical Files" is created on the desktop of the electronic device. The user may store the actual files, copies of files, or shortcut pointers to files in this folder that they want to recover if the electronic device is stolen. In some embodiments of the invention, right clicking a mouse button with the pointer pointing to a file displays a menu allowing the user to mark the file as a "Critical File." The file's icon is modified to indicate that it will be recovered if the electronic device is stolen. This embodiment of the invention allows the file to be present anywhere on the HDD of the electronic device rather than in a specific file folder. Some embodiments of the invention may use both the virtual file folder "My Critical Files" as well as files marked as "Critical Files" to indicate files that will be recovered if the electronic device is stolen.

In some embodiments of the invention, most of ESTSM services are based on a yearly fee model. Some services such as data recovery may be billed on a per megabyte basis-that is, the user indicates the number of megabytes to be recovered during registration and is billed accordingly. However, if the electronic device is stolen and during data recovery more megabytes are recovered, then a one time fee is charged to the user. The user will automatically be billed at the end of the year to renew the service for one more year. The user will be sent an email before billing to give the user a chance to cancel the service if they wish.

Figure 3A:
Figure 3C:

The next stage in the registration phase is to create the username and password as shown in FIGS. 3a-3b that can be used to log onto the ESTSM website to report a stolen electronic device, etc. Once that is completed, the user must provide his user information (name, address, phone number, and so forth) as shown in FIG. 3c so that the monitoring station can identify the user if the user calls the monitoring station to report a theft.

The final part of the registration phase is to provide the billing information for the ESTSM services. This requires the input of a credit card number, debit card number, or checking account number. The information is then validated, the credit card or other billing means is charged and a confirmation email as shown in FIG. 4 is sent to the end user, corporation or insurance company that just completed the registration. The user will have to click a link at the end of the email to activate the ESTSM on that electronic device. In some embodiments of the invention, periodic ESTSM service charges may be billed by adding these charges to the existing electronic device bill. For example, ESTSM monthly service charges may be added to the users' existing mobile phone bill for ESTSM registered mobile phones.

Figure 5:
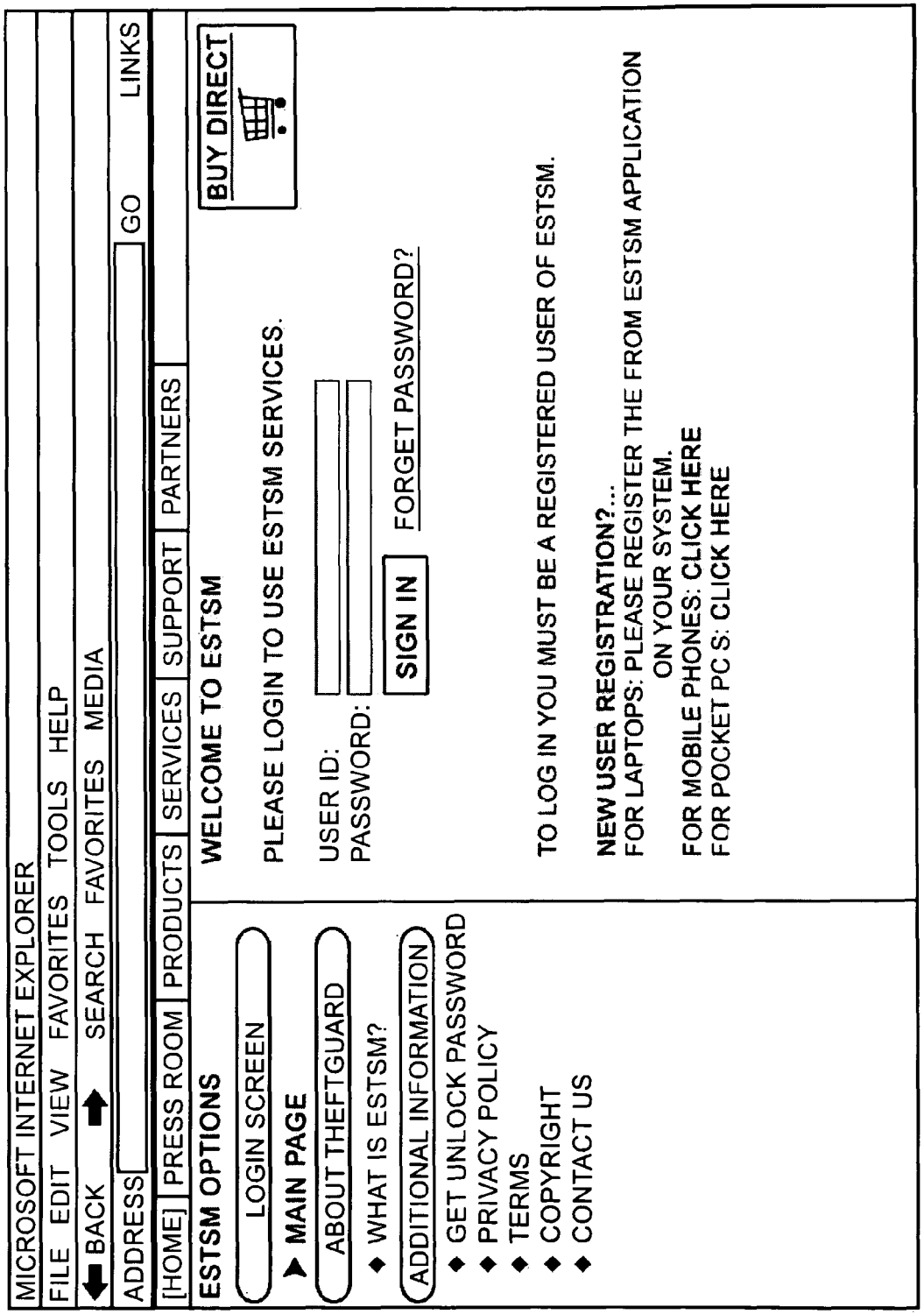
FIG. 5 shows a screen shot of the login page for connecting to ESTSM server computer system in accordance with one embodiment of the invention.

As mentioned above, ESTSM provides a website from which the user may administer the ESTSM services on the electronic device. In some embodiments of the invention, corporate users may have limited administrative capabilities because of their access permissions (described in more detail below). As shown in FIG. 5, the user must first log into the website using the username and password that was created during the registration phase. A user without access to the Internet (i.e. his electronic device was stolen), can call the ESTSM monitoring station to perform the administrative functions described below for the electronic device.

Once the user has logged into the ESTSM website, the main ESTSM menu in accordance with some embodiments of the invention is presented as shown in the left hand portion of FIG. 6. In some embodiments of the invention, corporate and noncorporate users may have different ESTSM menus.

The "Device Registry" portion of the page in FIG. 6 shows all the electronic devices the user currently has registered with ESTSM. By clicking on a device image from the "Device Registry" page of the ESTSM website, the user is taken to the "Device Status" page shown in FIG. 7. On the "Device Status" web page for each device, the user can perform the following tasks: (1) View the status of the user's electronic devices running ESTSM; (2) Report an electronic device stolen; (3) Recover and re-enable a stolen system that has been found; (4) Upgrade or change the ESTSM service options; (5) Show the Billing and Electronic Device Location/Status Logs; (6) Perform User Management functions such as changing the user information, password and billing information; and (7) Perform Data Management functions such as viewing recovered data and transferring recovered data to another device.

Figure 8B:
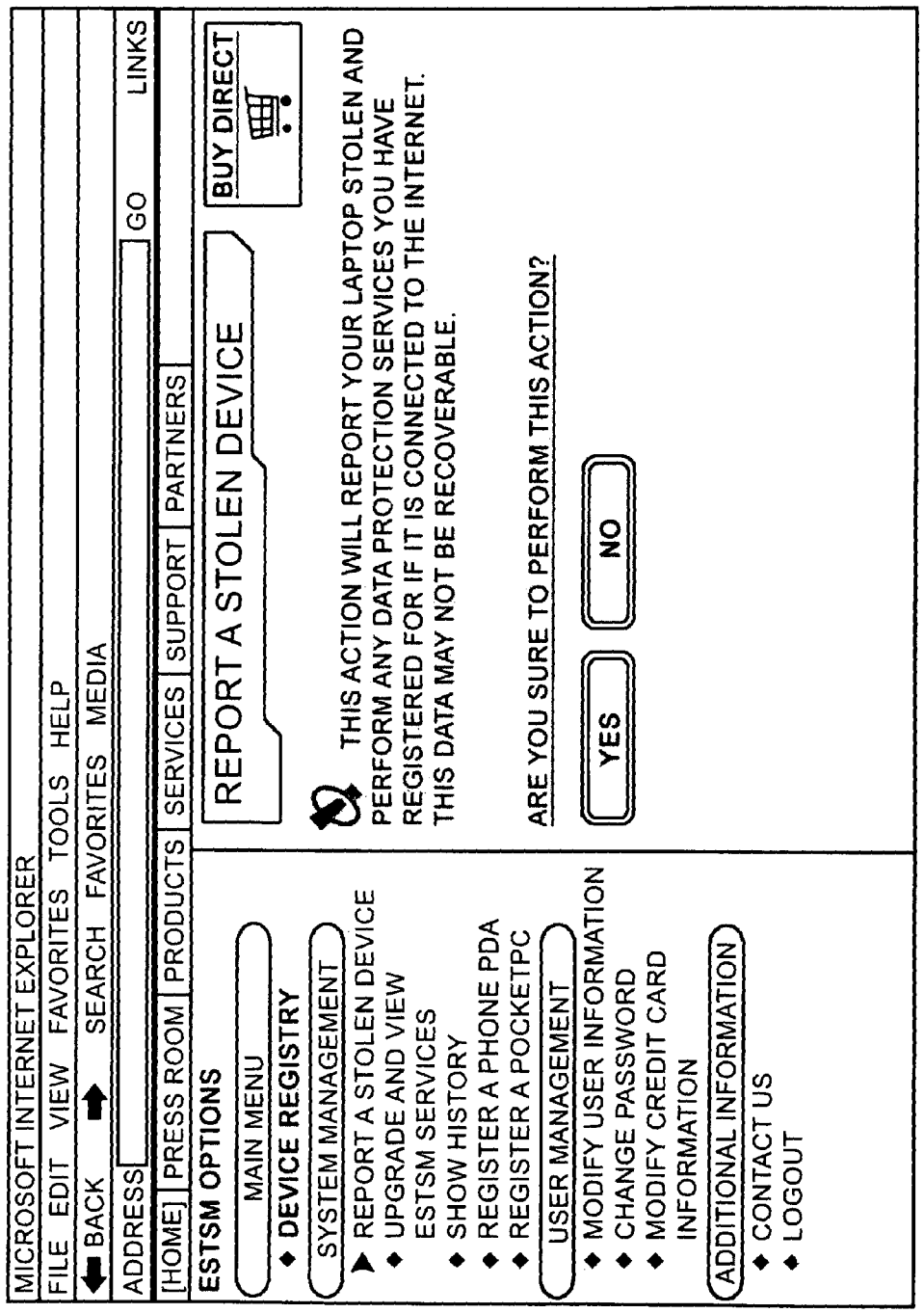

As shown in FIG. 7, the "Device Status" page shows for each electronic device, the Model Name, System Description, Current State, ESTSM Services Active on the Device, and Last Connection to ESTSM Server. Depending on the Current State and the services selected by the user, certain task buttons will appear below the electronic device information. These task buttons let you perform different operations on the device (e.g. report the electronic device stolen and so forth). As shown in FIG. 7, the user may click on the button labeled "Report Stolen" to start the process of reporting an electronic device stolen. The user will be taken to the "Report a Stolen Device" web pages shown in FIGS. 8a-8b. The user fills out the information on the web page to generate a theft incident report and the ESTSM site will log this report so that it may be given later to the appropriate authorities as proof of filing the theft incident report. This documentation may be provided to the user upon request.

Once the report is completed, the electronic device will be put in the REPORTED STOLEN state (states of ESTSM are described in detail below). At this point, if the electronic device is connected to the Internet, the electronic device state will change to either BEING TRACKED or DISABLED state.

Figure 72:
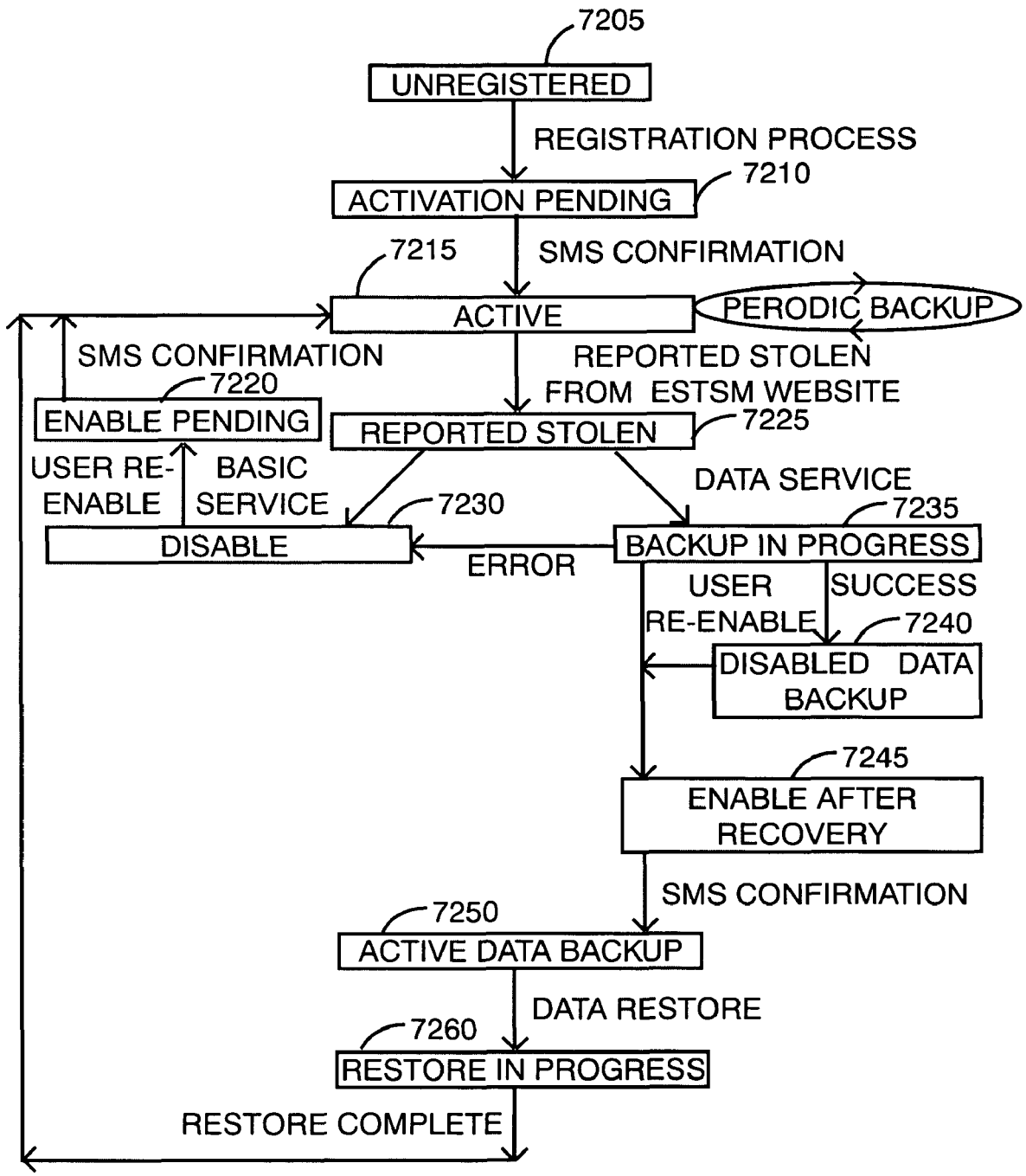
FIG. 72 shows the state transitions of a mobile device with SMS messages for activation and operation of ESTSM services.

In some other embodiments of the invention, mobile devices such as cell phones, Smart Phones, and Wireless Local Area Network (WLAN) capable computers that may be always connected to the ESTSM server and contacted at anytime by the server can communicate through a message passing scheme. Message passing schemes may be SMS, WWW message passing protocol based on Transmission Control Protocol/Internet Protocol (TCP/IP), or Multimedia Messaging Service (MMS). The state diagram for mobile devices is shown in FIG. 72.

If the electronic device is in the BEING TRACKED state, the user will receive an email, an example of which is shown in FIG. 9, documenting the location of the stolen electronic device. This location information may contain the following information: (1) IP address of the stolen electronic device (2) domain name on the Internet of the stolen electronic device (3) owner of the domain name (4) contact information for the domain name owner (5) name and contact information of the Internet Service Provider (ISP) and (6) date and time of IP address connection.

With this information, the user may pursue recovery with the appropriate authorities. The information provided may be used to track the exact location of the electronic device. For example, ISPs may identify the network port, cable modem or phone number from which the electronic device was connected when provided with the IP address, date and time of the connection. A location tracking report email will be sent to the user each time the electronic device is connected to the Internet. If the "Track and Disable" service option is selected, by the user, then only one tracking location will be recorded since the electronic device will be automatically disabled once the location is recorded.

In some embodiments of the invention, ESTSM registration as shown in FIG. 10 for a PDA, mobile cellular telephone, or Smart Phone device may be performed using another computer system that can display ESTSM registration web pages. In some embodiments of the invention, a different set of ESTSM services as shown in FIG. 11 may be offered for the PDA. Thus, the manufacturer may offer, but not be limited to, a Basic service and a Data backup service for the device as shown in FIG. 11.

Figure 13:
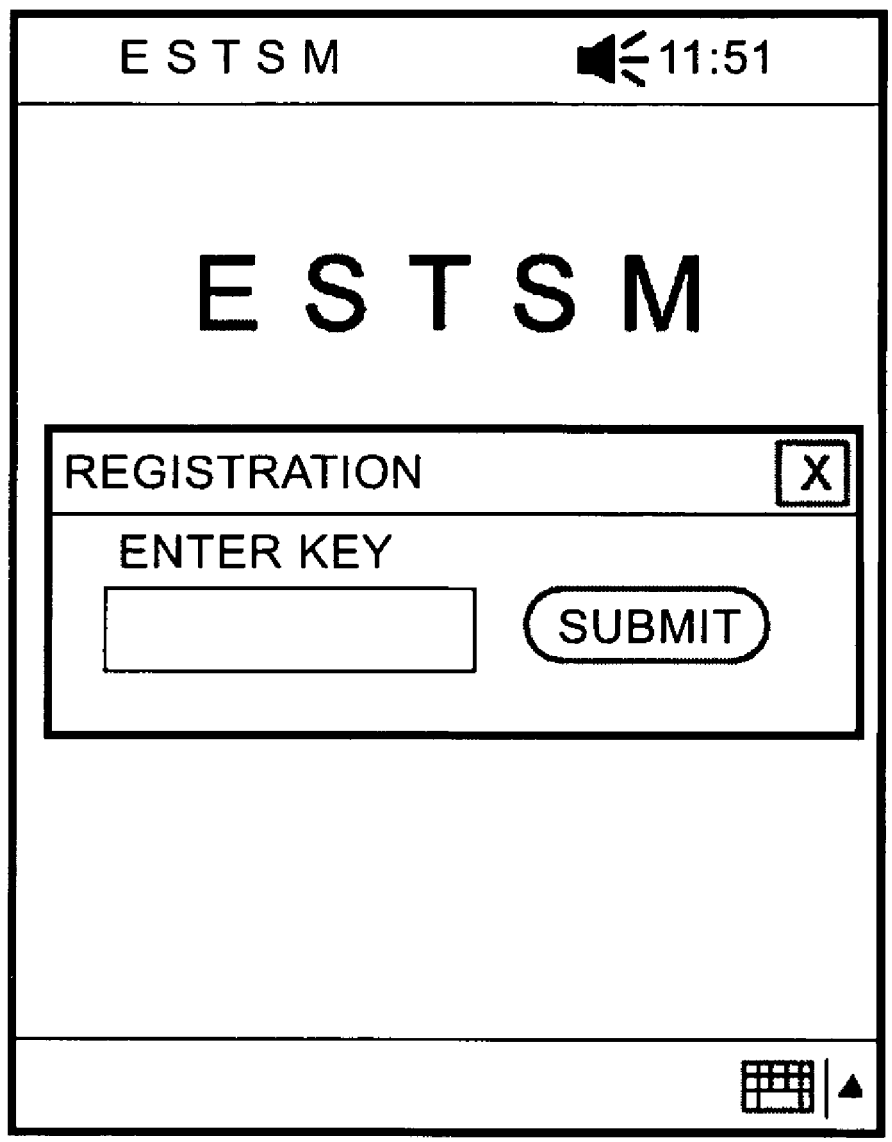
FIG. 13 shows for one embodiment of the invention a screen shot from a Pocket PC requesting the user enter the registration key shown in FIG. 12.
Figure 14:
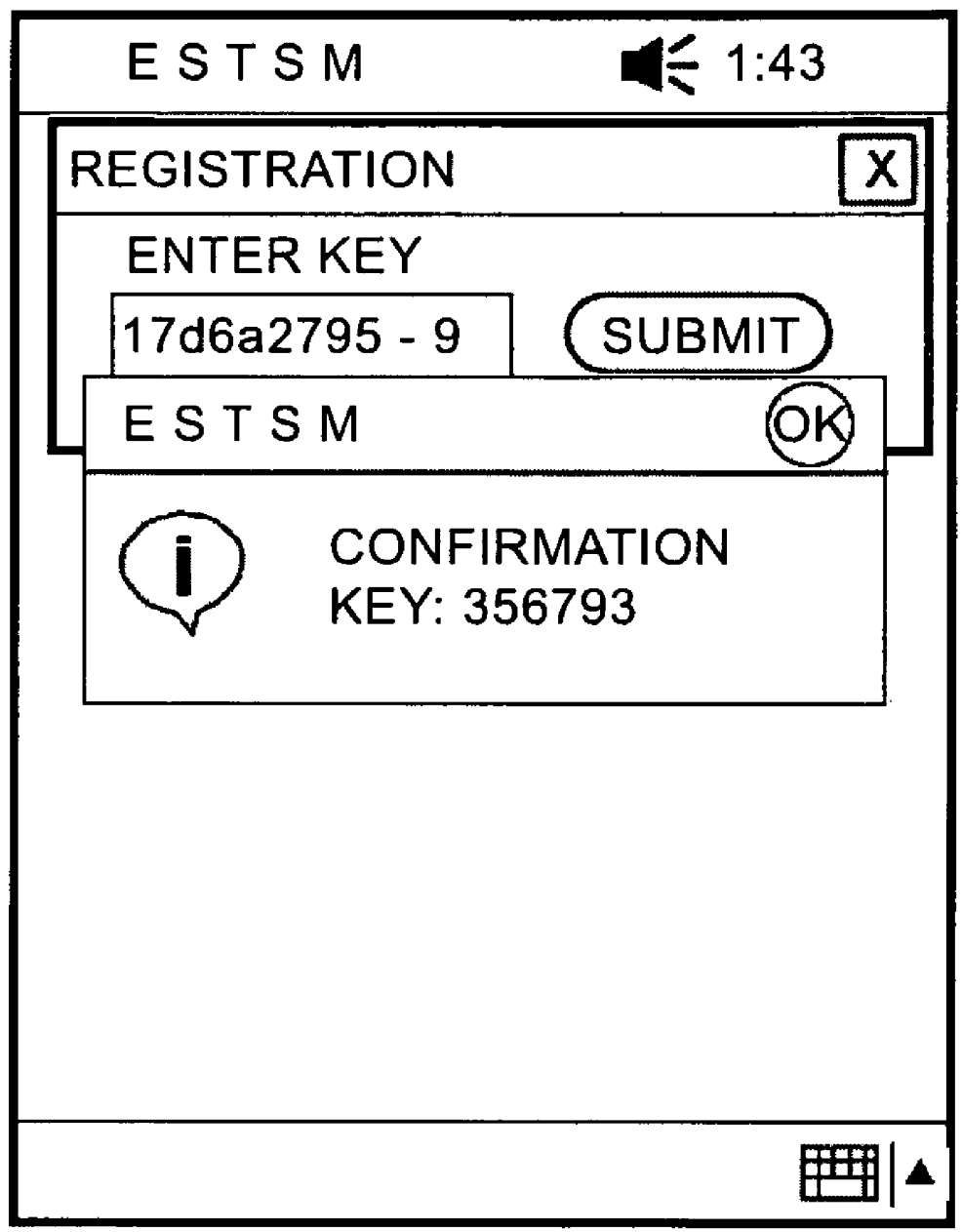
FIG. 14 shows a screen shot from a Pocket PC displaying a confirmation key generated after the user enters the registration key.
Figure 17:
FIG. 17 shows a screen shot from a computer system capable of displaying web pages indicating that the PDA is currently secured.

After the user has selected the ESTSM services for their PDA, in some embodiments of the invention, the ESTSM system as shown in FIG. 12 may request that the user interact with the ESTSM application on the PDA and enter the registration key into the device as shown in FIG. 13. Entering the registration key into the device may be the first step to start a multi-step registration process that ensures that the correct electronic device is being registered. The PDA will then display a confirmation key as shown in FIG. 14. The user through the computer system capable of displaying ESTSM web pages may then enter into the PDA verification screen shown in FIG. 15 the confirmation key and a system description. The registration process for the PDA is successfully completed as shown in FIG. 16 and the device is secured as shown in FIG. 17. In some other embodiments of the invention, ESTSM registration may not require any user intervention with the ESTSM electronic device except an acknowledgement from the user at the end of the successful registration.

Figure 18:
FIG. 18 shows a screen shot of the user authentication screen in accordance with one embodiment of the ESTSM invention that may be used by a call center operator to verify the identity of a user.
Figure 19:
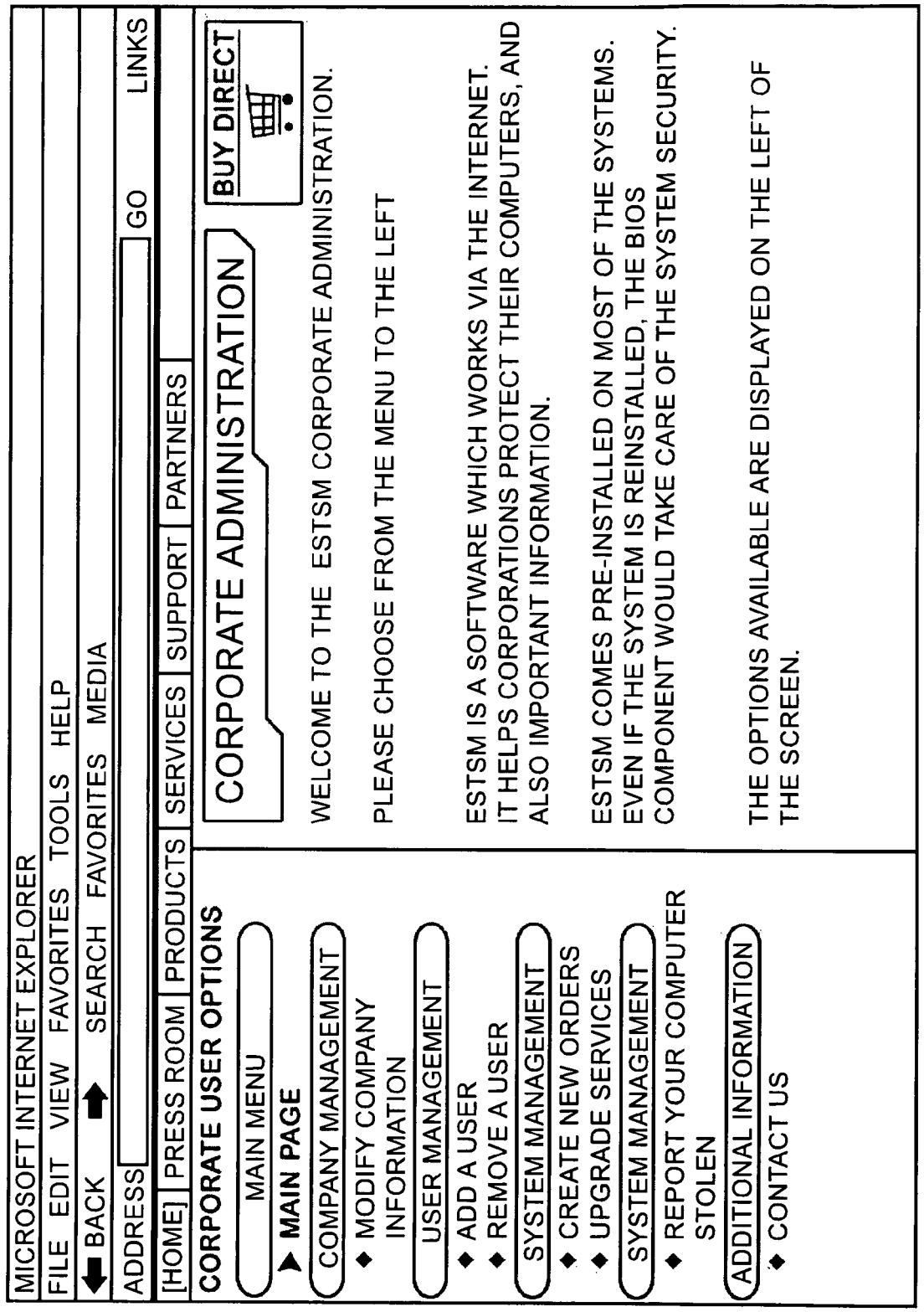
FIG. 19 shows a screen shot of the welcome page for corporate administration of ESTSM.

In some embodiments of the invention, an automated voice prompting system at a call center or live call center operator after authentication of the user as shown in FIG. 18 may communicate with the user to perform ESTSM activities. All ESTSM activities performed through the Internet may also be performed by the call center including registration, reporting a system stolen, reporting system has been recovered and so forth.

Figure 22:
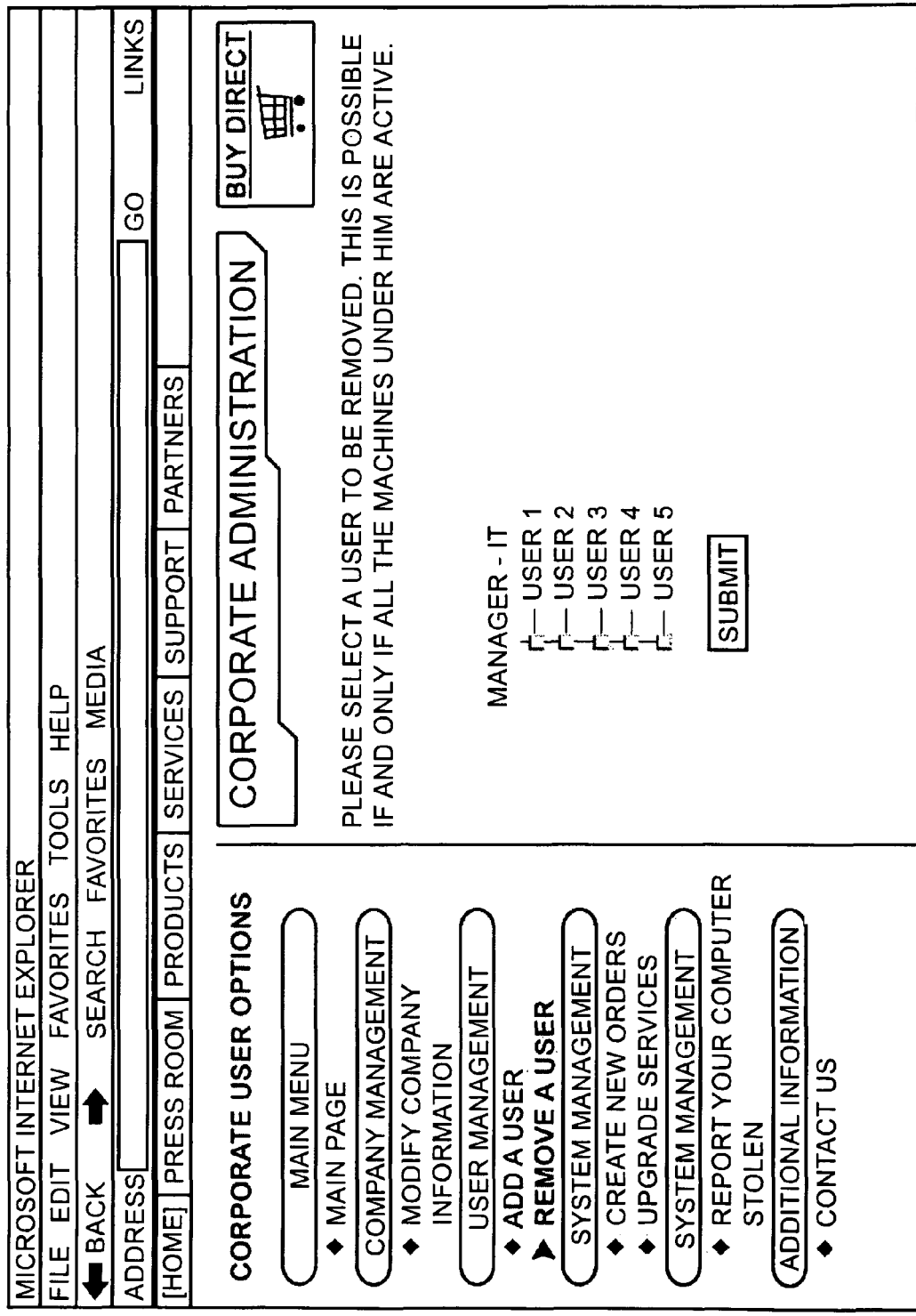
FIG. 22 shows a screen shot of a web page that allows a corporate administrator to remove a user's access to ESTSM.
Figure 23:
FIG. 23 shows a screen shot of a web page that allows a corporate administrator to purchase licenses for services in ESTSM.
Figure 24:
FIG. 24 shows a screen shot of a web page that allows a corporate administrator to purchase licenses to upgrade or modify services in ESTSM.
Figure 25:
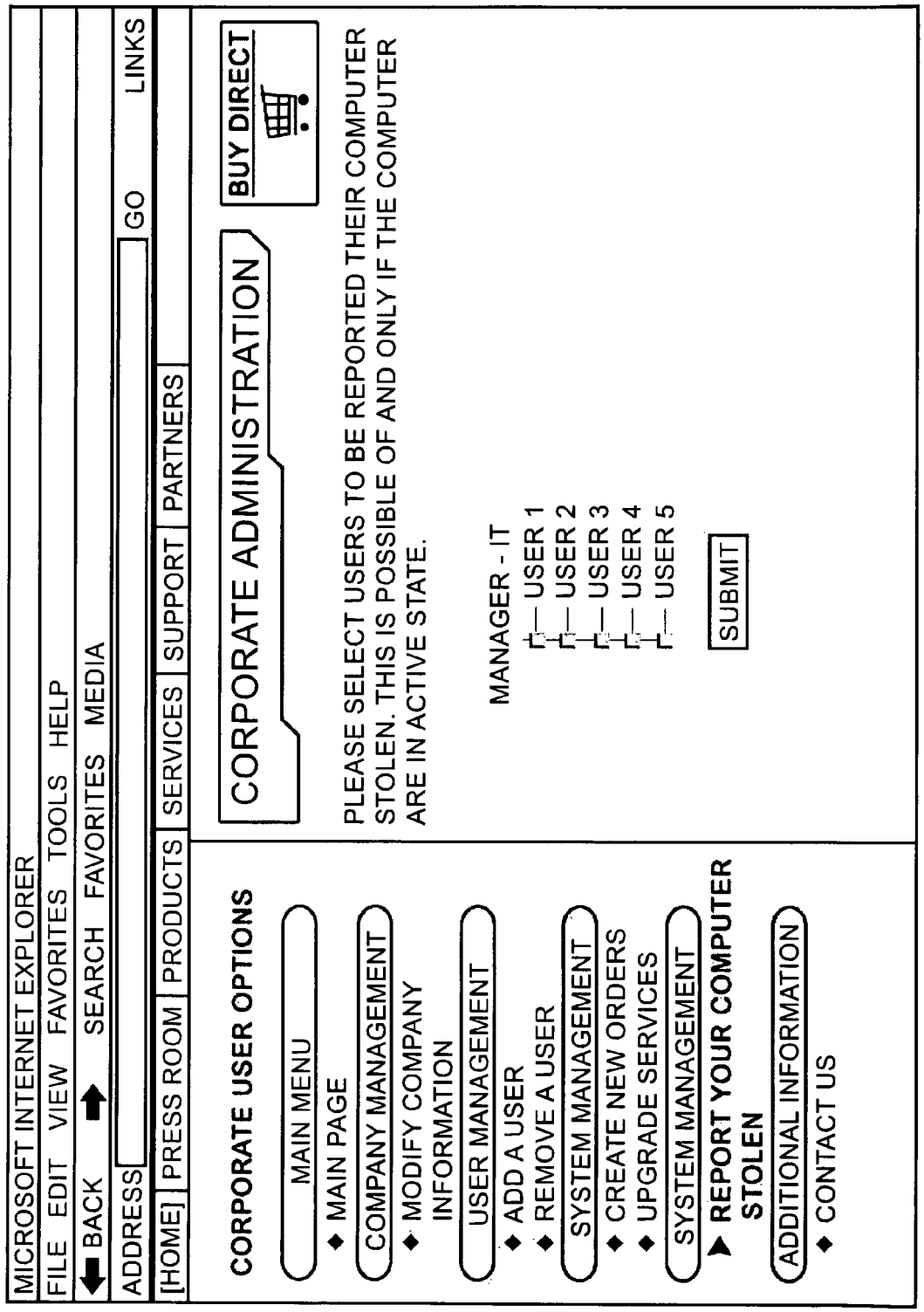
FIG. 25 shows a screen shot of a web page that allows a corporate administrator to give permission to users to report their computer stolen in accordance with one embodiment of the invention.
Figure 26:
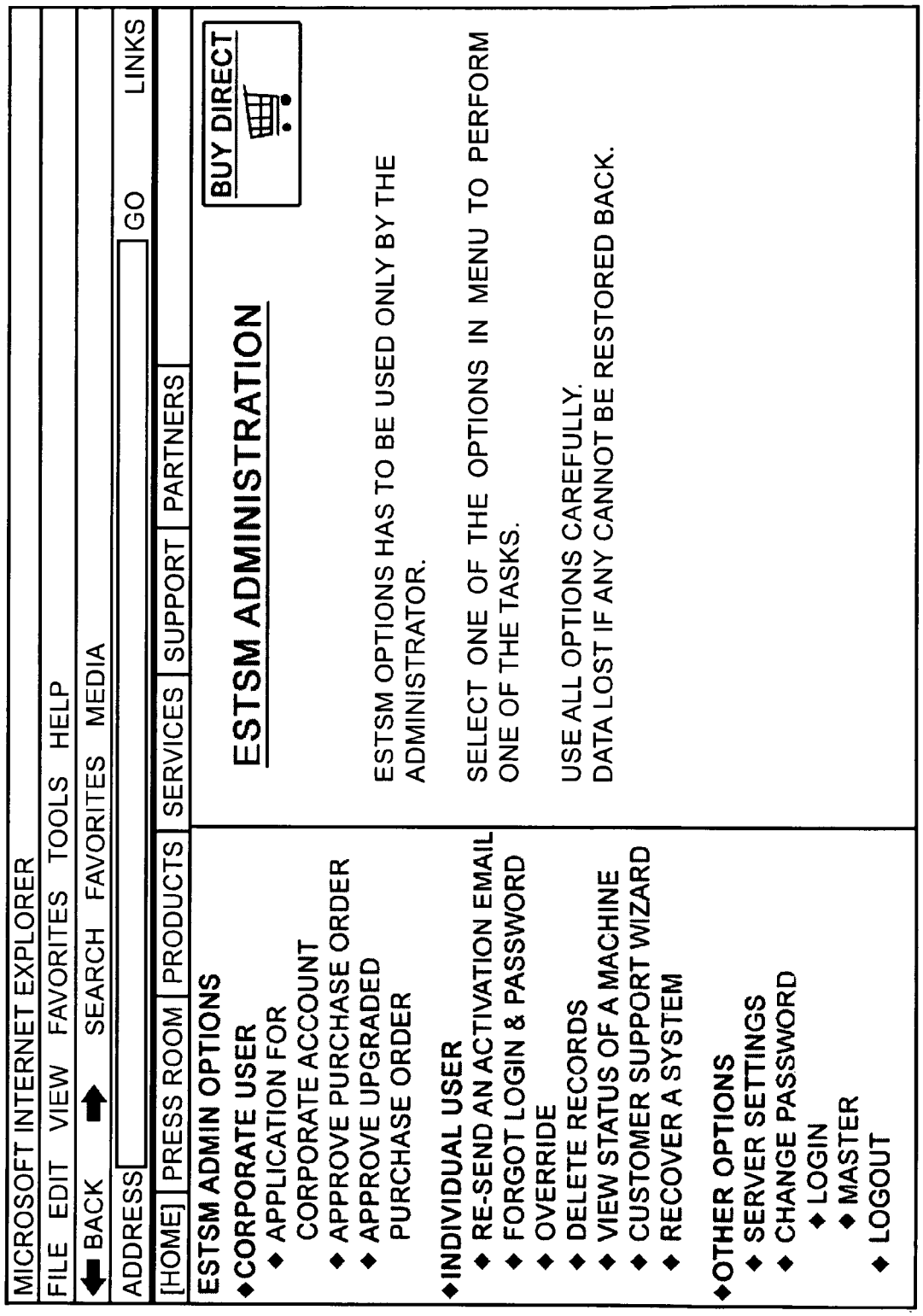
FIG. 26 shows a screen shot of a web page showing menu options selectable by a corporate administrator for administration of ESTSM.
Figure 27A:
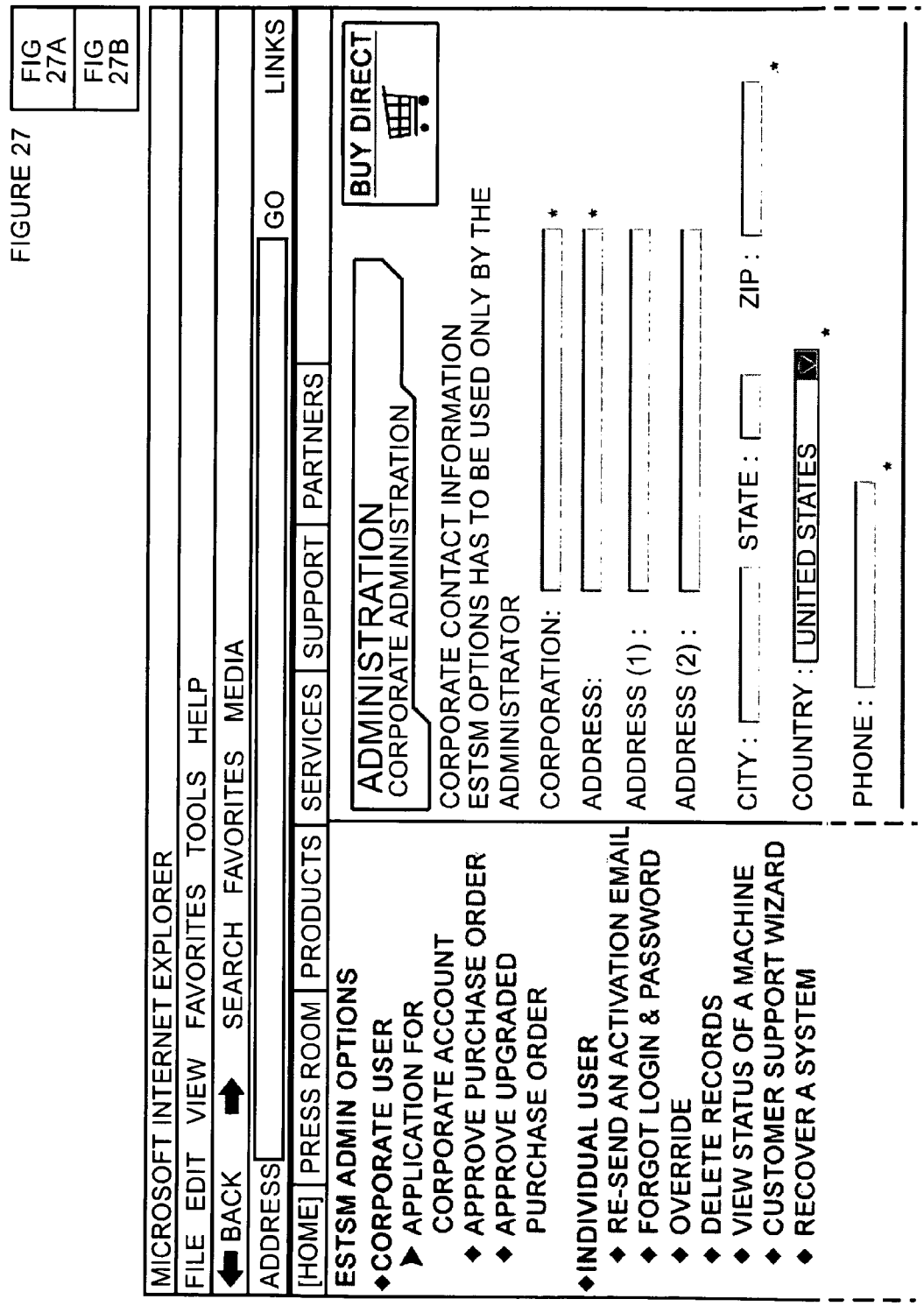
FIG. 27 shows a screen shot of a web page that allows a corporate administrator to create a corporate ESTSM account and register a super-user.

In most business or government organizations, a central IT staff is responsible for configuring, maintaining and purchasing licenses for electronic devices. ESTSM is designed to work easily in controlled corporate or government environments. Electronic devices registered to corporations or government entities using corporate/government registration may contain a different set of administration pages and user pages as compared to non-corporate users. In some embodiments of the invention, the corporate web pages may be as shown in FIGS. 19-25. Web pages for government entities would be similar to the corporate web pages shown in FIGS. 19-25. Corporate ESTSM systems may be designed to be centrally maintained and administered as required by corporate customers. When a corporate account is created, a central administrator or manager is specified. The central manager can then create other managers and users and purchase and assign licenses to these managers and users as shown in FIGS. 21 and 23-24. As shown in FIG. 21, the central manager can assign user permissions to other managers. Thus, the corporation can control which users are allowed to report stolen electronic devices as shown in FIG. 25, remove users as shown in FIG. 22, purchase more licenses, upgrade services, etc.

For electronic devices registered to corporations or government entities, the ESTSM may contain the user's position within the company and associate user permissions with that position as shown in FIG. 21. Thus, if a user leaves the company, the electronic device may be assigned to another employee transparently and without any change in service fees. The ex-employees account information on ESTSM may be disabled and removed as shown in FIG. 22, so that the ex-employee may not falsely report an electronic device stolen to disable access to the device.

Some embodiments of the registration and administration technique for electronic devices in ESTSM for corporations is shown in FIGS. 26-36*b*. A corporate administrator may access the ESTSM server computer system located in the monitoring station by calling the monitoring station or through the Internet. In some embodiments of the invention, the corporation or government entity may have the ESTSM server computer system located within their own premises for greater security and control. In this embodiment of the invention, the administrator can access the server system through a terminal connected to the server or from a computer system at a remote site connected to the server system through the Internet.

Figure 28A:
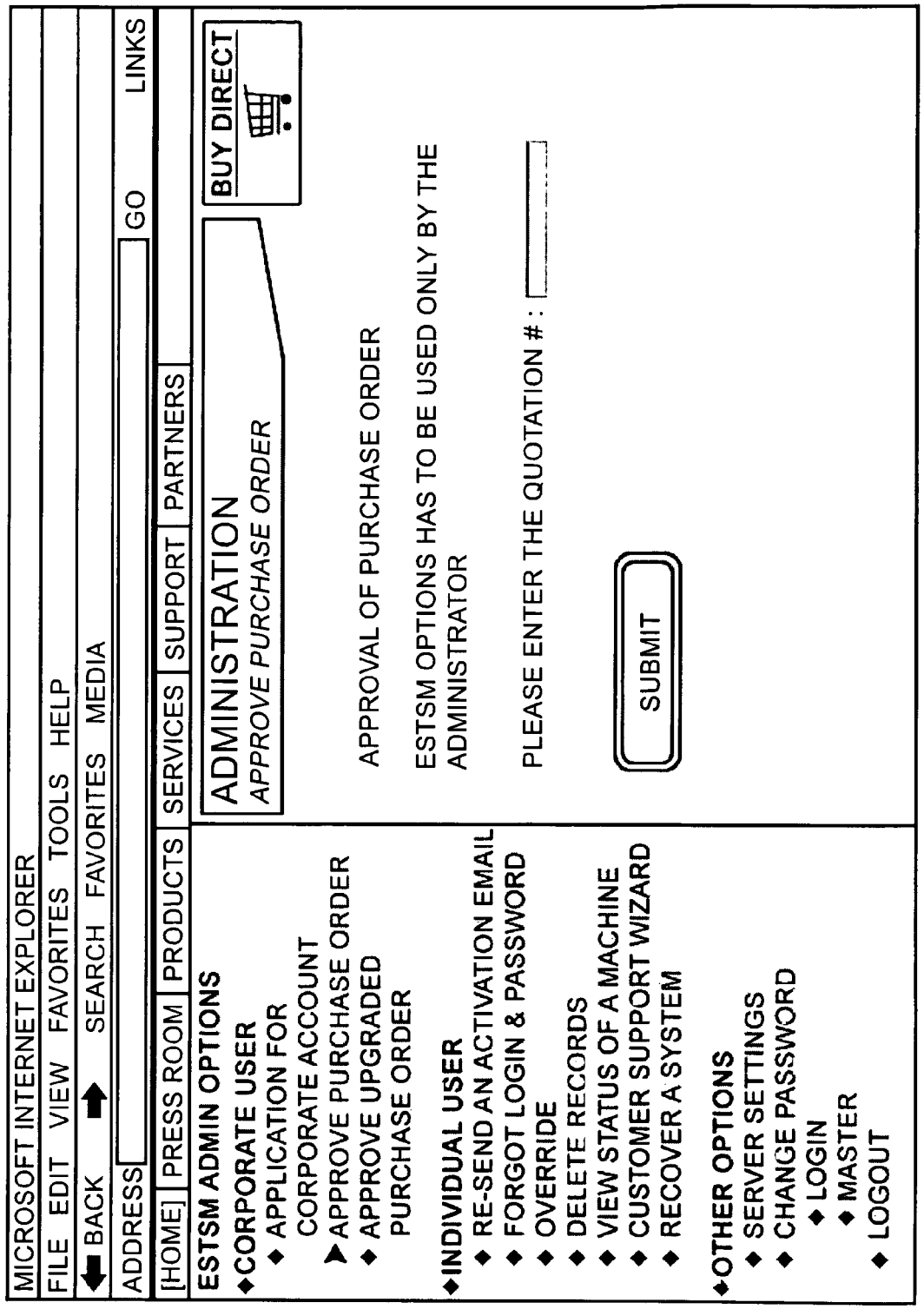
FIGS. 28a-28b show screen shots of a web page requesting a corporate administrator to enter a purchase order quotation number for basic or upgraded ESTSM services.
Figure 28B:
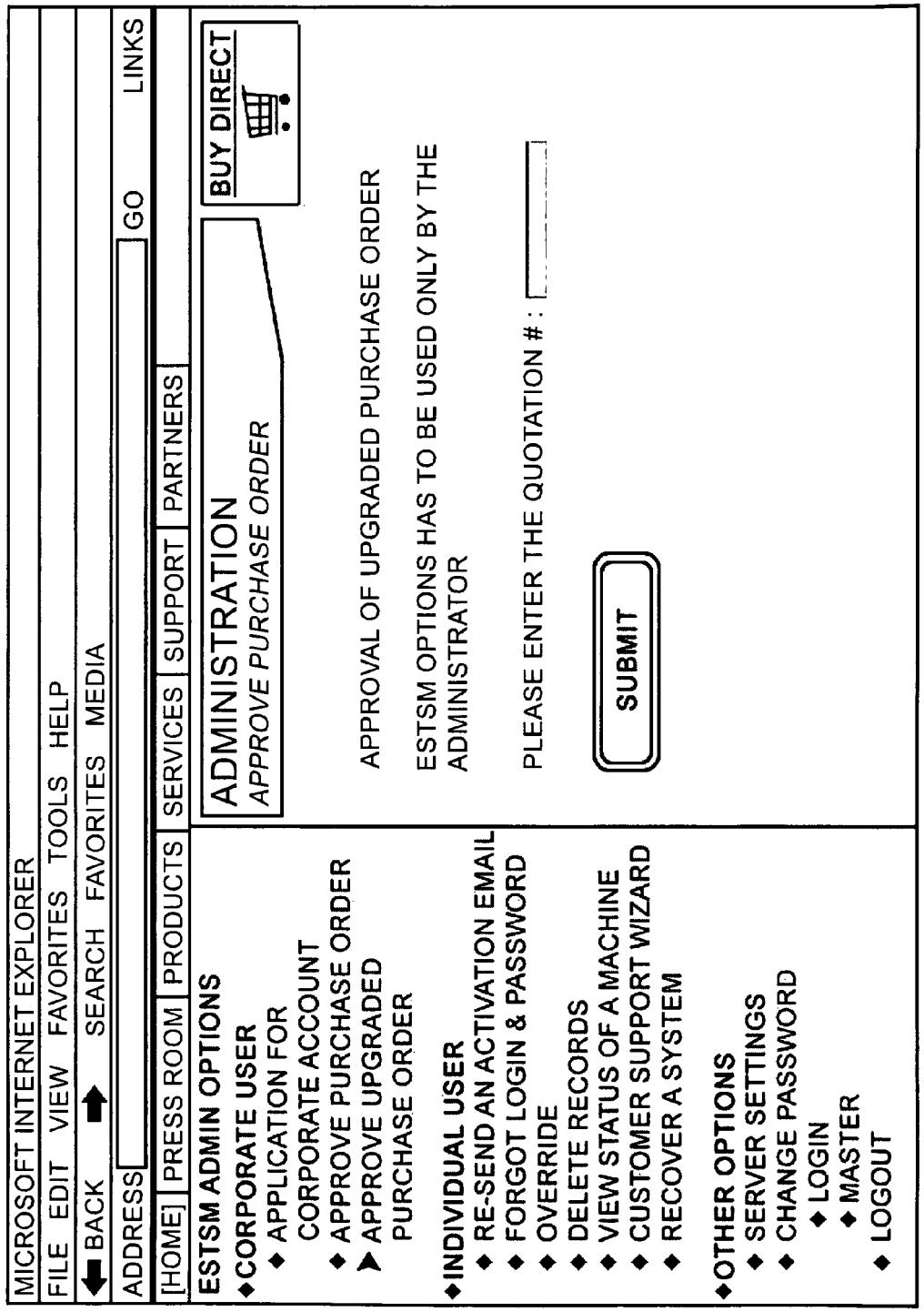

The corporate or government entity can setup a corporate account to use ESTSM. The corporation or government entity can purchase services licenses in "bulk" (i.e. 100 Data Destroy Services, 50 Tracking Services, etc). The licenses can be paid for via standard purchasing methods such as Purchase Orders as shown in FIGS. 28*a*-28*b*, net 30 day terms, etc. The corporation or government entity receives a license number for each purchase. This license number is given to the end users in the corporate or government entity who will consume the license. Alternatively, the corporation or government entity may pay a non-recurring one time fee for individual services.

The corporate or government end user will register in a similar fashion as described above. However, in some embodiments of the invention, when creating the username and password, the user can enter the license number for the "License Number" field as shown in FIG. 3*a*. In this embodiment of the invention, the end user will not be required to select the services as they will be determined by the services paid for in the license number. Also, the end user will not have to provide a credit card or other form of payment.

Figure 29:
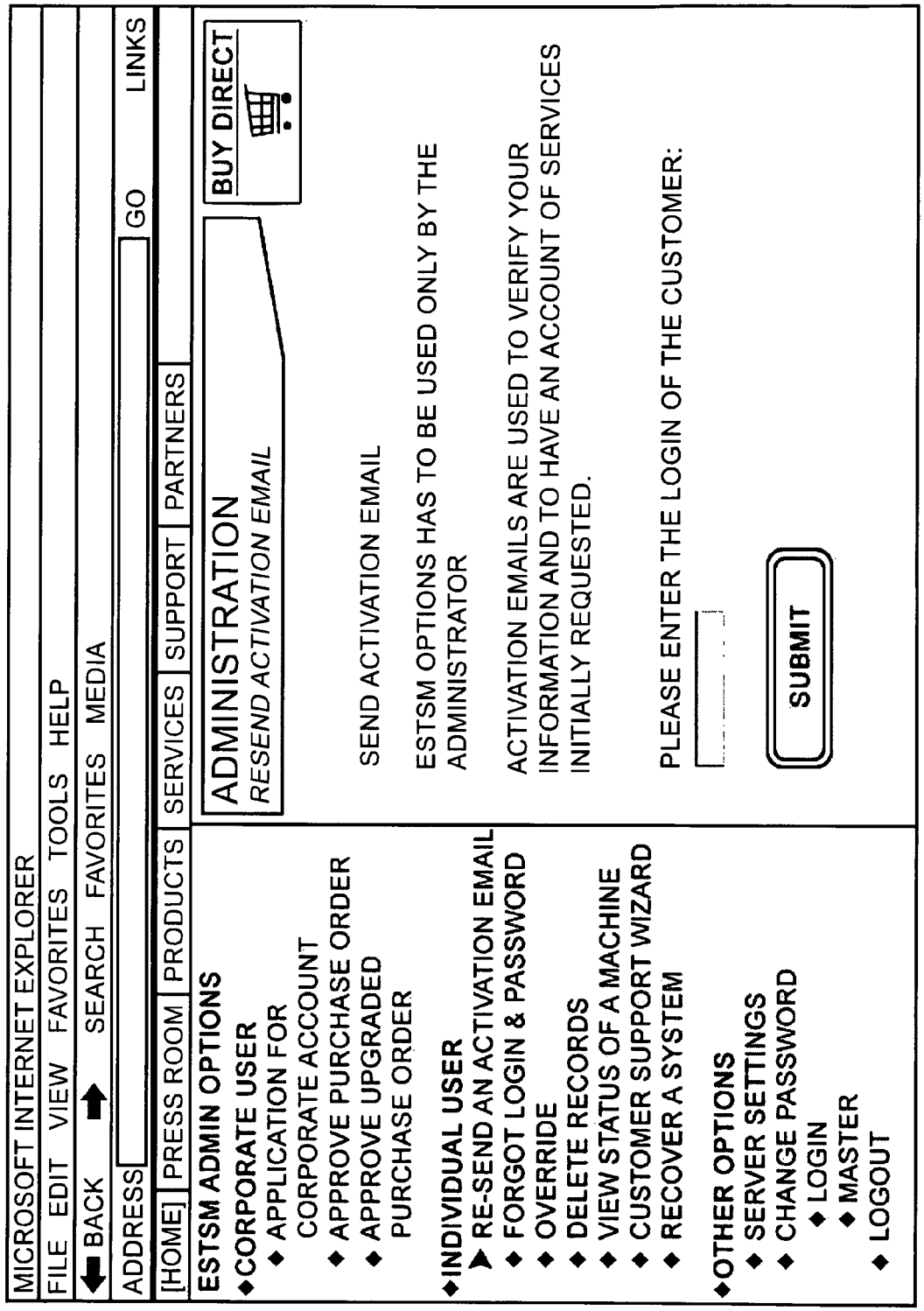
FIG. 29 shows a screen shot of a web page that allows a corporate administrator to send an email to a user indicating activation of ESTSM.
Figure 30:
FIG. 30 shows a screen shot of a web page that allows a corporate administrator to reset a login and password for a user.
Figure 31B:
FIG. 31 shows a screen shot of a web page that allows a corporate administrator to override ESTSM on an electronic device using a generated password.
Figure 32:
FIG. 32 shows a screen shot of a web page that allows a corporate administrator to stop a machine or user from accessing ESTSM services.
Figure 34A:
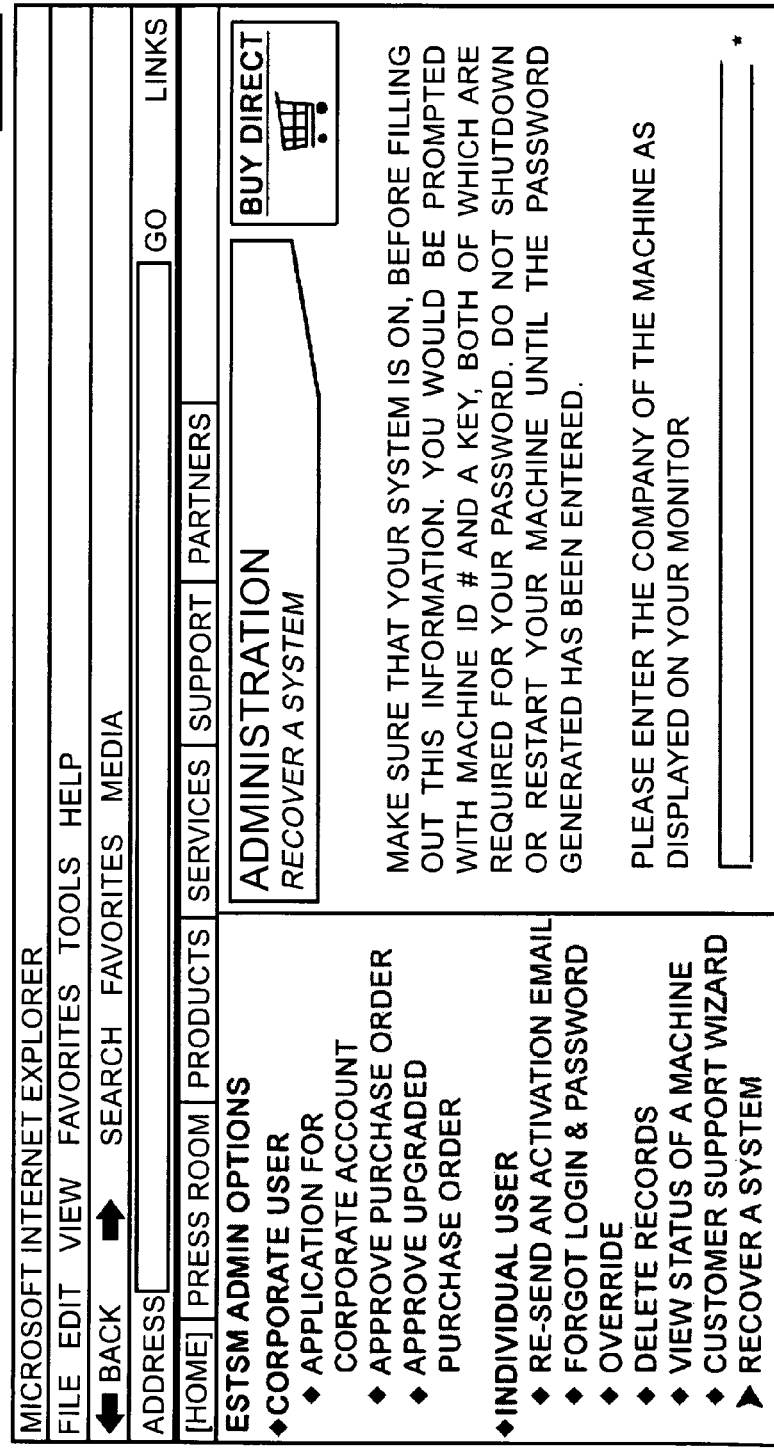
FIG. 34 shows a screen shot of a web page that allows a corporate administrator to recover an electronic device that has been reported stolen using a generated password.
Figure 34B:
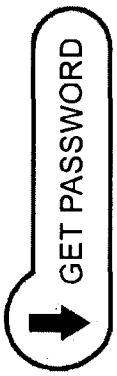
Figure 35:
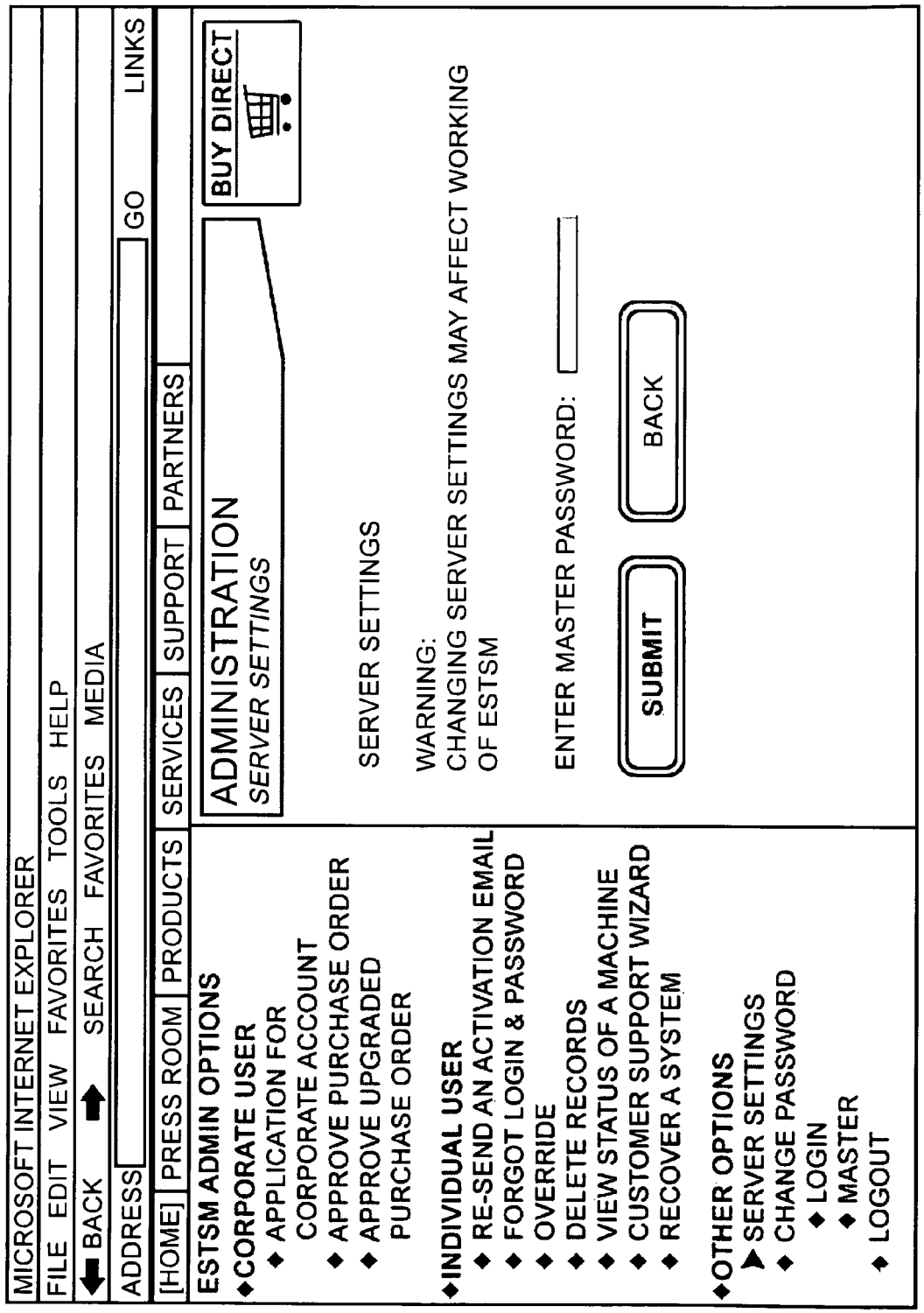
FIG. 35 shows a screen shot of a web page that allows a corporate administrator to change the settings of the ESTSM server.
Figure 36A:
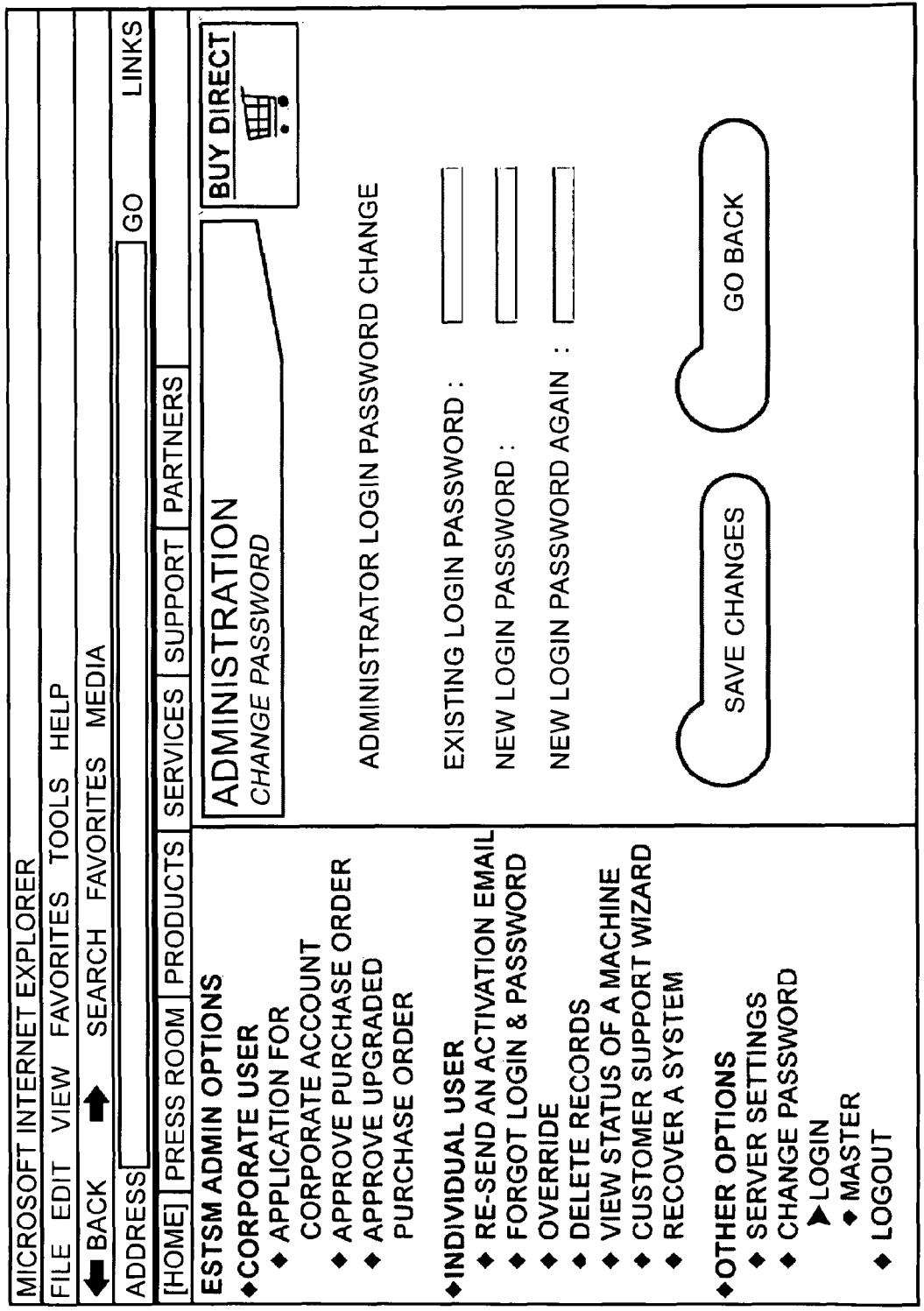
FIGS. 36a-36b show screen shots of web pages that allow a corporate administrator to change administrator login and master passwords.
Figure 36B:
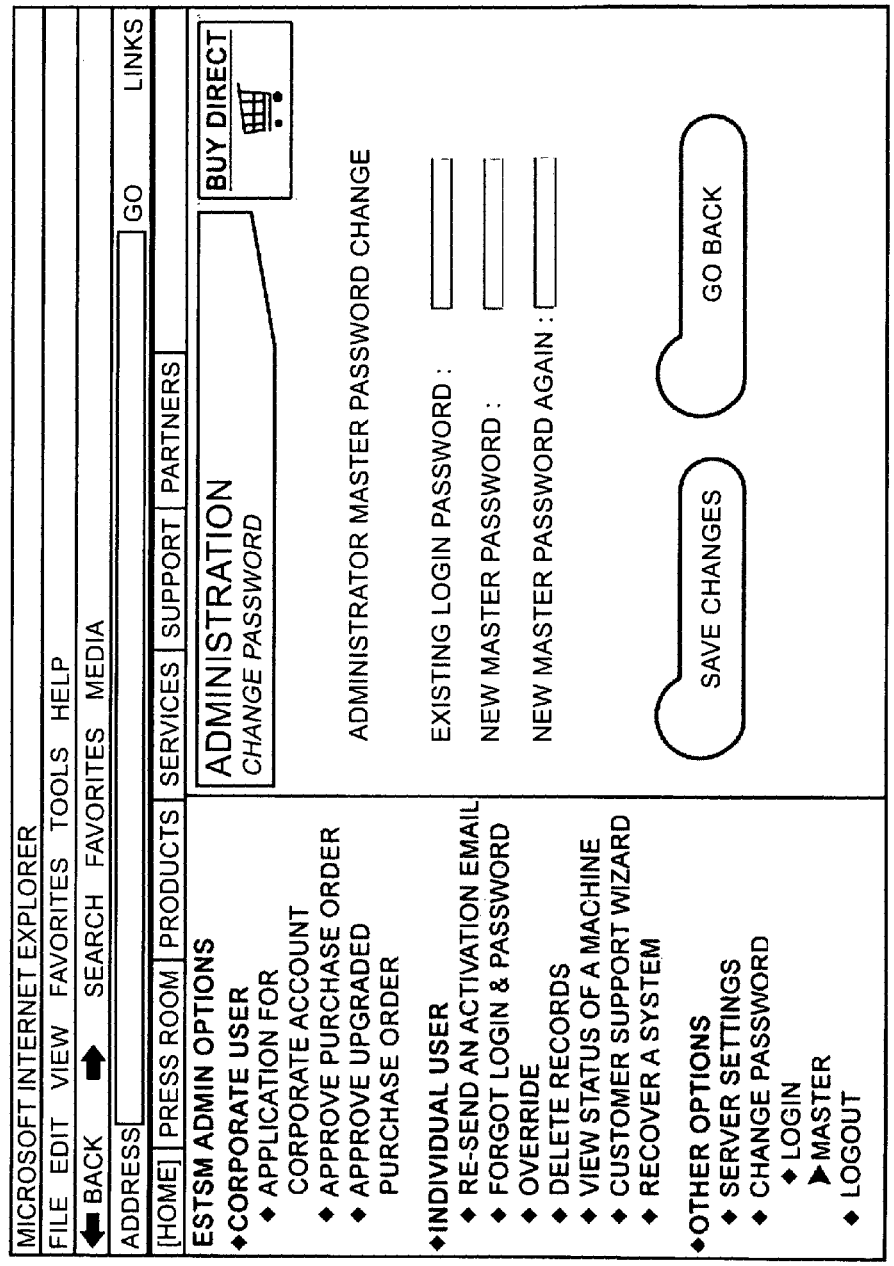

The administrator of the corporate or governmental ESTSM account can manage and configure the electronic devices in the corporation or government entity that have the ESTSM application installed. Thus, for example, the administrator may re-send an activation email to a user of an ESTSM enabled electronic device as shown in FIG. 29 or send a login and password reminder to the user as shown in FIG. 30. The administrator may override an individual user's access to an electronic device as shown in FIG. 31, deregister an electronic device from the ESTSM system, or remove user access to ESTSM enabled electronic devices as shown in FIG. 32. The current state of the electronic device (ACTIVE, REPORTED STOLEN, BEING TRACKED, DISABLED, HALF-RECOVERED, and so on as described in detail below) registered with ESTSM may be viewed by the corporate or government administrator by entering the machine id, the login id of the user, mobile phone number, or any other ESTSM device specific identification as shown in FIG. 33. The administrator can also perform other administrative tasks such as recover an ESTSM enabled system as shown in FIG. 34, change server settings as shown in FIG. 35, or change the administrator login password or administrator master password as shown in FIGS. 36*a*-36*b*.

The administrator may add new users to the ESTSM system and designate the rights and permissions of users so that these users have administrator capabilities. Users on a corporate or governmental ESTSM account may heave permission to report their ESTSM device stolen, perform user management functions, and so forth.

As mentioned above and shown in FIG. 7, the "Device Status" page displays task buttons below the electronic device information. The task buttons displayed depend on the current state of ESTSM and the services selected by the user. The task buttons let the user perform different operations on the device (e.g. report the electronic device stolen and so forth).

Each electronic device can have one of the following current states: ACTIVE, REPORTED STOLEN, BEING TRACKED, DISABLED and HALF-RECOVERED. The definition of each of the states is given below:

1. ACTIVE—This state indicates that ESTSM is actively running on the electronic device. The electronic device has not been reported stolen.
2. REPORTED STOLEN—This state indicates that the electronic device has been reported stolen by the user, but the electronic device in some embodiments of the invention has not communicated with the ESTSM server after being reported stolen.
3. BEING TRACKED—This state indicates that the electronic device has been reported stolen by the user and the electronic device has communicated with the ESTSM server. The ESTSM server has captured location information of the stolen device. Once the system is in the BEING TRACKED state, other actions can be performed such as disabling the electronic device (if the Continuous Track option has been selected) or erasing the hard disk drive (if Manual Data Destroy Service has been selected).
4. DISABLED—The stolen electronic device has been disabled by ESTSM. The system is now in the locked state and can not be used. If the system is recovered by the user, they will need to obtain the activation password to re-enable access to the electronic device.
5. HALF-RECOVERED—This state indicates that the electronic device has not been totally recovered. The user of the electronic device has reported that the device has been recovered. The user must enter the activation password on the electronic device to re-enable access.

The ESTSM system may also be in one of these other states:

1. NOT REGISTERED—The electronic device is not registered with the ESTM system. The device will be in this state if the user chooses not to register with ESTSM when prompted to do so upon first time power-on of the electronic device.
2. DE-REGISTERED—ESTSM is no longer active on this electronic device. The user may want to put the electronic device in this state in the event that the transfer of electronic device from one user to another is to take place. Once the electronic device is placed in the DE-REGISTERED state, the user must re-register the electronic device (which may involve re-paying service fees) to re-activate the electronic device.
3. USER REMOVED—For users of a corporate ESTSM system, the ESTSM corporate administrator may remove a user's access rights to the ESTSM system. This situation may occur when the user leaves the company.
4. NEVER REMIND—This state indicates that the user of the electronic device does not want to be reminded to register with the ESTSM system. This state may be entered if the user activates the "Never Remind" option in the registration process. After activating "Never Remind", the user may register with ESTSM by manually selecting "Register Now" option on the ESTSM application icon and successfully completing the registration process.
5. REGISTERED NOT ACTIVATED—In this state the user has successfully registered the electronic device through the registration process but has not clicked on the link sent with the activation email to complete the registration process.
6. GOING TO DISABLE—This state indicates that the user has selected the "Disable" option after the electronic device has been reported stolen and is being tracked.
7. OVERRIDE—This state indicates that ESTSM has been disabled temporarily by the user. This may be because the application component is not able to communicate with the ESTSM server computer system. To use the electronic device while in this state, the user enters an activation password when prompted with a warning.
8. ERASE HARDDISK—This state indicates that the user selected "Data Destroy Services" option when registering with the ESTSM system. This state is entered after the user reports the electronic device as stolen and the device is connected to the Internet and tracked.
9. ACTIVATION PENDING—A message has been sent to the electronic device and the ESTSM server is waiting for an acknowledgment.
10. DISABLED DATA BACKUP—This state indicates that the electronic device is disabled after the data on the electronic device has been backed up.
11. ACTIVE DATA BACKUP—This state indicates that the device has been re-enabled after it was in the DISABLED DATA BACKUP state and a successful acknowledgment is received from the electronic device. In this state, the user may restore the data back on the electronic device from the backup on the ESTSM server.
12. BACKUP IN PROGRESS—In this state the electronic device has been disabled and the ESTSM server is in the process of getting the data from the device.
13. RESTORE IN PROGRESS—The user has requested that the data backed up on the ESTSM server be restored into the electronic device and the restore is in progress.
14. ENABLE PENDING—This state indicates that the stolen electronic device has been re-enabled and the ESTSM server has sent the message to the electronic device and is awaiting acknowledgment.
15. ENABLE AFTER RECOVERY—This state indicates that the electronic device was enabled from either the BACKUP IN PROGRESS state or the DISABLED DATA BACKUP state. The electronic device is sent a message and the state is changed after receiving a confirmation.

Figure 37:
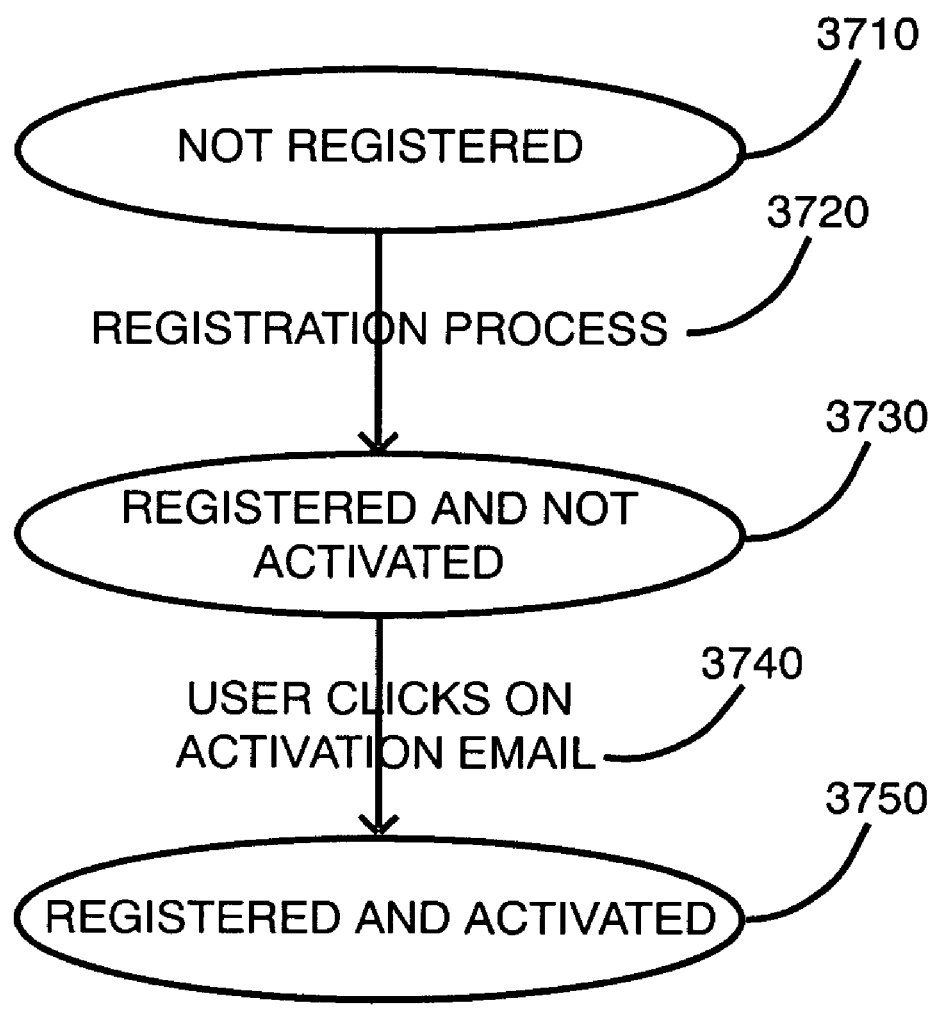
FIG. 37 shows the state transitions of an electronic device from a not registered state to registered and active state.

Turning now to FIGS. 37-44 and FIG. 72, state diagrams including the states described above and the conditions to enter and exit the states are shown. FIG. 37 shows the states and transitions of an electronic device in ESTSM from a not registered state to registered and active state. After the user goes through the registration process 3720, an electronic device in the not registered state 3710 transitions into the registered and not activated state 3730. Once the user clicks on an activation email 3740 on the electronic device or calls an activation telephone number, the device becomes registered and activated 3750.

Figure 38:
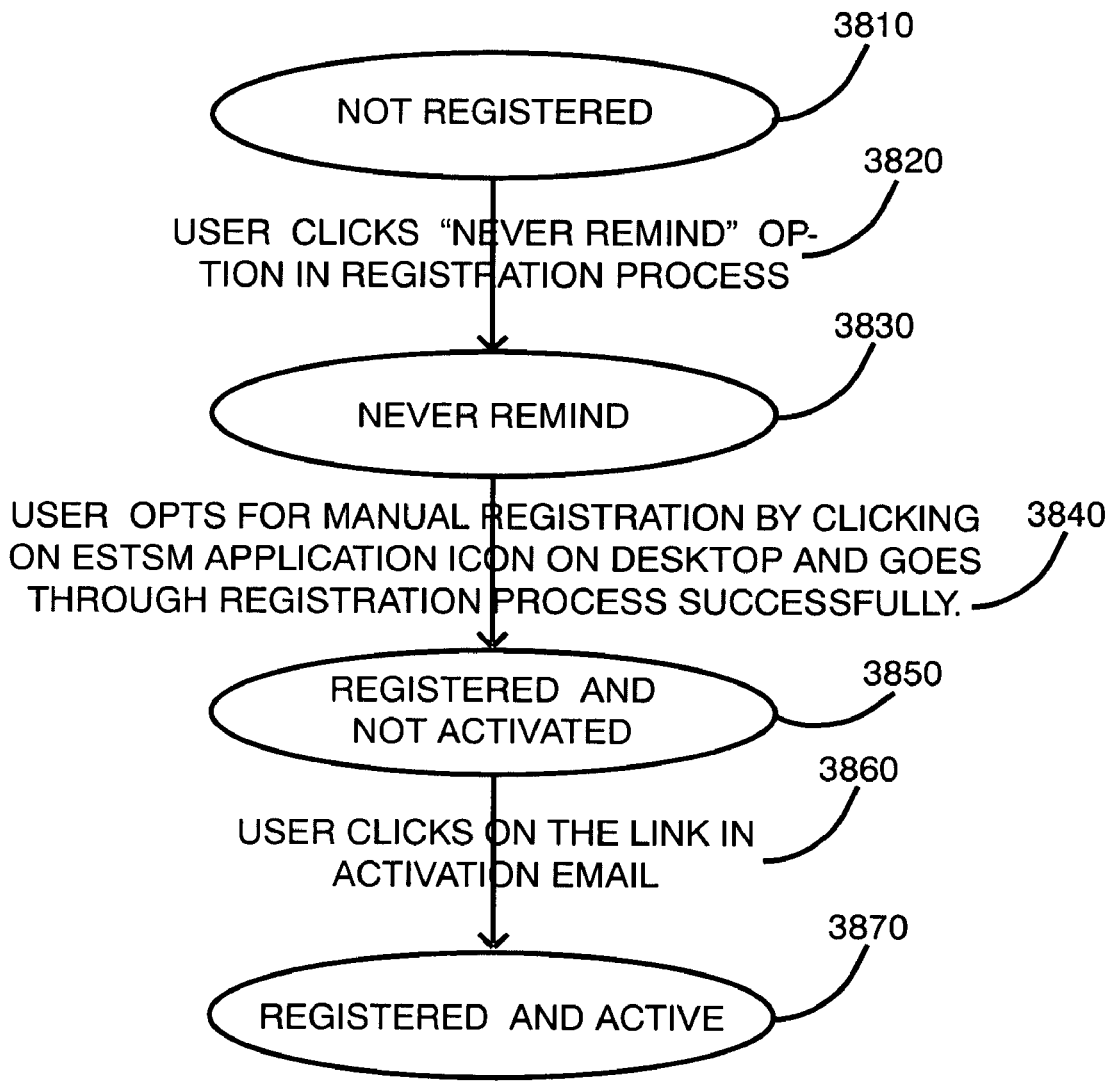
FIG. 38 shows the state transitions of an electronic device from a not registered state to registered and active state with the device passing through a never remind state.

Referring to FIG. 38, the states and transitions of an electronic device in ESTSM from a not registered state 3810 to registered and active state with the device passing through a never remind state are shown. If the user clicks the never remind option shown in FIG. 1, the electronic device transitions 3820 to the never remind state 3830. Next, if the user at a later time decides to manually register (i.e. in some embodiments of the invention by clicking on an ESTSM application icon on the graphical interface of the device and going through registration process 3840), the electronic device is placed into a registered and not activated state 3850. Once the user clicks on an activation email 3860 on the electronic device or calls an activation telephone number, the device becomes registered and activated 3870.

Figure 39:
FIG. 39 shows the state transitions of an electronic device from a registered and active state to deregistered state.

Referring to FIG. 39, the states and transitions of an electronic device in ESTSM from a registered and active state to deregistered state are shown. The user may decide they no longer want ESTSM services and select the "Stop ESTSM" option 3920 shown in FIG. 7. The electronic device that was previously in the registered and active state 3910 will transition to the deregistered state 3930 after selection of "Stop ESTSM."

Figure 40:
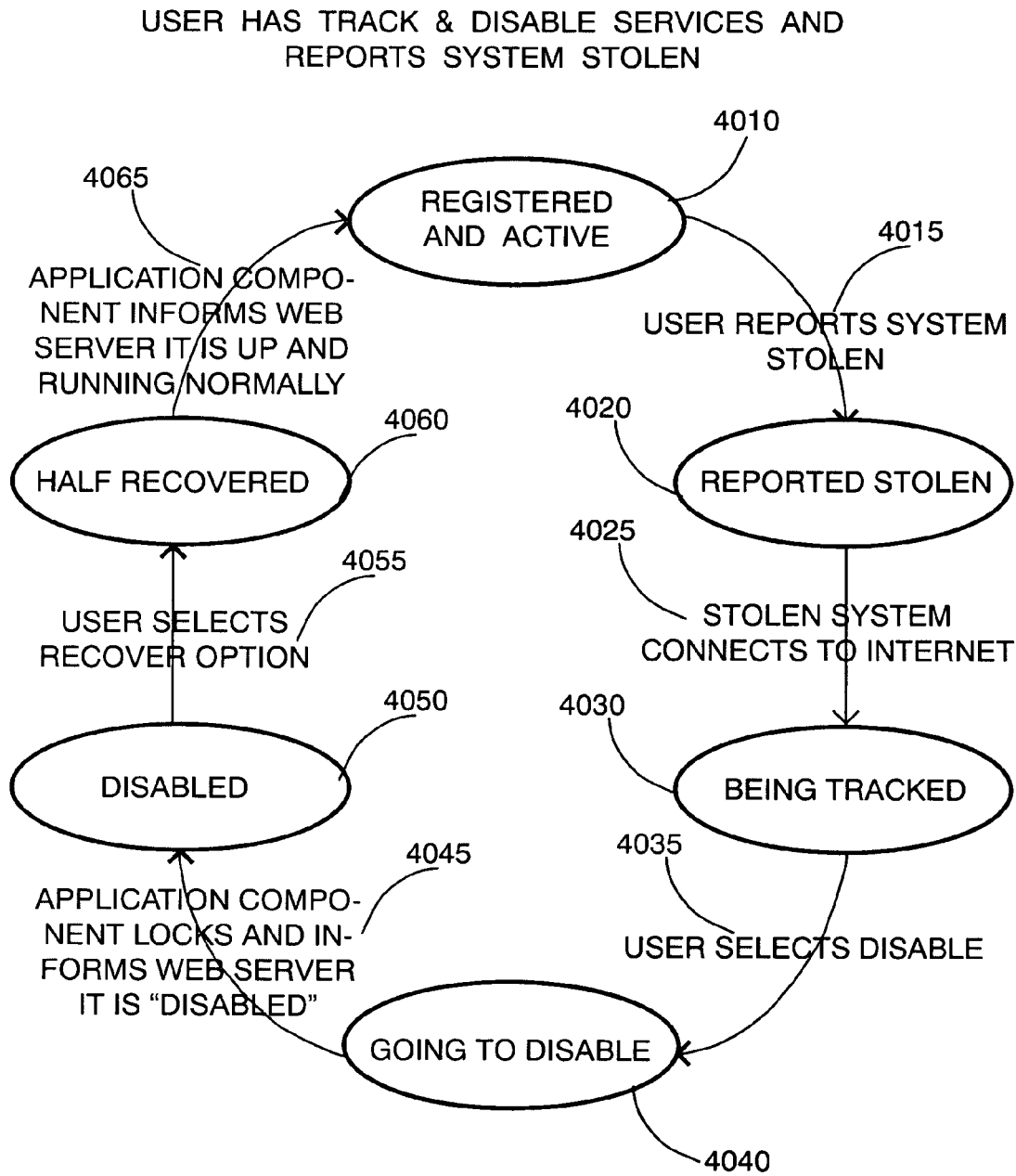
FIG. 40 shows the state transitions of an electronic device with ESTSM that is reported stolen and then recovered.

Referring to FIG. 40, the states and transitions of an electronic device in ESTSM that is reported stolen and then tracked, disabled, and recovered are shown. During registration and activation with ESTSM, the user must select the Track and Disable service option to activate the states and transitions shown in FIG. 40. Once the electronic device is registered and active with ESTSM 4010 and the user reports the system stolen 4015, ESTSM will place the device into the reported stolen state 4020. When the electronic device is next connected to the Internet 4025, ESTSM will begin tracking the device in the being tracked state 4030. The user is sent a location identification email shown in FIG. 9 and because the user had selected the track and disable service is again given the option to disable 4035. If the user selects disable 4035 then the electronic device is placed into the going to disable state 4040. The Application component on the electronic device disables the device 4045 and informs the ESTSM server computer system that the electronic device is in a disabled state 4050. If the user recovers the device and performs the recovery procedure 4055, the electronic device is placed into the half recovered state 4060. Next, the Application component on the electronic device informs the ESTSM server computer system that it is operating normally 4065 and the electronic device transitions back into the registered and active state 4010.

Figure 41:
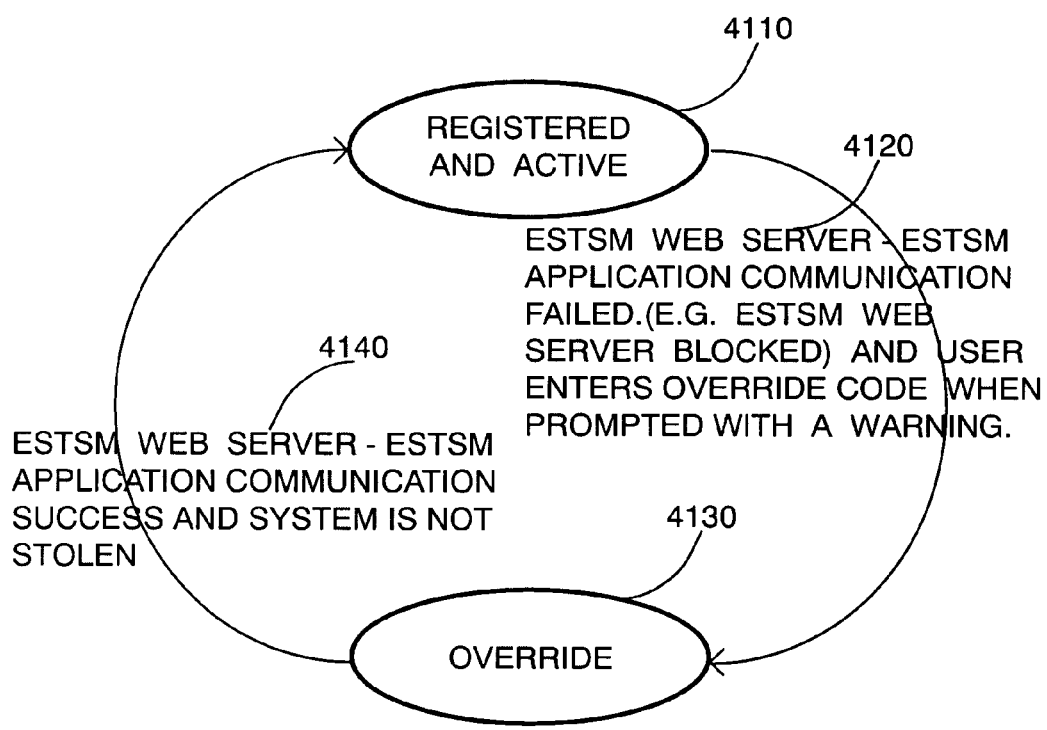
FIG. 41 shows the state transitions of an electronic device from a registered and active state to override state.

Referring to FIG. 41, the states and transitions of an electronic device in ESTSM from a registered and active state 4110 to override state 4130 are shown. As described above, to continue using the electronic device if the Application component on the electronic device is unable to communicate with the ESTSM server computer system, the user must enter an activation password 4120. ESTSM on the electronic device is then bypassed in the override state 4130. If the electronic device is not reported stolen and the ESTSM Application component re-establishes communication with the ESTSM server computer system 4140, the electronic device returns back to the registered and active state 4110.

Figure 42:
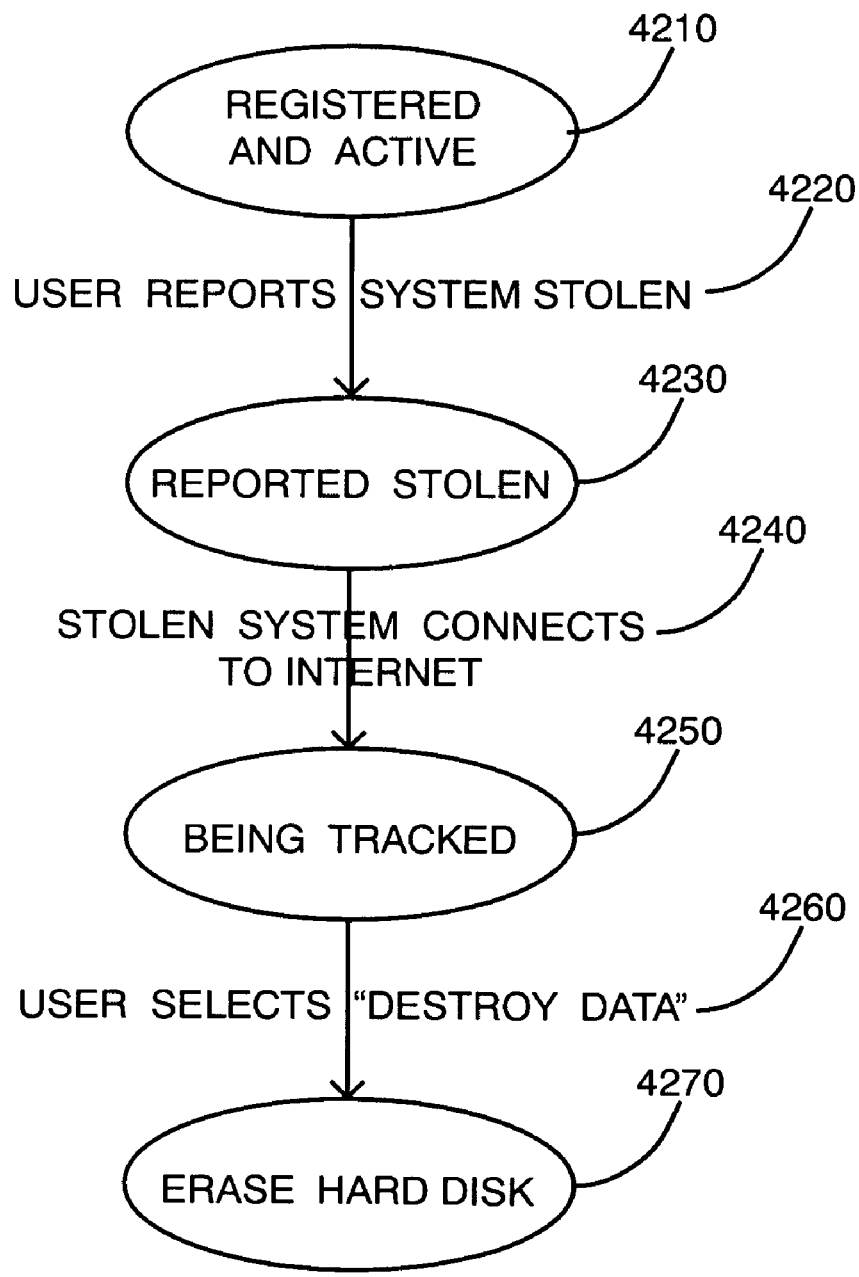
FIG. 42 shows the states of an electronic device registered and active with ESTSM and including the data destroy service.

Referring to FIG. 42, the states and transitions of an electronic device in ESTSM for the "Data Destroy Service" is shown. As shown in FIG. 2b, the user may select the "Data Destroy Service" that erases the electronic device hard disk drive. If the "Data Destroy Service" is selected, the electronic device registered and active 4210 with ESTSM may be reported stolen 4220 by the user. A stolen electronic device is placed into the reported stolen state 4230 and once the stolen device connects to the Internet 4240, it is placed into the being tracked state 4250. The user is sent a location identification email shown in FIG. 9 and because the user had selected the data destroy service is again given the option to select or bypass data destroy. If the user selects data destroy 4260, then the Application component on the electronic device erases the hard disk drive and the electronic device is in the erase hard disk state 4270.

Figure 43:
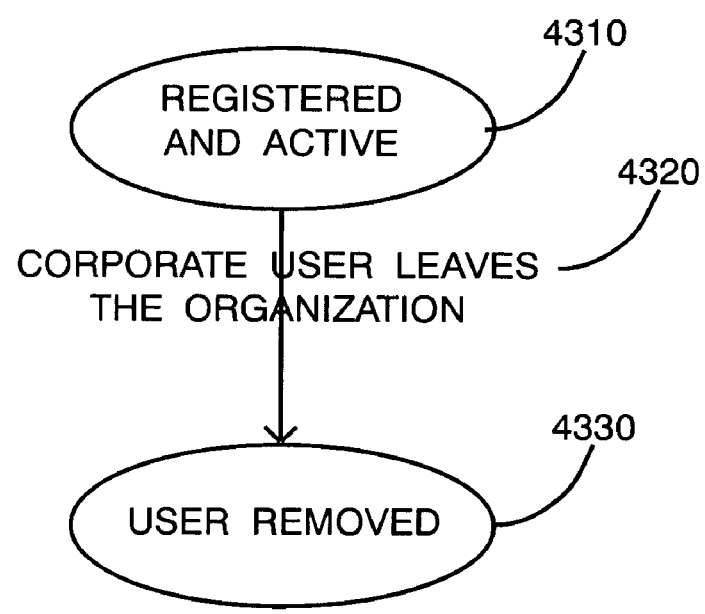
FIG. 43 shows the states of an electronic device registered and active with corporate ESTSM in which the corporate user of the device is removed from ESTSM.

Referring to FIG. 43, the states and transitions of an electronic device in which the corporate user of the device is removed from ESTSM is shown. As described above, a corporate user may have an electronic device which is registered and active 4310 with ESTSM. If ESTSM were not installed on the electronic device but rather the device was protected by a password known only to the user, the electronic device would be rendered unusable if the user left the organization. With ESTSM, if the corporate user leaves the organization 4320, the corporate administrator may remove the user's access rights to the ESTSM system. The electronic device used by the user is placed into the user removed state 4330.

If an electronic device is in the REPORTED STOLEN, BEING TRACKED or DISABLED state, the user can use a "System Recovered" interface that may be a button to bring the electronic device back to the ACTIVE state. The procedure after the electronic device is recovered may be different depending on the ESTSM services selected for the recovered electronic device and the current state of the electronic device. In some embodiments of the invention, the user may be required to fill out a recovery incident report, which documents the circumstances under which the electronic device was recovered.

The electronic device may be in the HALF-RECOVERED state when recovered, indicating that the electronic device is currently locked from boot access. The electronic device screen will show system information such as the manufacturer, model number and serial number of the electronic device and an unlock key. The electronic device screen will prompt the user to enter an activation password to re-enable boot access to the device. On the ESTSM website, after completing the recovery incident report, the user will be asked to enter the system information and unlock key indicated on the screen of the electronic device. The ESTSM server computer system will generate the activation password that the user can enter on the recovered electronic device to re-enable boot access.

From the ESTSM website, a user may also view the ESTSM services that are currently active on any of their electronic devices. The user may also add other ESTSM services and be billed accordingly. The user may also switch the options of certain services. For example, as shown in FIG. 2a, the user may switch from "Track and Disable" option to "Continuous Track" option under the "Tracking Service."

A user may be informed by the Application component of new services that are available for ESTSM. In some embodiments, the Application component may display a pop-up information message box that explains the new services along with pricing information. The Application component may optionally allow the user to purchase the new service using an interface in the message box.

The user may also view billing information about their account. The billing information will show all charges to the user's credit card and the services which were purchased along with the date of purchase.

The ESTSM server computer system includes electronic device status logs that show all the ESTSM activity for an electronic device. The user may view the electronic device status logs. These logs may be used to see when an electronic device was reported stolen, a summary of the tracking location information collected for an electronic device, date and times of recovery or device disabling events, and any other device status information.

The ESTSM website may also be used to update user information, such as address, telephone number, email address, and so forth. Also, the user's billing information such as the credit card number and expiration date may also be updated.

The user may want to upgrade the operating system or hardware (specifically the hard disk drive) on the electronic device. As described above, the ESTSM BIOS ensures that the ESTSM application components may not be removed from the hard disk drive. Thus, if the user upgrades to a new hard disk drive, the user will be asked to insert the electronic device's recovery media. In some embodiments of the invention, the recovery media may be a floppy diskette but in other embodiments the recovery media may be a Compact Disc-Read Only Memory (CD-ROM) or Universal Serial Bus (USB) key storage device. The ESTSM BIOS will prevent the system from booting until it detects the presence of the recovery media. The ESTSM BIOS component will automatically run a special program from the recovery media and this program will re-install all the ESTSM application components and special hidden partition on the hard disk drive (described in greater detail below). In some other embodiments of the invention where a special hidden partition is not present, the user may load the ESTSM application components into the hard disk drive directly.

The user has to take no special action to upgrade the operating system on an electronic device that already has the ESTSM components properly installed and running. When the user upgrades the OS, the ESTSM application components will also be maintained as part of the OS upgrade. If the ESTSM components are removed inadvertently, the ESTSM BIOS component will automatically re-install the ESTSM application components from a special hidden partition that exists on the hard disk. This operation will be transparent to the user.

Figure 44:
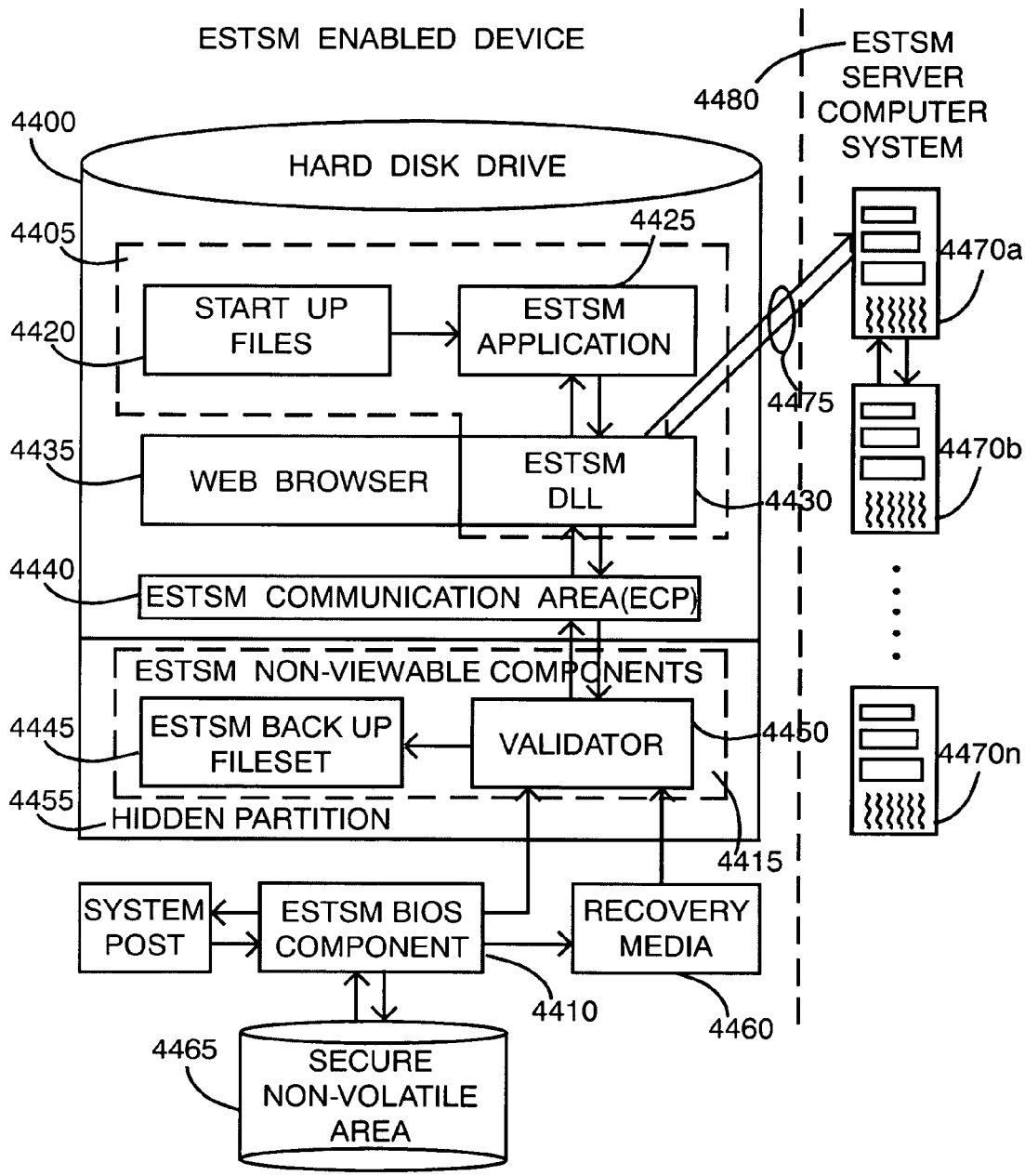
FIG. 44 shows the architecture of ESTSM including an electronic device and server computer system in accordance with one embodiment of the invention.

Turning now to FIG. 44, in some embodiments of the invention, the ESTSM architecture consists of application components 4405, non-viewable component 4415 and a BIOS component 4410 that work together to provide a secure environment for electronic device operation. The application components may be files stored on a hard disk drive (HDD) 4400 of the electronic device and may include startup files 4420, ESTSM application 4425, and ESTSM Dynamic Link Libraries (DLL) 4430. A web browser application 4435 connected to and capable of communicating with the ESTSM DLL 4430 may be present on the HDD. The application component runs within the operating system environment and is responsible for communicating with the ESTSM server computer system 4480 through the Internet 4475. Server computer system 4480 includes a number of servers 4470a, 4470b, 4470n that may be web servers containing the web pages and data for ESTSM described above. The application component 4405 determines from the ESTSM server computer system 4480 if the electronic device has been reported stolen, and if so, the application component takes the appropriate action based on the services the user registered for (i.e. disable electronic device, track location, erase hard disk drive, etc).

The BIOS component 4410 ensures that the application component 4405 cannot be removed from the system or bypassed in any way. The BIOS component 4410 consists of a small piece of code that resides in the system BIOS ROM image located in a secure non-volatile area 4465. In some embodiments of the invention, a non-viewable component 4415 program VALIDATOR 4450 resides on a special hidden partition 4455 of the hard disk drive and is executed during Power-On-Self-Test (POST) of the electronic device. Every time the electronic device boots up, the BIOS component 4410 will check the integrity of the ESTSM non-viewable component 4415 and application component 4405 programs and files, and restore the original programs and files, if they have been tampered with. Furthermore, the BIOS component 4410 will ensure that the application component 4405 has run properly on the previous device boot and will take action if it is determined that an attempt to bypass the application component 4405 has occurred.

In some embodiments of the invention, the BIOS component 4410 consists of a BIOS ROM image that is integrated into the system BIOS. The non-viewable component 4415 consists of a VALIDATOR program 4450 which resides in a special hidden partition 4455 created by ESTSM. Together, the ROM image and VALIDATOR cooperate to make sure that someone cannot bypass or circumvent the ESTSM application component 4405 from running. This is done by the ESTSM BIOS in the three ways shown below. In this document, reference made to "ESTSM BIOS" may refer to the code in the BIOS ROM image or VALIDATOR or combination of both.

1. Validating the integrity of the ESTSM special hidden partition 4455 and VALIDATOR program 4450. The ESTSM hidden partition 4455 contains the VALIDATOR program 4450 and also contains a copy of the original application component fileset 4445. If the ESTSM hidden partition 4455 has been deleted from the electronic device's hard disk drive 4400 or in some other way altered, the ESTSM BIOS ROM image component will detect this and effectively force re-installation of the partition 4455 and original fileset 4445 from the recovery media 4460. This prevents someone from simply low level formatting the hard disk drive, or just replacing the hard disk drive with a new blank disk to bypass ESTSM. The ESTSM VALIDATOR program 4450 can then "re-install" the ESTSM application component 4405 from the ESTSM Backup (Original) fileset 4445 on the special hidden ESTSM partition 4455 of the hard disk drive 4400.

2. Verifying that the application has been run on each boot. The ESTSM BIOS implements a messaging protocol with the ESTSM application components 4405 to ensure that the ESTSM application components 4405 are run on every boot. This messaging protocol utilizes the ESTSM Communications Area (ECA) 4440. In order to bypass ESTSM, someone may delete key ESTSM application files in an attempt to prevent the ESTSM application from running. Furthermore, the thief may develop applications that will prevent ESTSM from running on every boot even though it is correctly installed on the electronic device's hard disk drive. The ESTSM application and BIOS components work together to make sure that the ESTSM application runs on every boot. If the ESTSM application component does not run after the electronic device has booted, the ESTSM system will allow the electronic device to boot a limited number of times and attempt to run the ESTSM application component. If the ESTSM application component does not run during any of these retries, the electronic device will be prevented from booting after system POST. For devices like PDA or Smart Phones this procedure is not required since the application component is not removable or replaceable.

3. Disabling a stolen electronic device reported as stolen so it may not boot the operating system. If the ESTSM application component 4405 detects that the electronic device has been reported stolen, it will inform the BIOS of the theft and freeze the system. If the thief powers off the electronic device and attempts to boot the system again, the ESTSM BIOS will prevent the system from booting the operating system. If the electronic device is recovered and returned to the original user, the user can "unlock" the device as described above so it can boot.

Figure 45:
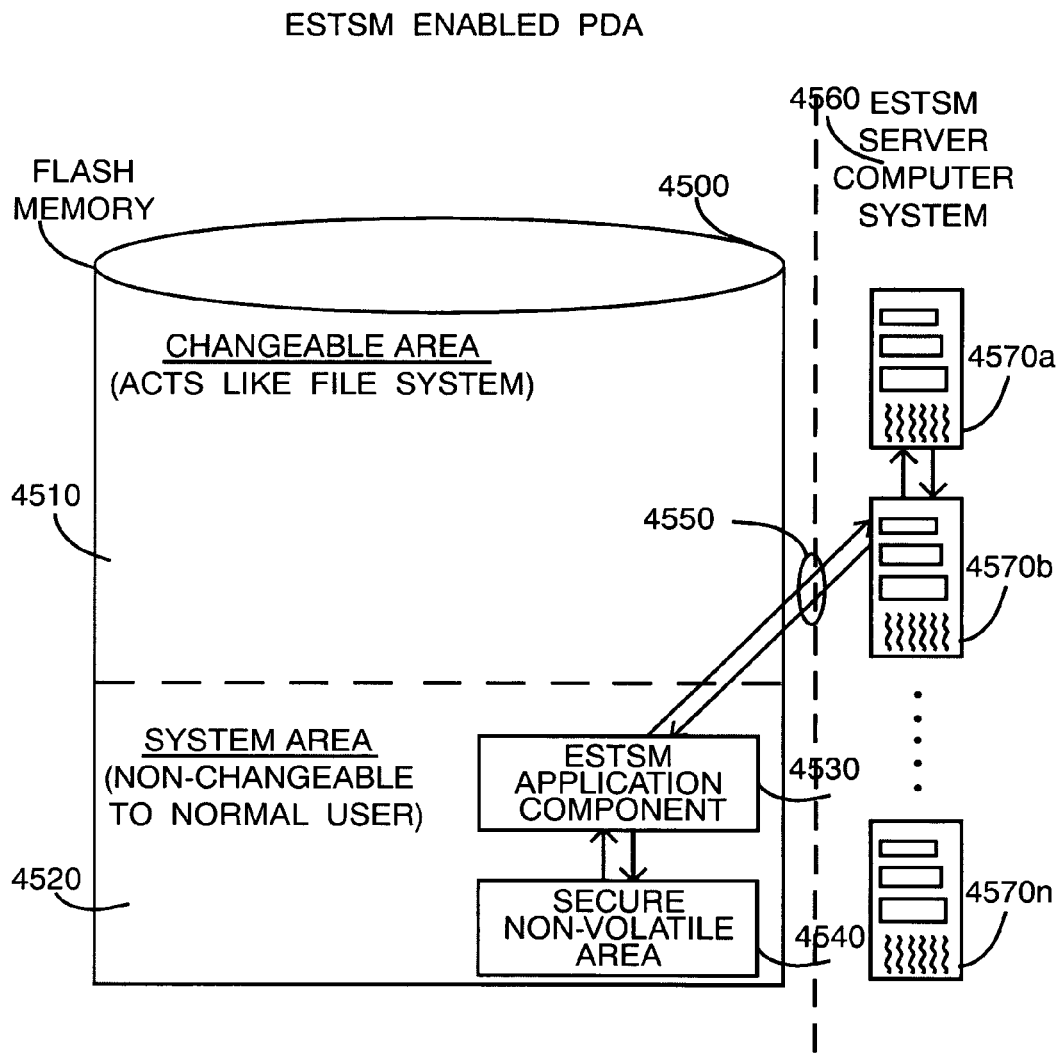
FIG. 45 shows the architecture of ESTSM in accordance with some other embodiments of the invention for PDA or mobile phone connected to server computer system.

In some embodiments of the invention as shown in FIG. 45, the architecture for an ESTSM enabled PDA, WLAN capable computer, mobile phone that in some embodiments may be a cell phone, or Smart Phone may include a Flash memory 4500 containing a changeable area 4510 and a system area 4520. The system area 4520 may include application components 4530 containing ESTSM application programs and a secure non-volatile area 4540 coupled to the application components 4530. In some embodiments of the invention, the system area 4520 may be non-viewable and implemented in non-volatile memory. The ESTSM enabled PDA, WLAN capable computer, mobile phone, or Smart Phone may continuously communicate to an ESTSM Server Computer System 4560 through an always-on Internet connection 4550 or other mobile device communication protocols such as Short Messaging Service (SMS). Server computer system 4560 includes a number of servers 4570a, 4570b, ... 4570n that may be web servers containing the web pages and data for ESTSM described above.

Figure 46:
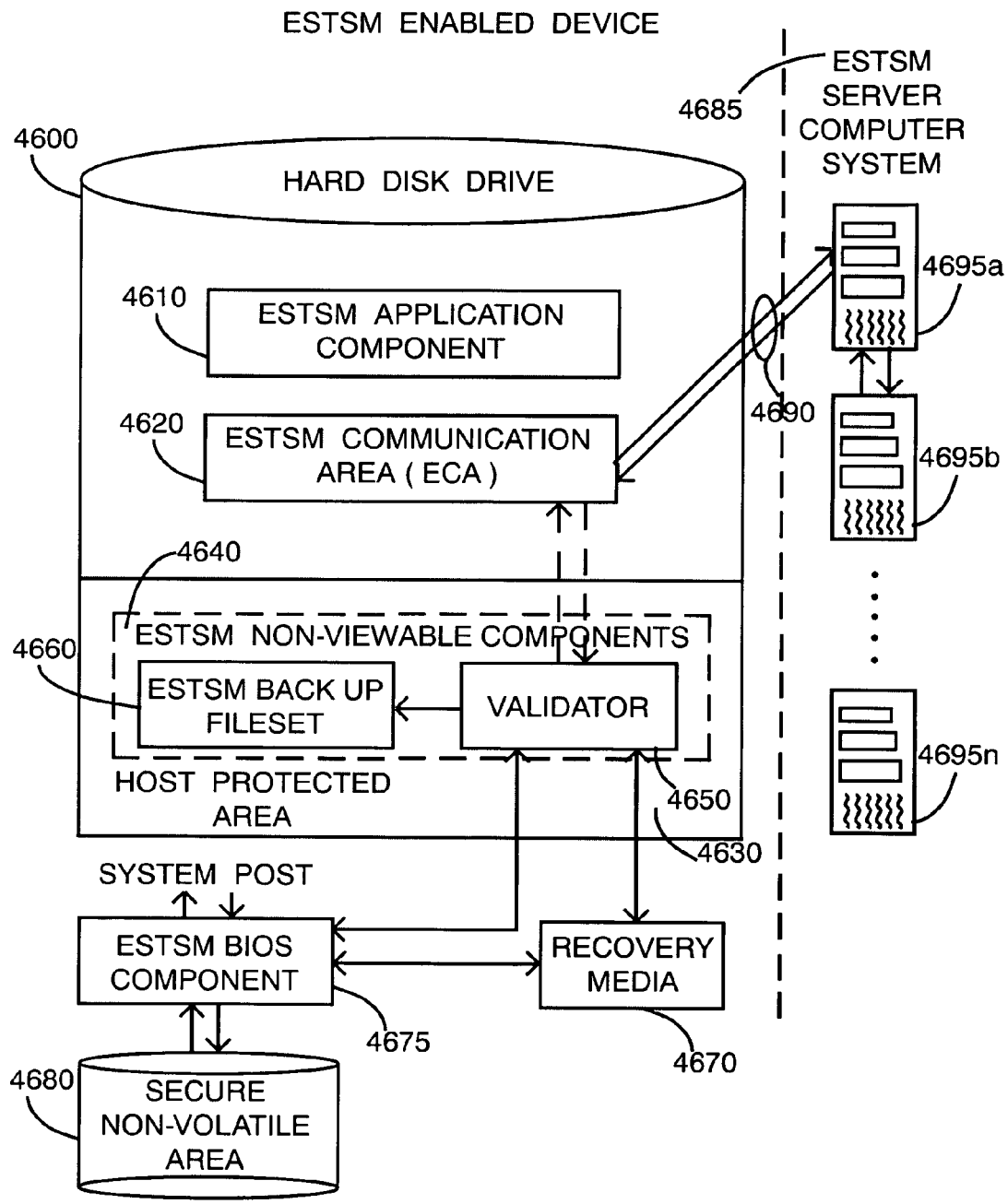
FIG. 46 shows another embodiment of the ESTSM architecture including an electronic device and server computer system.

In some embodiments of the invention as shown in FIG. 46, an ESTSM enabled electronic device may contain a HDD 4600 including an application component 4610 and an ESTSM Communications Area (ECA) 4620. Through an Internet connection 4690, the ECA 4620 allows the electronic device to communicate with the ESTSM Server Computer System 4685. Server computer system 4685 includes a number of servers 4685a, 4685b, ... 4685n that may be web servers containing the web pages and data for ESTSM described above. The HDD may include a Host Protected Area (HPA) 4630 containing ESTSM non-viewable components 4640. The non-viewable components 4640 may include a VALIDATOR program 4650 that inspects an ECA 4620 to determine if the ESTSM application components 4610 have run correctly during the last system boot. The non-viewable component may also contain a copy of the original application component software fileset 4660 if the files need to be re-installed to the HDD. As described above, every time the electronic device boots up, the BIOS component 4675 will check the integrity of the ESTSM non-viewable components 4640 and application component 4610 programs and files, and restore the original programs and files from the backup fileset 4660 or from recovery media 4670, if they have been tampered with. Furthermore, the BIOS component 4675 will ensure that the application component 4610 has run properly on the previous device boot and will take action if it is determined that an attempt to bypass the application component 4610 has occurred.

Figure 47:
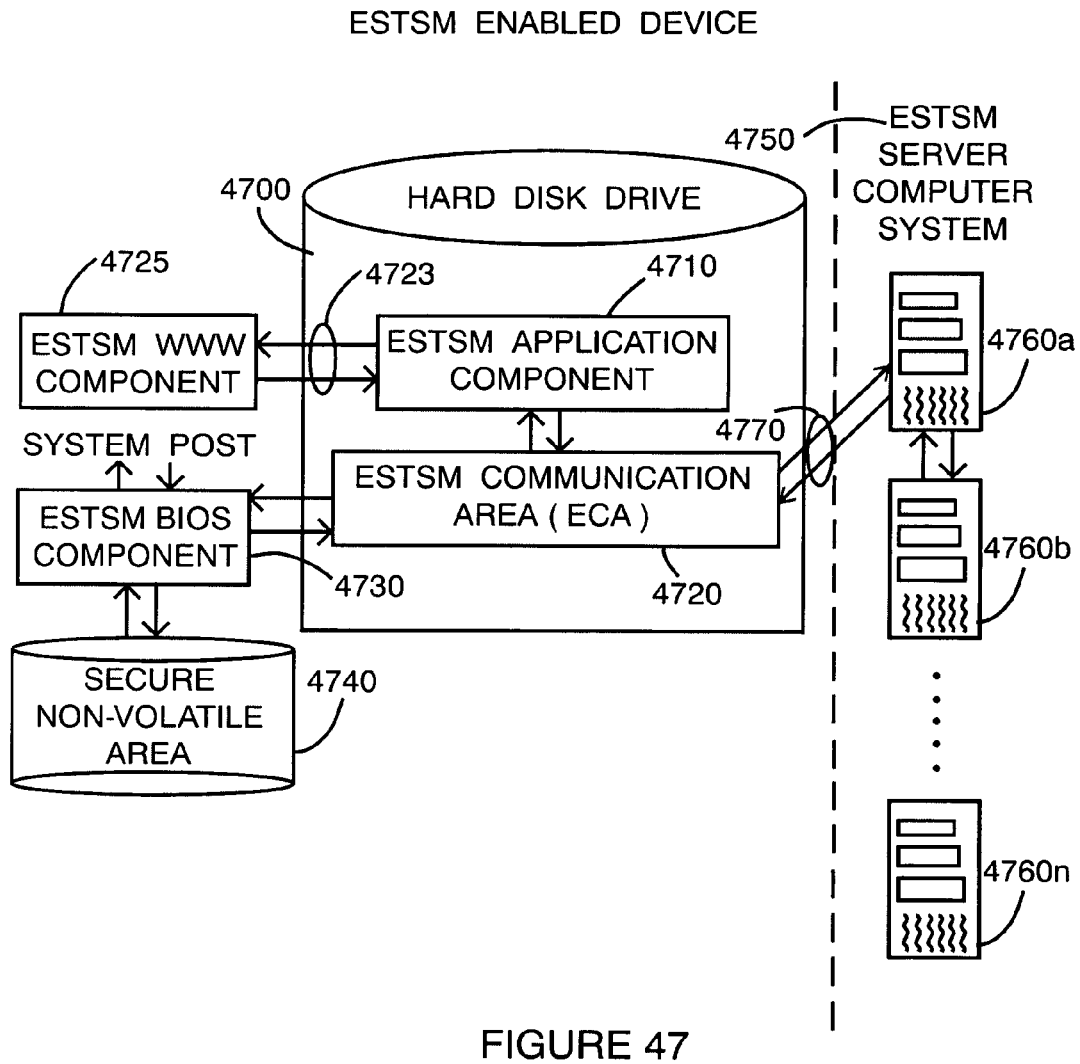
FIG. 47 shows another embodiment of the ESTSM architecture including an electronic device with a WWW component and server computer system.

In some embodiments of the invention as shown in FIG. 47, the ESTSM enabled electronic device may include a HDD 4700 containing an application component 4710 that receives and transmits information to a remote component that may be an ESTSM WWW component 4725 through the Internet 4723. In some embodiments of the invention, the application component may reside in the ESTSM WWW component 4725 on the ESTSM website and may be installed by the user from the ESTSM website. The application component 4710 may be coupled to an ECA 4720. The ECA 4720 may couple to a BIOS component 4730 that is connected to a secure non-volatile area 4740 as described above. The ESTSM application component 4710 may communicate through the ECA 4720 to the BIOS component 4730. The ECA 4720 also allows the application and BIOS components to communicate with an ESTSM server computer system 4750 through an Internet connection 4770. Server computer system 4750 includes a number of servers 4760a, 4760b, ... 4760n that may be web servers containing the web pages and data for ESTSM described above.

Figure 48:
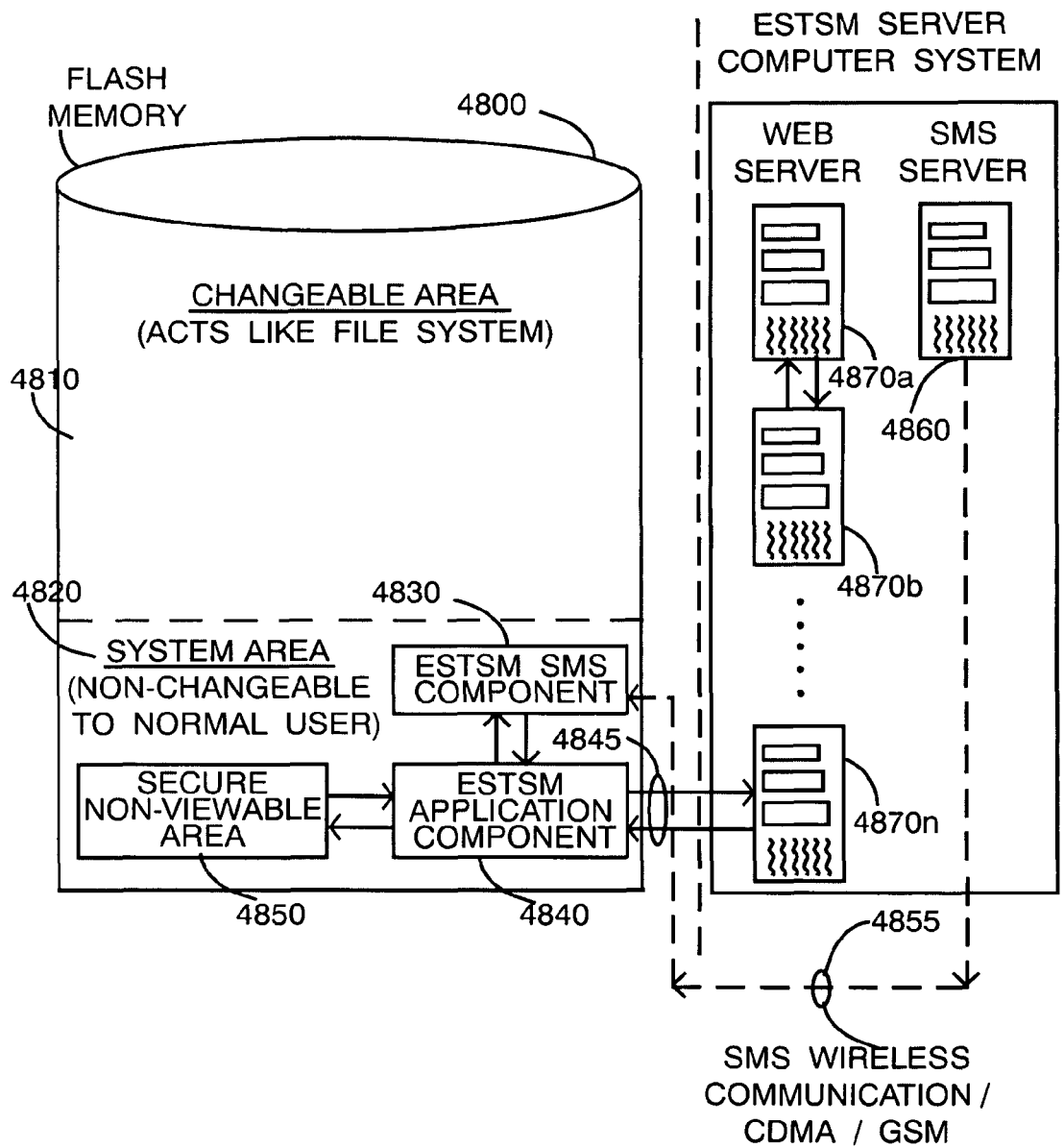
FIG. 48 shows the architecture of ESTSM in accordance with another embodiment of the invention for an electronic device with Short Messaging Service (SMS) connected to server computer system.

Turning now to FIG. 48, in accordance with some other embodiments of the invention, the architecture for an ESTSM enabled electronic device with Short Messaging Service (SMS) capability is shown. The ESTSM enabled electronic device with SMS capability may be a PDA, WLAN capable computer, mobile phone that in some embodiments may be a cell phone, or Smart Phone. The electronic device may include a Flash memory 4800 containing a changeable area 4810 that functions like non-volatile storage and may include a file system. A system area 4820 in the Flash memory 4800 that is non-changeable to a user of the electronic device may include an ESTSM SMS component 4830, ESTSM application component 4840 and a secure non-volatile area 4850 coupled to the application component 4840. The application component 4840 communicates with web servers 4870a, 4870b, ... 4870n in the ESTSM server computer system through an Internet connection 4845. The ESTSM server computer system also includes a SMS server 4860 coupled to the SMS component 4830 through a wireless communication connection 4855 such as Code Division Multiple Access (CDMA) or Global Mobile System (GSM). In some embodiments, the SMS component 4830 communicates with the ESTSM server using SMS services on the electronic device when an Internet connection is not available.

Figure 49:
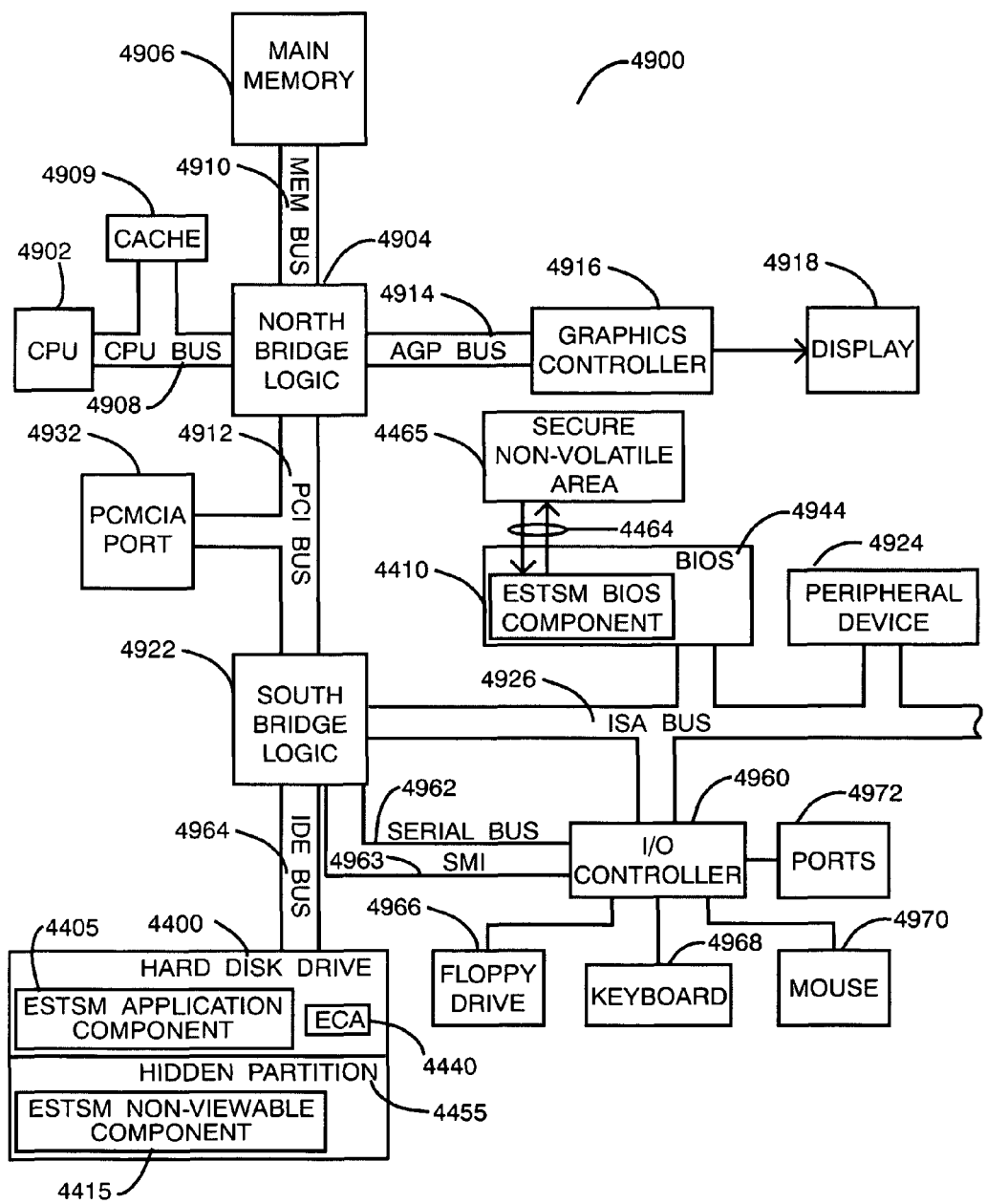
FIG. 49 shows a schematic of a computer system that includes a BIOS component, application component and non-viewable component in accordance with one embodiment of the invention.

Turning now to FIG. 49, a computer system that includes a BIOS component, application component and non-viewable component in accordance with some embodiments of the invention is shown. Computer system 4900 may be configured in any number of ways, including as a laptop unit, a desktop unit, a network server, or any other configuration. Computer system 4900 generally includes a central processing unit (CPU) 4902 coupled to a main memory array 4906 and to a variety of other peripheral computer system components through an integrated bridge logic device 4904. The bridge logic device 4904 is sometimes referred to as a "North bridge" for no other reason than that it often is depicted at the upper end of a computer system drawing. The CPU 4902 couples to North bridge logic device 4904 via a CPU bus 4908, or the bridge logic device 4904 may be integrated into the CPU 4902. The CPU 4902 may comprise, for example, a Pentium™ IV microprocessor. It should be understood, however, that computer system 4900 could include other alternative types of microprocessors. Further, an embodiment of computer system 4900 may include a multiple-CPU architecture, with each processor coupled to the bridge logic device 4904. An external cache memory unit 4909 further may couple to the CPU bus 4908 or directly to the CPU 4902.

The main memory array 4906 couples to the bridge logic unit 4904 through a memory bus 4910. The main memory 4906 functions as the working memory for the CPU 4902 and generally includes a conventional memory device or array of memory devices in which program instructions and data are stored. The main memory array may comprise any suitable type of memory such as dynamic random access memory (DRAM) or any of the various types of DRAM devices such as synchronous DRAM (SDRAM), extended data output DRAM (EDO DRAM), or Rambus™ DRAM (RDRAM).

The North bridge logic device 4904 couples the CPU 4902 and memory 4906 to the peripheral devices in the system through a Peripheral Component Interconnect (PCI) bus 4912 or other expansion bus, such as an Extended Industry Standard Architecture (EISA) bus. The present invention, however, is not limited to any particular type of expansion bus, and thus various buses may be used, including a high speed (66 MHz or faster) PCI bus. Various peripheral devices that implement the PCI protocol may reside on the PCI bus 4912, as well.

The computer system 4900 includes a graphics controller 4916 that couples to the bridge logic device 4904 via an expansion bus 4914. As shown in FIG. 49, the expansion bus 4914 comprises an Advanced Graphics Port (AGP) bus. Alternatively, the graphics controller 4916 may couple to bridge logic device 4904 through the PCI bus 4912. The graphics controller 4916 may embody a typical graphics accelerator generally known in the art to render three-dimensional data structures on display 4918.

Bridge logic device 4904 includes a PCI interface to permit master cycles to be transmitted and received by bridge logic device 4904. The bridge logic device 4904 also includes an interface for initiating and receiving cycles to and from components on the AGP bus 4914. The display 4918 comprises any suitable electronic display device upon which an image or text can be represented. A suitable display device may include, for example, a cathode ray tube (CRT), a liquid crystal display (LCD), a thin film transistor (TFT), a virtual retinal display (VRD), or any other type of suitable display device for a computer system.

The computer system 4900 optionally may include a Personal Computer Memory Card International Association (PCMCIA) drive 4932 coupled to the PCI bus 4912. The PCMCIA drive 4932 is accessible from the outside of the computer and accepts one or more expansion cards that are housed in special PCMCIA cards, enclosures which are approximately the size of credit cards but slightly thicker. Accordingly, PCMCIA ports are particularly useful in laptop computer systems, in which space is at a premium. A PCMCIA card typically includes one connector that attaches to the PCMCIA port 4932, and additional connectors may be included for attaching cables or other devices to the card outside of the computer 4900. Accordingly, various types of PCMCIA cards are available, including modem cards, network interface cards, bus controller cards, and memory expansion cards.

If other secondary expansion buses are provided in the computer system, another bridge logic device typically couples the PCI bus 4912 to that expansion bus. This bridge logic device is sometimes referred to as a "South bridge," reflecting its location vis-à-vis the North bridge in a typical computer system drawing. In FIG. 49, the South bridge logic device 4922 couples the PCI bus 4912 to an Industry Standard Architecture (ISA) bus 4926 and to an Integrated Drive Electronics (IDE) bus 4964. The IDE bus 4964 typically interfaces input and output devices such as a CD ROM drive, a Digital Video Disc (DVD) drive, a hard disk drive, and one or more floppy disk drives. In accordance with the embodiment of the invention shown in FIG. 44, the IDE bus 4964 shown in FIG. 49 couples to HDD 4400. ESTSM application component 4405 and ECA 4440 may be executable software files stored in a file system of HDD 4400. Hidden partition 4455 in HDD 4400 may include ESTSM non-viewable components 4415 as described in detail above with reference to FIG. 44.

Various ISA-compatible devices are shown coupled to the ISA bus 4926, including a BIOS ROM 4944. The BIOS ROM 4944 is a memory device that stores commands which instruct the computer how to perform basic functions such as sending video data to the display or accessing data on hard floppy disk drives. In addition, the BIOS ROM 4944 may be used to store power management instructions for hardware-based (or "legacy") power management systems or to store register definitions for software-based power management systems. The BIOS instructions also enable the computer to load the operating system software program into main memory during system initialization and transfer control to the operating system so the operating system can start executing, also known as the INT19 "boot" sequence. BIOS ROM 4944 in FIG. 49 includes the ESTSM BIOS component 4410 in accordance with the embodiment of the invention shown in FIG. 44. The ESTSM BIOS component 4410 in BIOS ROM 4944 couples through a bus that may be a serial bus 4464 (a serial bus generally is a bus with only one data signal) to secure non-volatile area 4465 containing firmware code. The BIOS ROM 4944 typically is a "nonvolatile" memory device, which means that the memory contents remain intact even when the computer 4900 powers down. By contrast, the contents of the main memory 4906 typically are "volatile" and thus are lost when the computer shuts down.

The South bridge logic device 4922 supports an input/output (I/O) controller 4960 that operatively couples to basic input/output devices such as a keyboard 4968, a mouse 4970, a floppy disk drive 4966, general purpose parallel and serial ports 4972, and various input switches such as a power switch and a sleep switch (not shown). The I/O controller 4960 typically couples to the South bridge logic device 4922 via a standard bus, shown as the ISA bus 4926 in FIG. 49. A serial bus 4962 may provide an additional connection between the I/O controller 4960 and South bridge logic device 4922. The I/O controller 4960 typically includes an ISA bus interface (not specifically shown) and transmit and receive registers (not specifically shown) for exchanging data with the South bridge logic device 4922 over the serial bus 4962.

Figure 50:
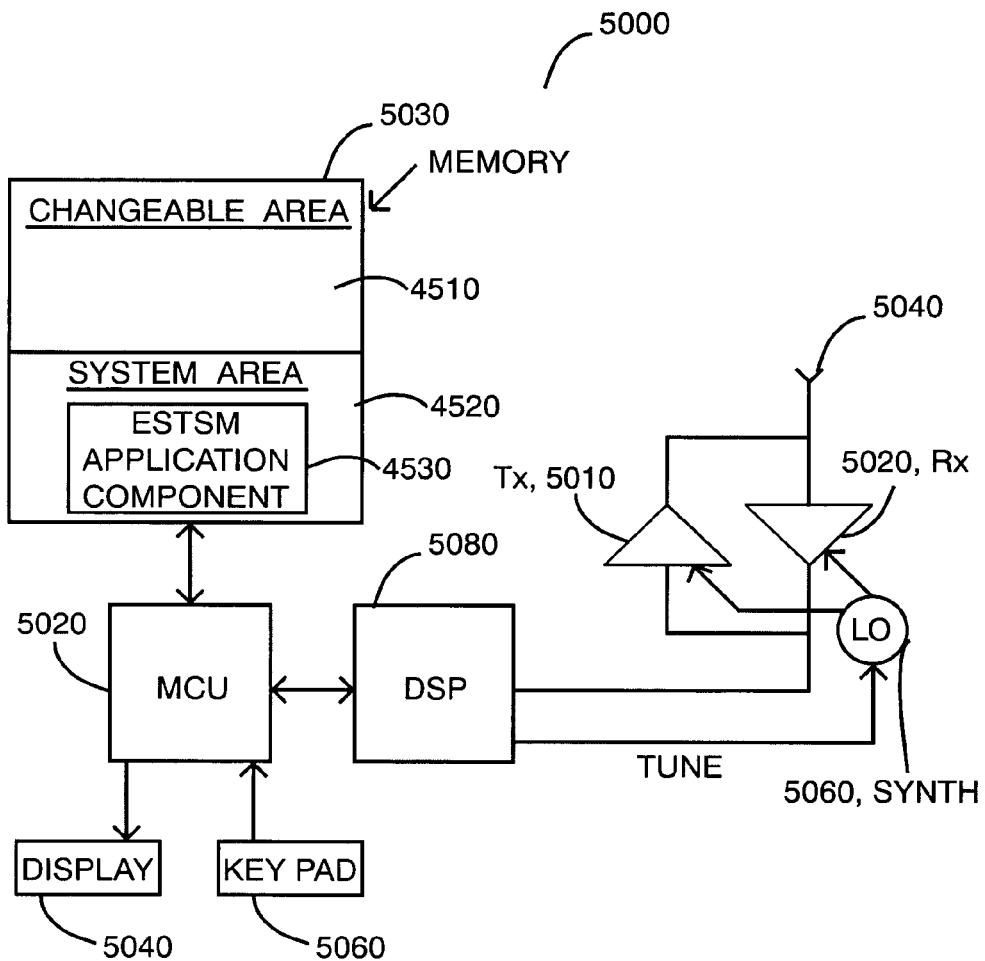
FIG. 50 shows a schematic of a cellular telephone that includes an application component in a system area in accordance with another embodiment of the invention.

Turning now to FIG. 50, a wireless communication device that may be a PDA, WLAN capable computer, mobile phone that in some embodiments is a cell phone, or Smart Phone includes a changeable area and an application component in a system area in accordance with the embodiment of the invention of FIG. 45. The wireless communication device 5000 may transmit and receive information with a plurality of base transceiver stations (BTS) not shown in FIG. 50. Each BTS may transmit in a forward or downlink direction both physical and logical channels to the mobile station 5000 in accordance with a predetermined air interface standard. A reverse or uplink communication path also exists from the mobile station 5000 to the BTS, which conveys mobile originated access requests and traffic.

The air interface standard can conform to any suitable standard or protocol, and may enable both voice and data traffic, such as data traffic enabling Internet access and web page downloads. One suitable type of air interface is based on Time Division Multiple Access (TDMA) and may support a GSM or an advanced GSM protocol, although these teachings are not intended to be limited to TDMA or to GSM or GSM-related wireless systems. Another wireless system and air interface, such as a Wideband Code Division Multiple Access (WCDMA) system, may serve at least a part of the geographical area served by the wireless communication system shown in FIG. 50, and the mobile station 5000 maybe a multi-band terminal that is capable of operating with either the GSM or the WCDMA network.

The mobile station 5000 typically includes a microcontrol unit (MCU) 5020 having an output coupled to an input of a display 5040 and an input coupled to an output of a keyboard or keypad 5060. The mobile station 5000 may be contained within a card or module that is connected during use to another device. For example, the mobile station 5000 could be contained within a PCMCIA or similar type of card or module that is installed during use within a portable data processor, such as a laptop or notebook computer, or even a computer that is wearable by the user.

The MCU 5020 includes or is coupled to a memory 5030, including a system area 4520 for storing ESTSM application components 4530, as well as a changeable area 4510 for temporarily storing required data, scratchpad memory, received packet data, packet data to be transmitted, and the like. A separate, removable Subscriber Identity Module (SIM) that is not shown can be provided as well, the SIM storing, for example, a preferred Public Land Mobile Network (PLMN) list and other subscriber-related information. The system area 4520 may also store a program enabling the MCU 5020 to execute the software routines, layers and protocols required to operate in the wireless communications system, as well as to provide a suitable user interface (UI), via display 5040 and keypad 5060, with a user. Although not shown, a microphone and speaker are typically provided for enabling the user to conduct voice calls in a conventional manner.

The mobile station 5000 also contains a wireless section that includes a digital signal processor DSP 5080, or equivalent high speed processor or logic or control unit, as well as a wireless transceiver that includes a transmitter (Tx) 5010 and a receiver (Rx) 5020, both of which are coupled to an antenna 5040 for communication with the BTS. At least one local oscillator (LO) 5060, such as a frequency synthesizer, is provided for tuning the transceiver. Data, such as digitized voice and packet data, is transmitted and received through the antenna 5040.

As mentioned above with reference to FIG. 45, the ESTSM enabled PDA, mobile phone, WLAN capable computer, or Smart Phone may continuously communicate to the ESTSM Server Computer System through an always-on Internet connection. Information such as telephone numbers, email addresses, calendar appointments, sales meetings and other daily reminders on a PDA, mobile phone, WLAN capable computer, or Smart Phone with ESTSM can be retrieved from a stolen device in some embodiments of the invention by the user calling an ESTSM service center to report the device as stolen. Because the PDA, mobile phone, WLAN capable computer, or Smart Phone has an always-on Internet connection, data on the device can be recovered and stored on the ESTSM server computer system as soon as the device is reported stolen. After recovery, the data may be erased off the stolen PDA, mobile phone, WLAN capable computer, or Smart Phone and the device disabled, making it worthless for the thief. Upon the ESTSM user purchasing a replacement PDA, mobile phone, WLAN capable computer, or Smart Phone, the data recovered and stored on the ESTSM server computer system from the user's stolen device can be placed on the user's new replacement device.

Figure 51:
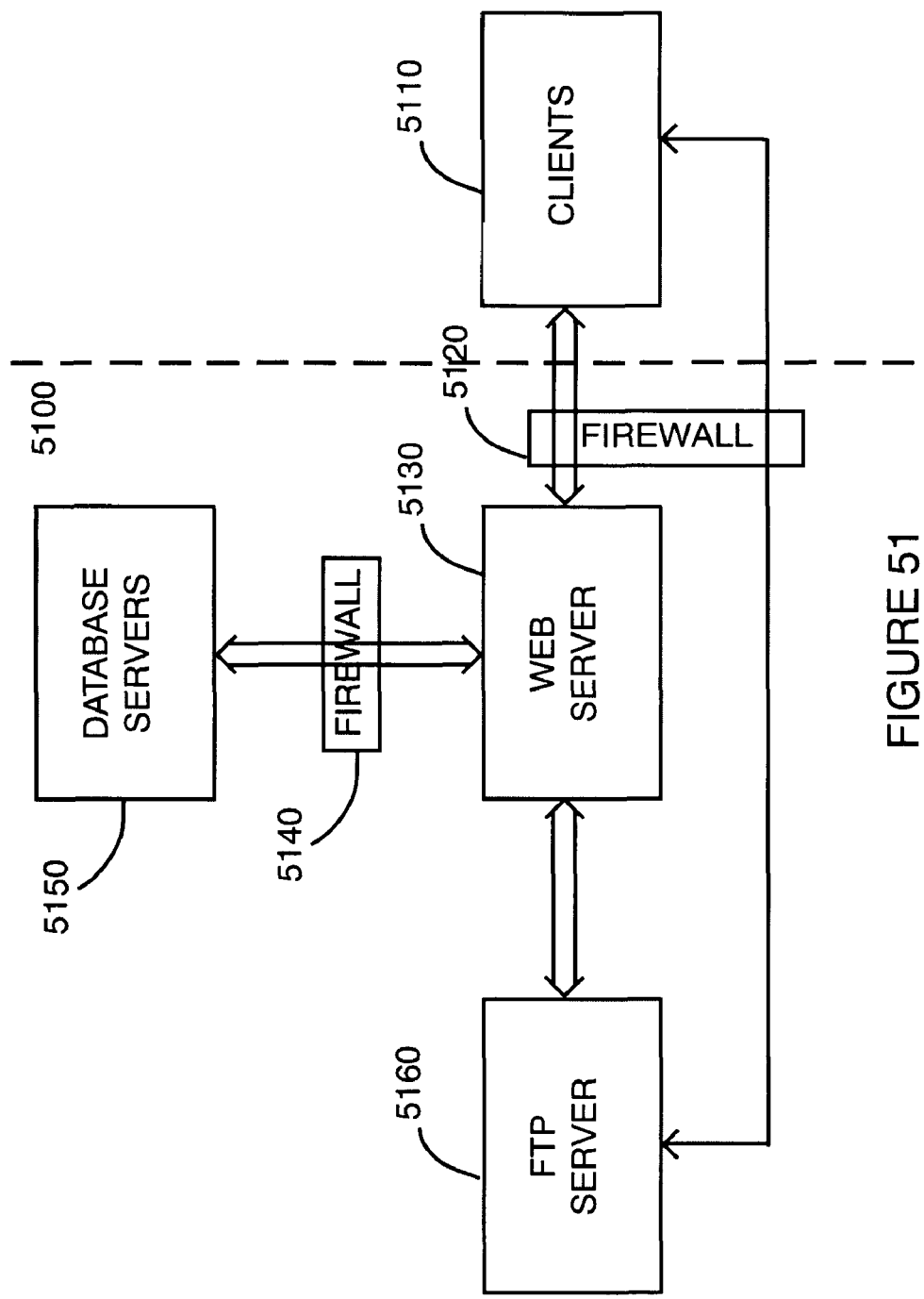
FIG. 51 shows a schematic of the ESTSM server computer system of FIGS. 44-47 in more detail in accordance with one embodiment of the invention.

Turning now to FIG. 51, some embodiments of the ESTSM server computer system 5100 of FIGS. 44-47 are shown in more detail. Clients 5110 are ESTSM enabled electronic devices that transmit and receive information through firewall 5120 to web servers 5130. The firewall 5120 may be software executing on each of the web servers 5130 or a stand alone firewall device with dedicated hardware and software that may be a computer system. Web servers 5130 as described above include web pages for administration and use of ESTSM as well as software to transmit the web pages and receive responses from clients 5110. Web servers 5130 connect through firewall 5140 to one or more database servers 5150. Firewall 5140 may be software executing on each of the database servers 5150 or a stand alone firewall device with dedicated hardware and software that may be a computer system. Database servers 5150 may contain among other information, user configuration information and access rights for clients 5110. Configuration information may include the ESTSM services selected by a user, the electronic devices associated with a particular user, electronic device identification information, billing information such as credit card number and expiration date, electronic device location and status logs, and so forth. Web servers 5130 may also couple to File Transfer Protocol (FTP) server 5160 that allows clients 5110 to download large files directly without having to go through web servers 5130. Web servers 5130 also have access to files on FTP server 5160 allowing clients to access and view the contents of these files through the web servers.

Figure 52:
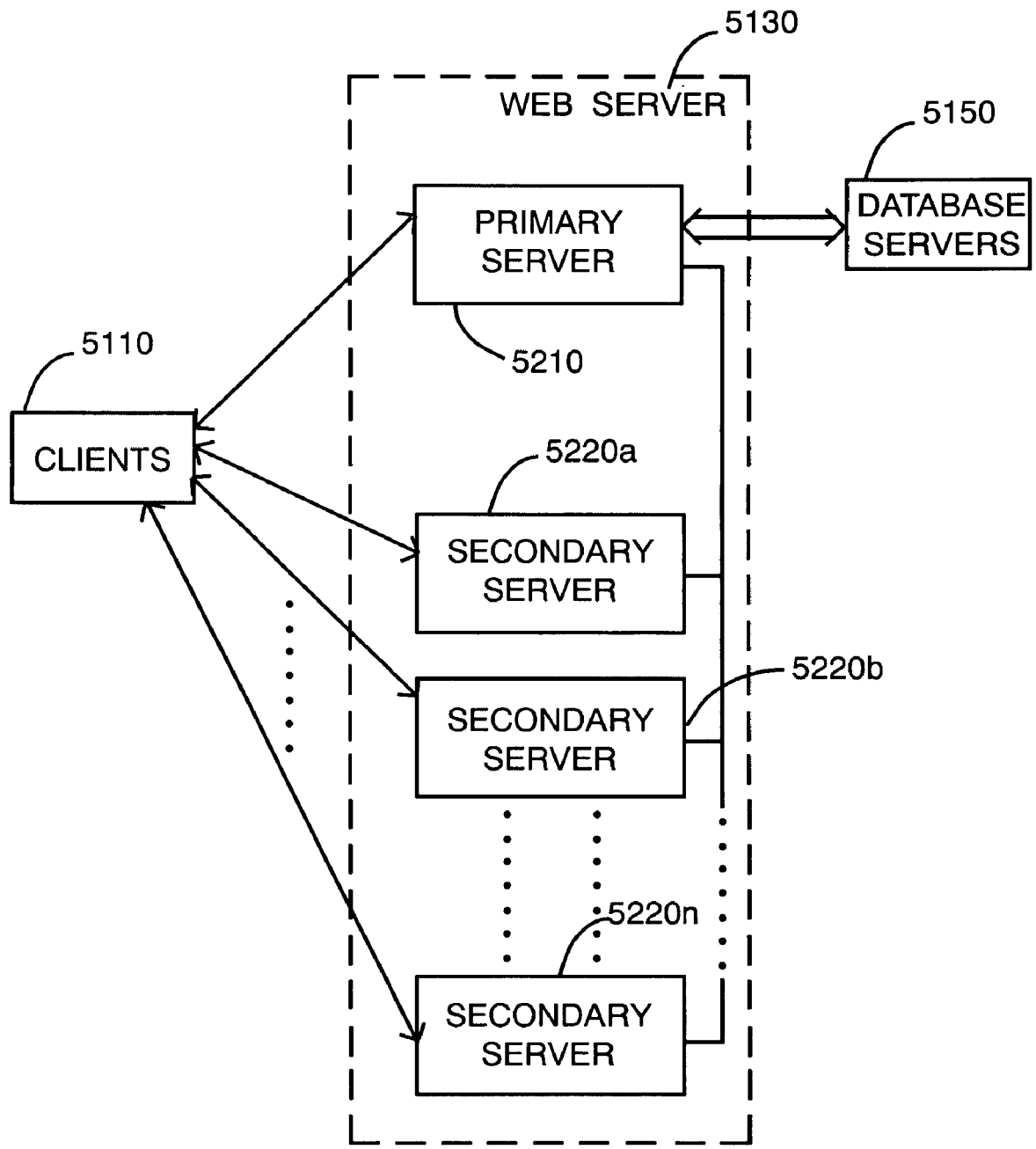
FIG. 52 shows the connections between the primary and secondary servers contained in the web server of FIG. 51 in accordance with one embodiment of the invention.

Turning now to FIG. 52, web servers 5130 of FIG. 51 are depicted in greater detail and show connections between the primary and secondary servers in accordance with some embodiments of the invention. Clients 5110 may each connect to primary server 5210 and each of secondary server 5220a, 5220b, . . . and 5220n. The primary server 5210 and secondary servers 5220a, 5220b, . . . 5220n are coupled to each other and can communicate and transfer information. In some embodiments of the invention as described in greater detail below, each of clients 5110 includes an application component that works with web browser software such as Microsoft® Internet® Explorer® to ensure that if Explorer® can access the ESTSM website, the ESTSM application components will also be able to access the website. If Explorer® on the client cannot get to the ESTSM website on the primary server 5210, it will then try to access the ESTSM secondary servers 5220a, 5220b, . . . 5220n for status of the primary. If the secondary servers are also unavailable, but ESTSM application component on the client can access other popular websites, then it is assumed that some firewall or other software has been loaded to attempt to block ESTSM operation.

The web pages for registration on the ESTSM server can be customized for each type of electronic device and manufacturer. This way, manufacturers can offer different services to the user, during the registration phase, based on the model and target customers for that model. Thus, for example, a manufacturer may want to set a higher price for "Data Destroy Services" on corporate laptop models than on consumer laptop models.

If the ESTSM server computer system receives a message from an electronic device that has been reported stolen, and the "Tracking Service" is registered for that electronic device, the ESTSM server will log the IP address of the stolen electronic device. The ESTSM server computer system will get the IP address from the header of the message packet (part of Internet Protocol (IP)) and will not have to execute a tracing program such as TraceRoute on the electronic device that may be a client personal computer. The ESTSM server will use the Internet to lookup the information for that IP address and will send the tracking location email as described above to the user.

The ESTSM server computer system hosts all the web pages that provide the user experience once logged into the ESTSM website. The ESTSM server environment can be duplicated at a corporate customer facility and the specific serial numbers of the electronic devices at that corporation can be re-directed to work directly with the ESTSM server located at that corporation. Thus, corporate customers, for security purposes, can control the flow of messages to servers located at their own facility.

If the ESTSM server needs repairs to hardware, new software, functional changes to web pages, etc. electronic device clients may be requested by the server to stop making new queries to the server for a random amount of time. Thus, needed updates and repairs to the ESTSM sever may be performed during this time.

Figure 53:
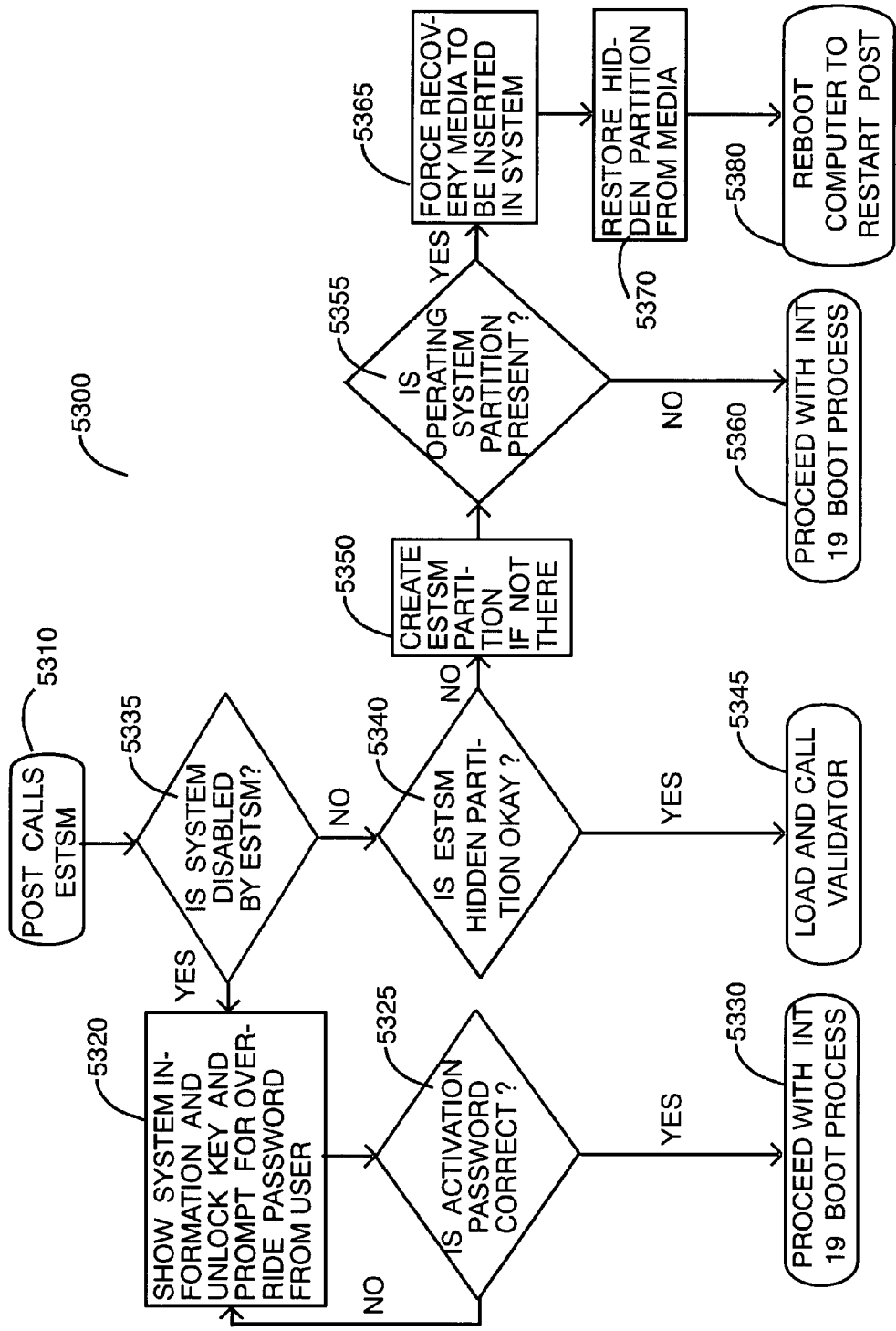
FIG. 53 is a flow diagram of the BIOS component of the ESTSM in accordance with some embodiments of the invention.

Turning now to FIG. 53, a flow diagram in accordance with some embodiments of the invention of the BIOS component of ESTSM of FIG. 44 is shown. The Power on Self Test (POST) firmware may call the ESTSM BIOS component 5310 towards end of POST. The BIOS component will first check to see if the electronic device has already been disabled by ESTSM 5335 (i.e. the electronic device was reported stolen, or some other ESTSM failure occurred). If the electronic device is already disabled, the BIOS component will display the system information and a boot specific unlock key and will prompt the user to enter the activation password to re-enable system boot 5320. This activation password can be obtained by the original user through the ESTSM website or by calling the monitoring station.

If the system was not already disabled, the BIOS component checks to see if the special ESTSM hidden partition exists 5340. If it does exist, the BIOS component will transfer control to ESTSM non-viewable component VALIDATOR program 5345. If the hidden partition does not exist the BIOS component will create the ESTSM hidden partition 5350. If there is a bootable operating system partition on the hard disk 5355, the BIOS component will force the user to insert the recovery media into the appropriate device 5365. The BIOS component will re-build the ESTSM hidden partition using the files from the recovery media 5370. As mentioned above, if the hidden partition does not exist, a check is also made to see if a bootable operating system partition is present before forcing the recovery media to be inserted. If a bootable operating system partition is not present, then the electronic device will proceed with the INT19 boot process 5360 until it stops because no bootable OS is present. This may occur if the thief deletes the OS in which case he must install the OS and the recovery media to allow the system to reboot. Alternatively, a bootable OS partition may not be present as during initial HDD installation at the factory, and a master hard disk image may be used for seamless factory installation during boot process 5360 without requiring the recovery media to be inserted in each electronic device during manufacture.

Figure 54:
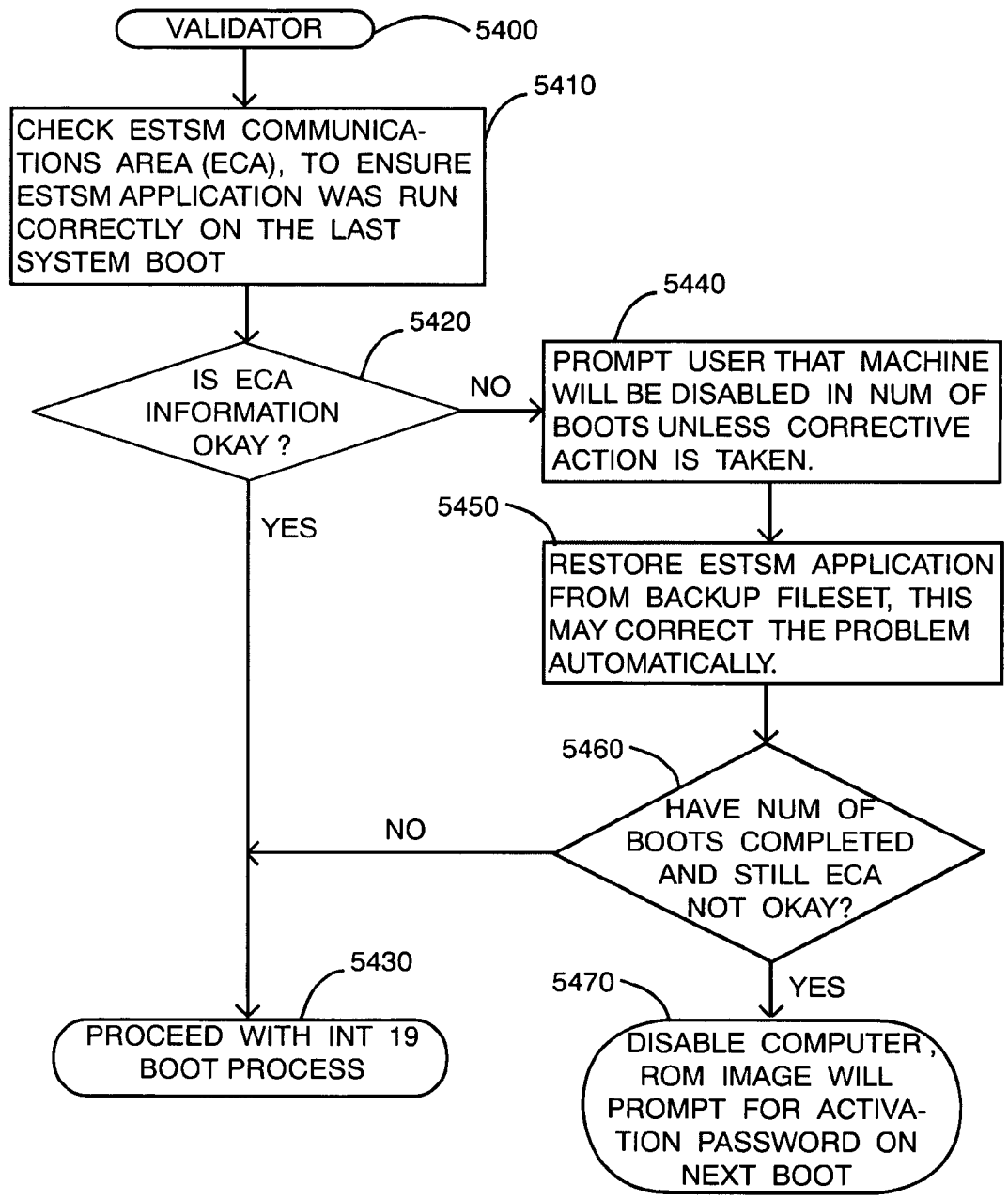
FIG. 54 is a flow diagram of the VALIDATOR program in the non-viewable component of the ESTSM in accordance with some embodiments of the invention.

Turning now to FIG. 54, a flow diagram of the VALIDATOR program in the non-viewable component of the ESTSM in accordance with some embodiments of the invention is shown. If the hidden partition on the hard disk is valid, the BIOS component will load and transfer control to the VALIDATOR program 5345 on the hidden partition as shown in FIG. 53 and described above. The VALIDATOR program inspects the ESTSM Communications Area (ECA) to determine if the ESTSM application components have run correctly during the last system boot 5410. If the ECA information is correct (i.e. ESTSM application was run correctly), then the VALIDATOR program will return control to POST to proceed with INT19 OS boot process 5430. If the VALIDATOR program determines that the application components failed to run correctly 5420, the user is warned to correct the problem otherwise the electronic device will be disabled within a number of system boots 5440 that in some embodiments of the invention is 5 system boots. The VALIDATOR program will then restore the ESTSM application components from ESTSM backup fileset to try to correct the problem 5450. If the number of system boots has been reached and ECA information is still not correct 5460, then ESTSM will disable the system 5470. The procedure described above may then be used to re-enable the system. An application component failure will be generated if the thief deletes or tampers with ESTSM files, loads an application or service to try to bypass ESTSM operation, or in any other way tries to prevent ESTSM from running. After the VALIDATOR program has completed operation, it returns control back to the electronic device BIOS 5430 so that system POST may be completed and the normal OS boot can occur via the INT19 interface.

In some other embodiments of the invention, the check of the ECA to determine if the ESTSM application components have run correctly is performed by the BIOS component-thus the VALIDATOR program may be located in the BIOS component. If the VALIDATOR program determines that the application components failed to run correctly, the user is asked to install the application components onto the electronic device.

As shown in FIG. 44, the ESTSM application component consists of two sets of programs: (1) ESTSM application program and (2) startup program files. The application component programs work together to provide the ESTSM environment described above and periodically check with the ESTSM server computer system to see if the electronic device is reported stolen and take the appropriate action.

Figure 55:
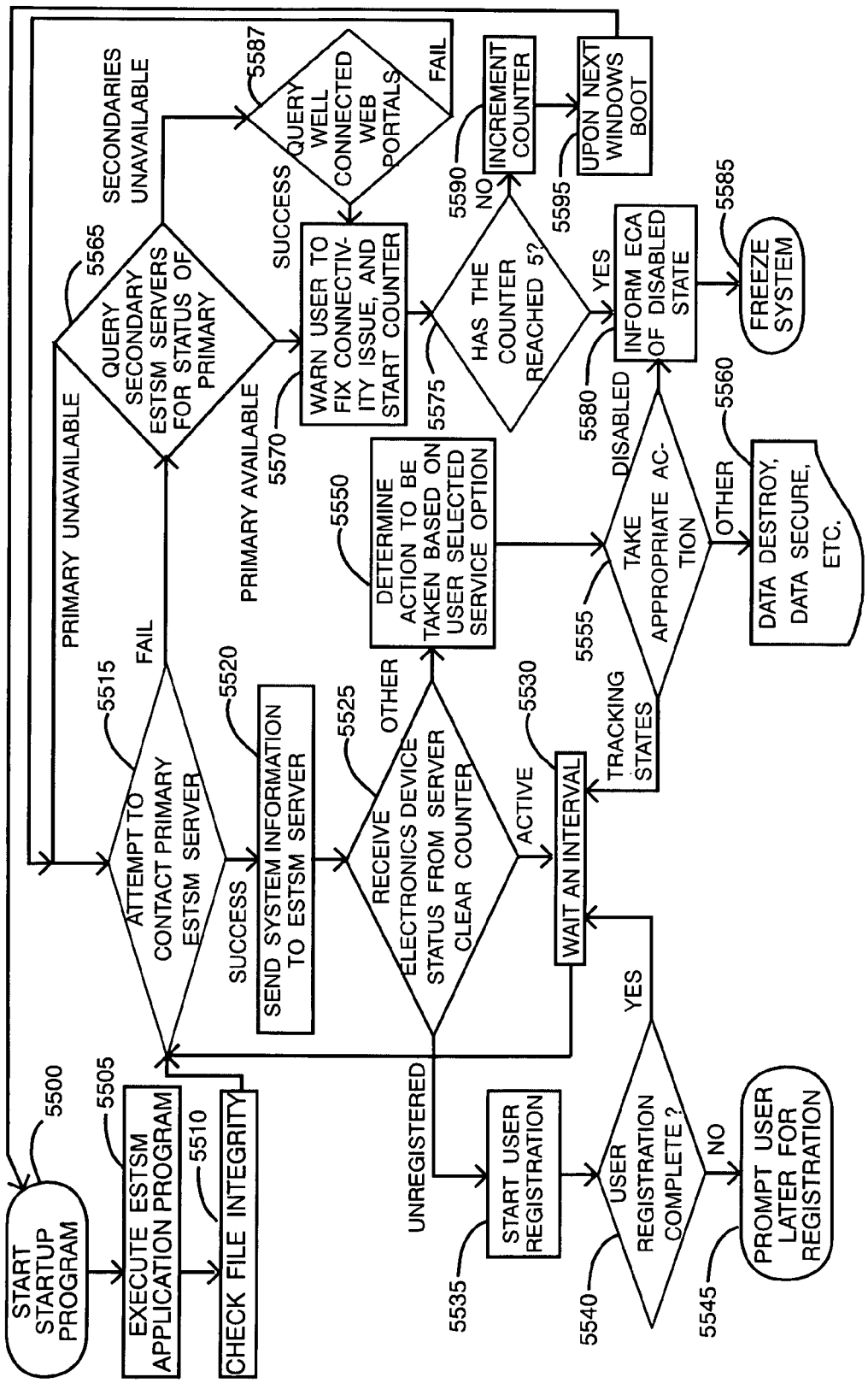
FIG. 55 is a flow diagram of the application component of the ESTSM in accordance with some embodiments of the invention.

A flow diagram of the application component of the ESTSM is shown in FIG. 55 in accordance with some embodiments of the invention. The startup program 5500 creates the appropriate system processes and loads and executes the ESTSM application program 5505 on the electronic device that performs most of the ESTSM operations. The ESTSM application program works with the operating system driver files to communicate with the ECA. The ESTSM application program will check the integrity of all the ESTSM application components 5510 and will ensure ESTSM is working correctly. The ESTSM application program will communicate this information to the BIOS component through the ECA. Checking the integrity of ESTSM application components may include interfacing with specialized security hardware on the electronic device that in some embodiments of the invention may be Trusted Platform Module (TPM) integrated circuitry. If there is a problem with the ESTSM application components, no information will be communicated to the ECA and on the next electronic device boot, the BIOS component will not allow the electronic device to boot. Otherwise, the ESTSM application program will then try to detect an Internet connection on the electronic device. Once an Internet connection is established by the user, the ESTSM application program will attempt to contact the primary ESTSM server 5515. If the ESTSM application program is successful in contacting the primary ESTSM server, the application program will then send an encrypted query to the primary ESTSM server 5520. Encryption of the query may involve interfacing with specialized security hardware on the electronic device such as TPM integrated circuitry described in more detail below. This query will identify the electronic device by the device system information such as serial number and model number (no other user data is sent to the server) 5520. The ESTSM application program receives the electronic device status from the server to determine if the device is registered with ESTSM 5525. If the electronic device is not registered with the ESTSM server, the user is given the option to complete the registration phase as described above and shown in FIG. 55 at 5535, 5540, and 5545.

If the system is registered with ESTSM server, the electronic device executing the ESTSM application program will receive a response from the ESTSM server computer system indicating whether or not the electronic device is reported stolen. If the electronic device is in an active state (i.e. not stolen), the application program will wait an interval 5530 and again contact the ESTSM server 5515. If the electronic device is reported stolen 5550, the ESTSM application program will cooperate with the other application components to take the appropriate action (i.e. disable the system, erase the hard disk drive, etc) 5555 and 5560. If the user has selected the disable electronic device service, then the ESTSM application program will inform the ECA of electronic device disabled state 5580 and freeze the electronic device 5585. The electronic device executing the ESTSM application program will send an encrypted message to the ESTSM server periodically while the system is connected to the Internet.

The application component of ESTSM is designed so that firewall software cannot block the ESTSM application components from accessing the ESTSM website. If firewall software could block the ESTSM application components, a thief could merely install the firewall software to bypass ESTSM. The ESTSM application program works with web browser software such as Microsoft® Internet® Explorer® to ensure that if Explorer® can access the ESTSM website, the ESTSM application components will also be able to access the website. If Explorer® cannot get to the ESTSM website on the primary server, it will then try to access the ESTSM secondary servers for status of the primary as shown in FIG. 55 in 5565. If the secondary servers are also unavailable, but ESTSM can access other popular websites 5587, then it is assumed that some firewall or other software has been loaded to attempt to block ESTSM operation. In this case, in some embodiments of the invention, the user is warned that they must correct the problem 5570 within five boots 5575, 5590, and 5595 or enter an "override" code to continue operation with ESTSM temporarily disabled. The "override" code can be obtained from the ESTSM website, call center, or an automated response system. If the override code is not entered, the system will be disabled after five boots 5580 and 5585, and the user must get the activation password as described above.

The ESTSM server is located at a particular address on the WWW accessible to the user. The application components of ESTSM communicate with this web server during the registration phase and periodically once the system is registered to determine if the electronic device has been reported stolen.

Figure 56:
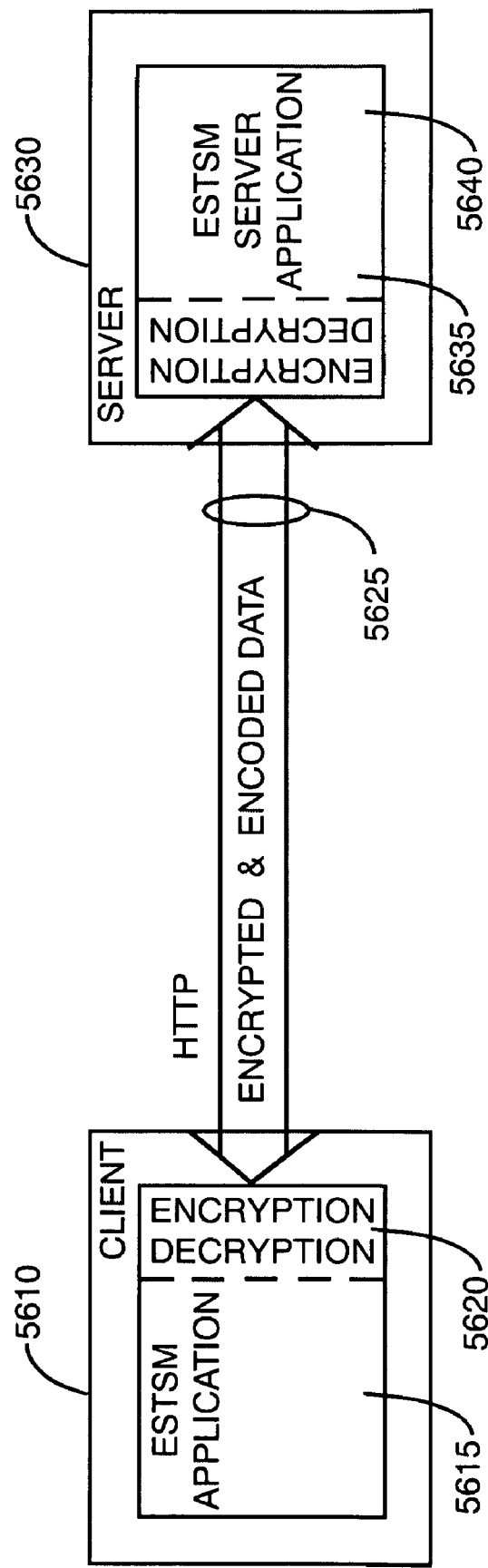
FIG. 56 shows encrypted and encoded communication between a client electronic device and the ESTSM server computer system in accordance with one embodiment of the invention.

Turning now to FIG. 56, encryption and encoding of information by the client electronic device and decoding and decryption of information by the server computer system in accordance with some embodiments of the invention is shown. A client 5610 that is an ESTSM enabled electronic device includes an ESTSM application component 5615 as described above. The ESTSM application component 5615 may be coupled to an encryption/decryption module 5620 that transmits and receives encrypted and encoded data. The encrypted and encoded data may be transmitted and received from an ESTSM server computer system 5630 through a communication medium 5625 such as HyperText Transfer Protocol (HTTP). The server computer system 5630 includes an ESTSM server application 5640 that may include web pages and information displayable on ESTSM enabled devices as described above and ESTSM server application software. The ESTSM server application 5640 may be coupled to an encryption/decryption module 5635 that transmits and receives encrypted and encoded data to and from client 5610.

Figure 57:
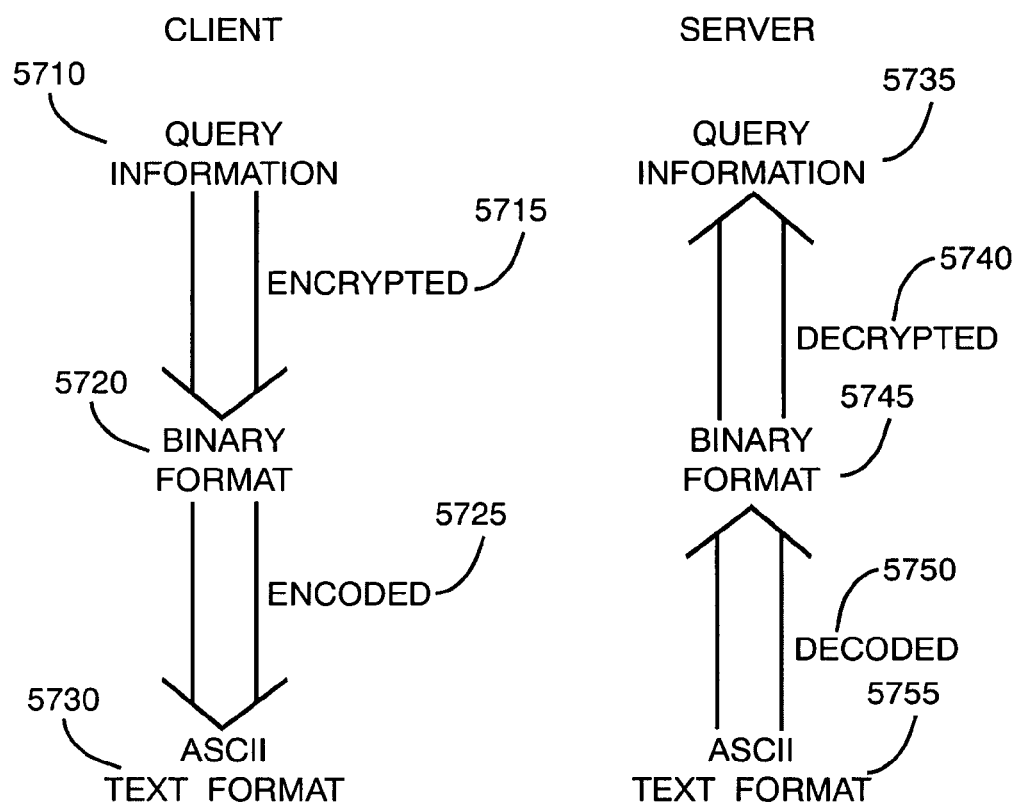
FIG. 57 shows encryption and encoding of information by the client electronic device and decoding and decryption of information by the server computer system.

Turning now to FIG. 57, encryption and encoding of information by the client electronic device and decoding and decryption of information by the server computer system of FIG. 56 is shown. Client electronic device 5610 may frequently and at randomly selected times send a query to server computer system 5630 asking if the electronic device has been reported stolen. The query is encrypted 5715 by encryption/decryption module 5620 using an encryption technique as described below into a binary format sequence 5720 of ones and zeroes. The sequence of ones and zeros is encoded 5725 by encryption/decryption module 5620 using an encoding technique as described below into an American Standard Code of Information Interchange (ASCII) text format 5730. ASCII text format is a standard 7-bit ASCII character code embedded in an 8 bit byte whose high order bit is always zero as described in ANSI standard X3.64, herein incorporated by reference.

Simultaneously with the encryption and encoding performed by encryption/decryption module 5620, the server computer system receives ASCII text formatted data 5755 via communication medium 5625. The ASCII text formatted data is decoded 5750 by encryption/decryption module 5635 using a decoding technique as described below into a binary format sequence 5745 of ones and zeroes. The sequence of ones and zeroes is decrypted 5740 by encryption/decryption module 5635 into query information 5735 that may be as mentioned above asking if the electronic device has been reported stolen.

Figure 58:
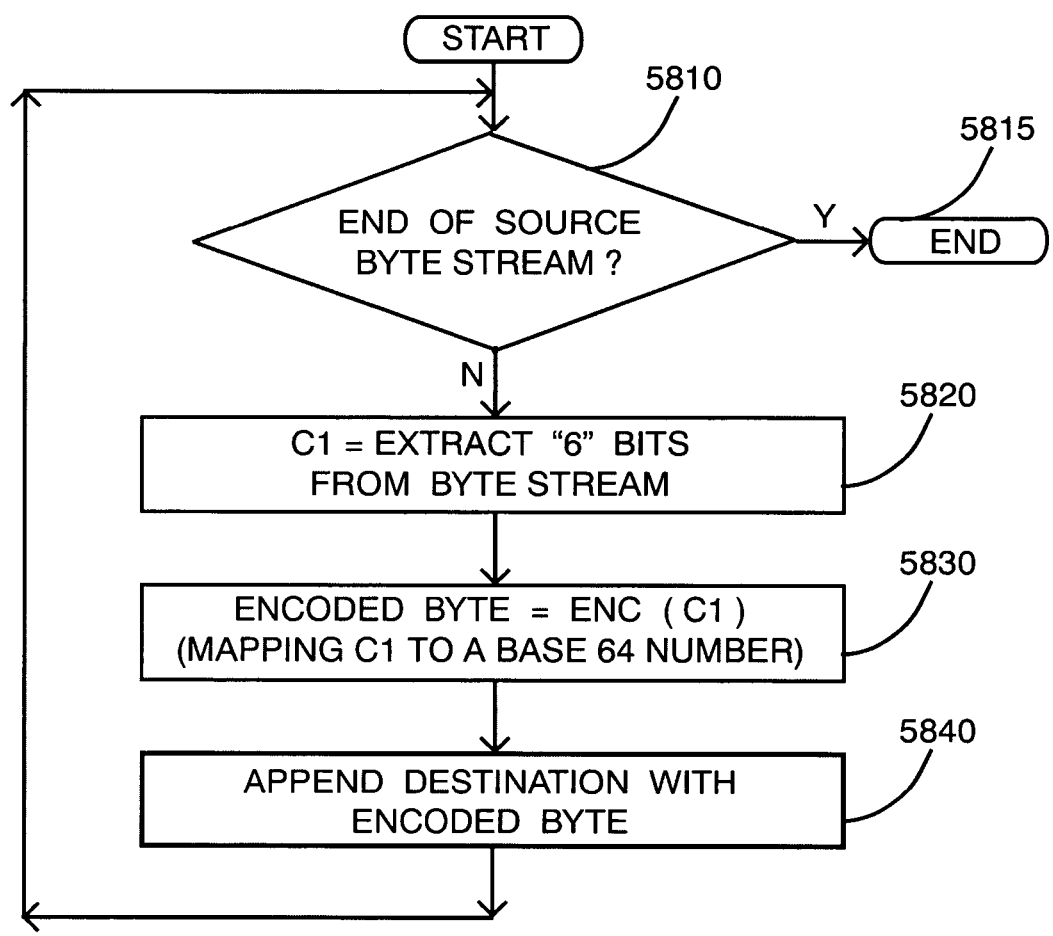
FIG. 58 is a flow diagram implemented in the client and server for encoding binary data into text format data in accordance with one embodiment of the invention.

Referring now to FIG. 58, a flow diagram implemented in the client and server for encoding binary format sequence data into ASCII text format data in accordance with some embodiments of the invention is shown. If the end of the binary format sequence data source 5810 has been reached as determined by the value of the source_length variable then encoding ends 5815. If the end has not been reached, then the next byte to encode is stored 5820 in a variable. Thus, 'n' bits from the variable are extracted 5820 into another variable that in some embodiments may be C1. ASCII text format may have n=6 bits with the highest order $7^{th}$ and $8^{th}$ bit being zero. Variable C1 is passed to ENC( ) function that performs binary mapping operations on the binary sequence data to generate an encoded byte 5830. In some embodiments of the invention, the binary mapping operations on C1 include mapping C1 to a base 64 number. The encoded byte is placed into a Destination data structure 5840 that may be an array of bytes for transmission over communication medium 5625. The encoded byte is re-initialized to a zero value in some embodiments of the invention and the source_length variable is decremented.

Figure 59:
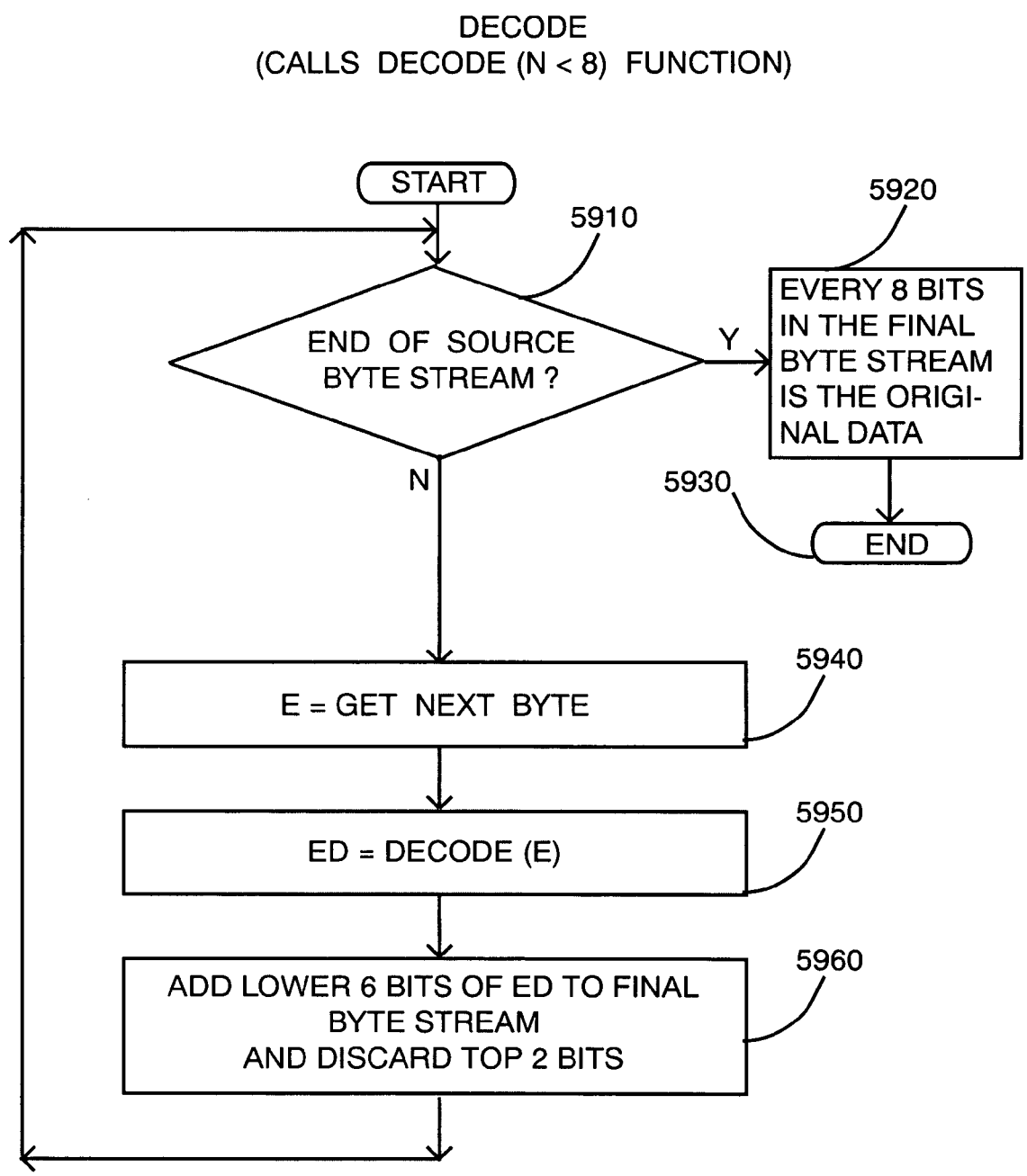
FIG. 59 is a flow diagram implemented in the client and server for decoding text format data into binary data in accordance with one embodiment.

Referring now to FIG. 59, a flow diagram implemented in the client and server for decoding ASCII text format data into binary data in accordance with some embodiments of the invention is shown. Encryption/decryption modules located in the client electronic device or server computer system receive encoded bytes of ASCII text format data that are placed into a source byte stream data structure that may be an array of bytes. The source byte stream data structure is described by a source_length variable that indicates the number of ASCII text format data bytes present in the array. Every time a new byte of data is received by the encryption/decryption module and placed in the array, the source_length variable is incremented and when a byte of data is removed and decoded the source_length variable is decremented. If the end of source 5910 has been reached, the array will become empty and decoding will end 5930. If the end of the source has not been reached, then a current ASCII text format byte of data is placed into variable E 5940. The ASCII text format byte of data in variable E is passed to DECODE( ) function that performs mapping operations on the data to generate a decoded byte ED 5950. The lower six bits of the decoded byte ED are placed into a final byte stream data structure 5960 and the upper two bits are discarded. Finally, the source_length variable is decremented as described above. If the end of the source byte stream is reached, every eight bits in the final byte stream 5920 corresponds to the original unencoded data.

Figure 60:
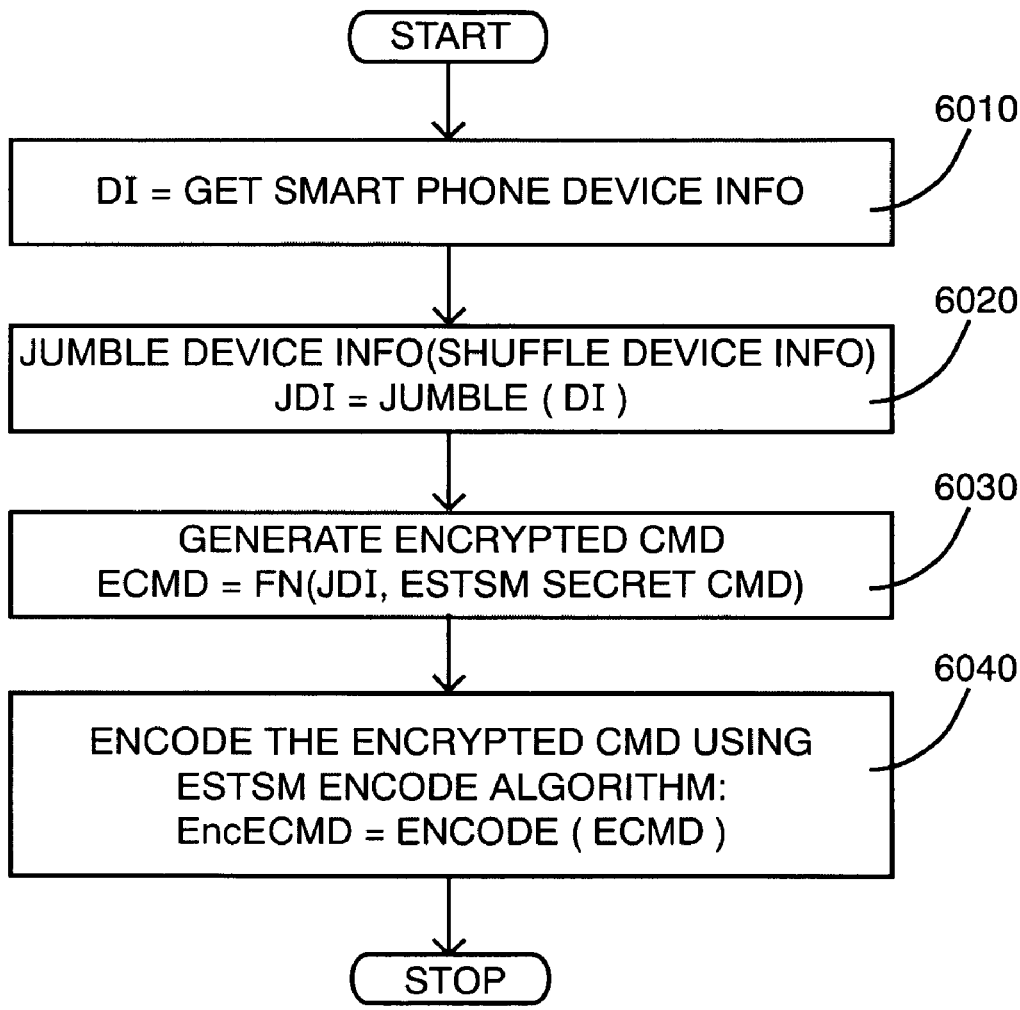
FIG. 60 is a flow diagram showing encryption and encoding of SMS messages from SMS server to SMS enabled ESTSM electronic device in accordance with one embodiment of the invention.

Turning now to FIG. 60, a flow diagram showing encryption and encoding of SMS messages from SMS server to SMS enabled ESTSM electronic device for the system of FIG. 48 is depicted. Each SMS capable device that in some embodiments of the invention may be a Smart Phone includes unique device information that is used in the encoding and encryption process. The encryption/decryption module in the Smart Phone stores the device information into a variable DI as shown in block 6010. The encryption/decryption module passes the device information in variable DI to a function Jumble as shown in block 6020 and stores the result into a variable JDI. In some embodiments of the invention, the function Jumble rearranges and reorders the individual bytes in variable DI. Next, the encryption/decryption module as shown in block 6030 generates an encrypted command by passing the jumbled device information in variable JDI and an ESTSM Secret Cmd to function FN. The ESTSM Secret Cmd is a command sent from the ESTSM server to the electronic device for a function supported by the electronic device. The function FN returns an encrypted command that is stored in variable ECMD and may be an array of bytes. Next, in block 6040, the encryption/decryption module calls the Encode function that may be the flowchart shown in FIG. 58. The Encode function is passed the variable ECMD containing the encrypted command and encodes the array of bytes as shown in FIG. 58. The encoded array of bytes is stored in a variable EncECMD that is transmitted as a message to the ESTSM server computer system over the communication medium 5625.

Figure 61:
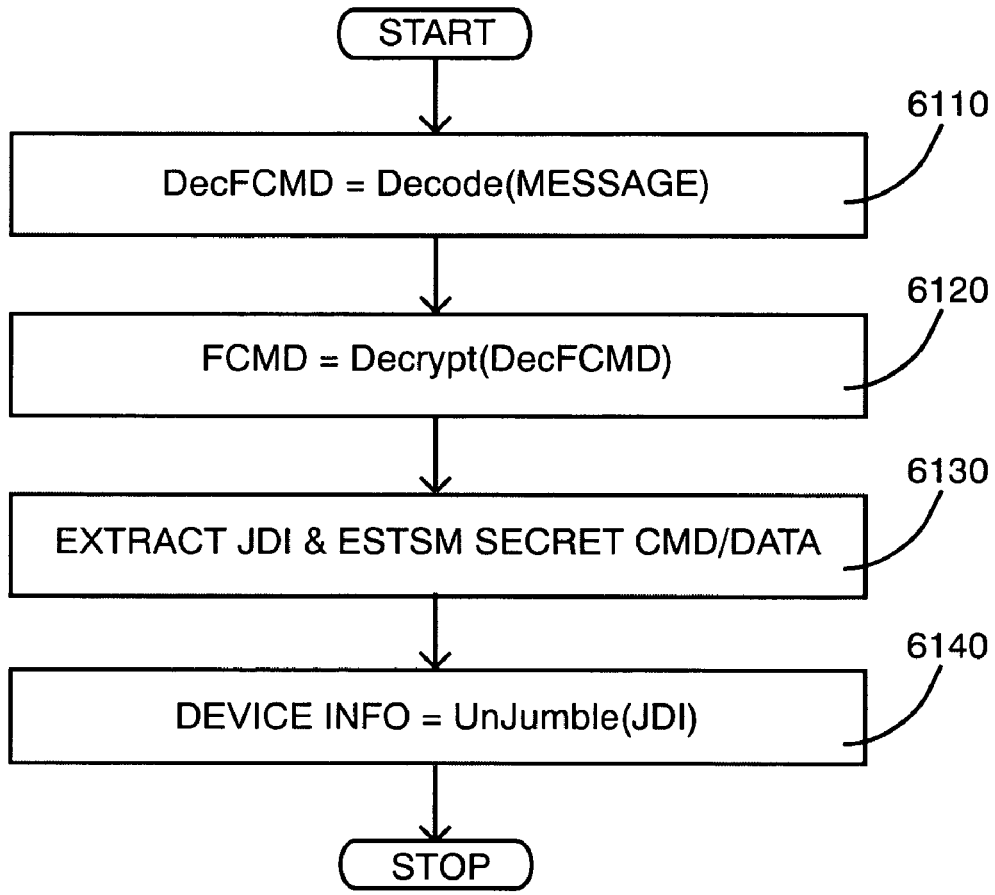
FIG. 61 is a flow diagram showing decoding and decryption of SMS messages in accordance with some embodiments of the invention.

Turning now to FIG. 61, a flow diagram showing decoding and decryption of SMS messages is depicted. A MESSAGE variable that in some embodiments of the invention is variable EncECMD containing the encoded array of bytes is decoded by a Decode function 6110 that may be the flow chart shown in FIG. 59. The decoded array of bytes is stored in a variable DecFCMD that is then passed to a Decrypt function 6120. The Decrypt function returns a decrypted command that is stored in variable FCMD and may be an array of bytes. The jumbled device information is extracted from FCMD and stored in variable JDI 6130. Similarly, the ESTSM Secret Cmd/Data message is extracted from FCMD 6130. The encryption/decryption module passes the jumbled device information in variable JDI to a function UnJumble as shown in block 6140. The device information after being unjumbled is stored in a variable DEVICE INFO that is verified with the unique device information of the electronic device.

Figure 62A:
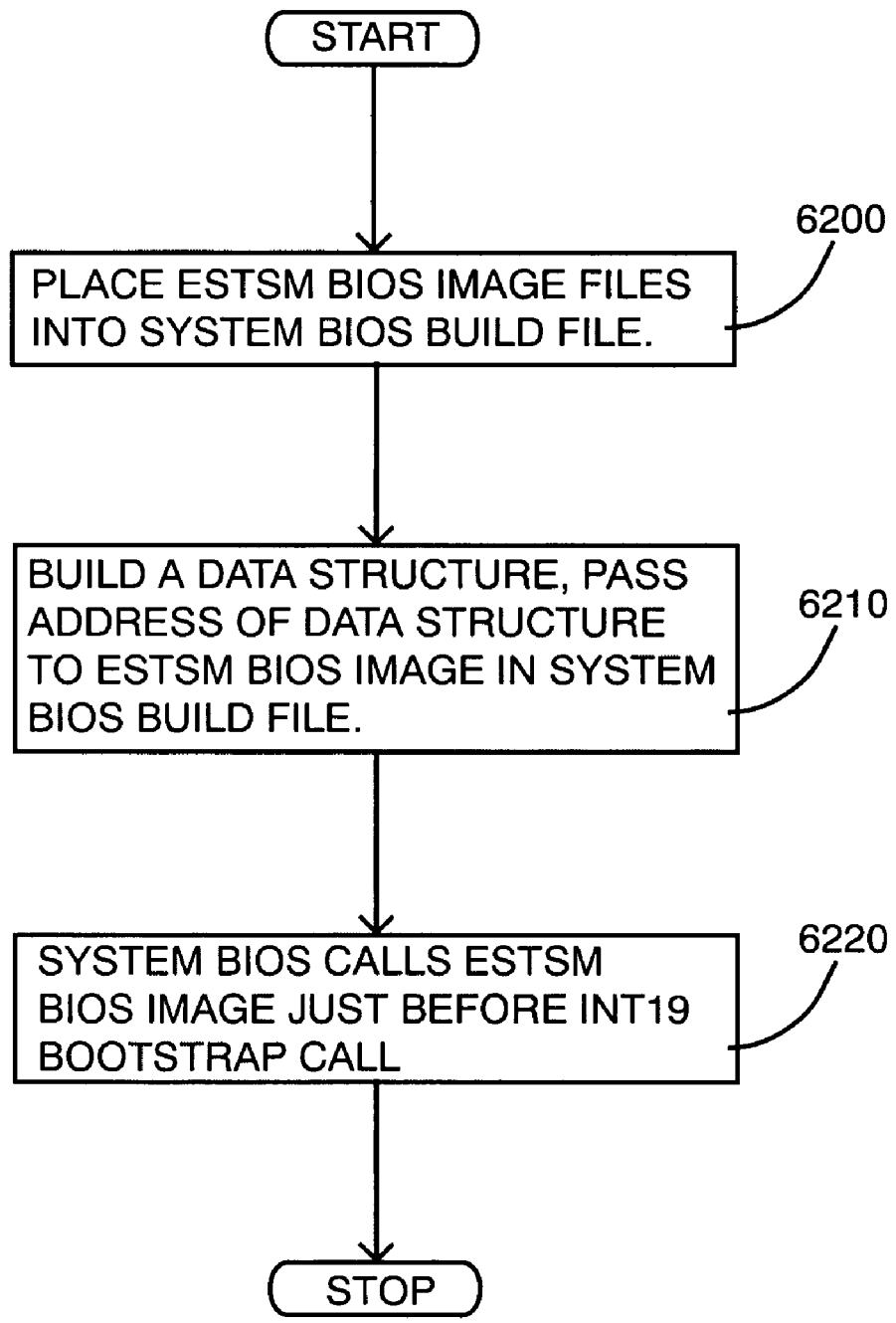
FIG. 62a is a flow diagram showing integration of ESTSM BIOS image files into system BIOS of the electronic device in accordance with one embodiment of the invention.

Implementing ESTSM on an electronic device may necessitate the manufacturer integrating the ESTSM BIOS components including the BIOS ROM images into the system BIOS of the electronic device. In some embodiments, this is the only task that may have to be performed during the system's development phase. The integration of the ESTSM BIOS component needs very little effort. The ESTSM BIOS component is designed to minimize the effort needed to integrate with the existing electronic device BIOS. Factors, such as size of code, complexity of integration, and so forth, have been addressed in the design of the ESTSM BIOS component. In some embodiments of the invention as shown in FIG. 62a, the ESTSM BIOS component is integrated with the existing electronic device BIOS using the technique described below.

1. Place the ESTSM BIOS component image files into a system BIOS build file 6200. In some embodiments, the electronic device BIOS has 16 Kilobytes of free space to integrate the BIOS component image files.
2. Build a data structure including the electronic device's system information, programs to save and restore ESTSM critical information in the Secure Non-volatile Area, and an optional recovery media read function pointer and pass the address of this data structure to an ESTSM BIOS image entry point in the BIOS build file as shown in block 6210. Also ensure that the Random Access Memory (RAM) areas that ESTSM uses are not used by other BIOS functions. After the ESTSM BIOS image files are integrated into the system BIOS build, the system BIOS code builds the data structure as described above. The ESTSM BIOS image may need a pointer to the function in the system BIOS that reads from the recovery media. Since modern day BIOSes support reading from almost all types of recovery media (i.e. floppy diskettes, CD-ROM, USB key, and so forth), no extra code development is required and the address of the read function needs to be placed in the data structure passed to the ESTSM BIOS image. In some alternative embodiments of the invention that do not use recovery media, a pointer to the recovery media read function in system BIOS is not needed. The electronic device system BIOS developer should make sure that the RAM address locations used by ESTSM are not used by the system BIOS.
3. As shown in block 6220, system BIOS needs to call the ESTSM BIOS image entry point just before the INT19 bootstrap call. The system BIOS calls the ESTSM BIOS image entry point before making the INT19 boot strap call. At this point, the ESTSM BIOS image will be invoked and will perform all the checks that enable the secure system environment of ESTSM.

Figure 62B:
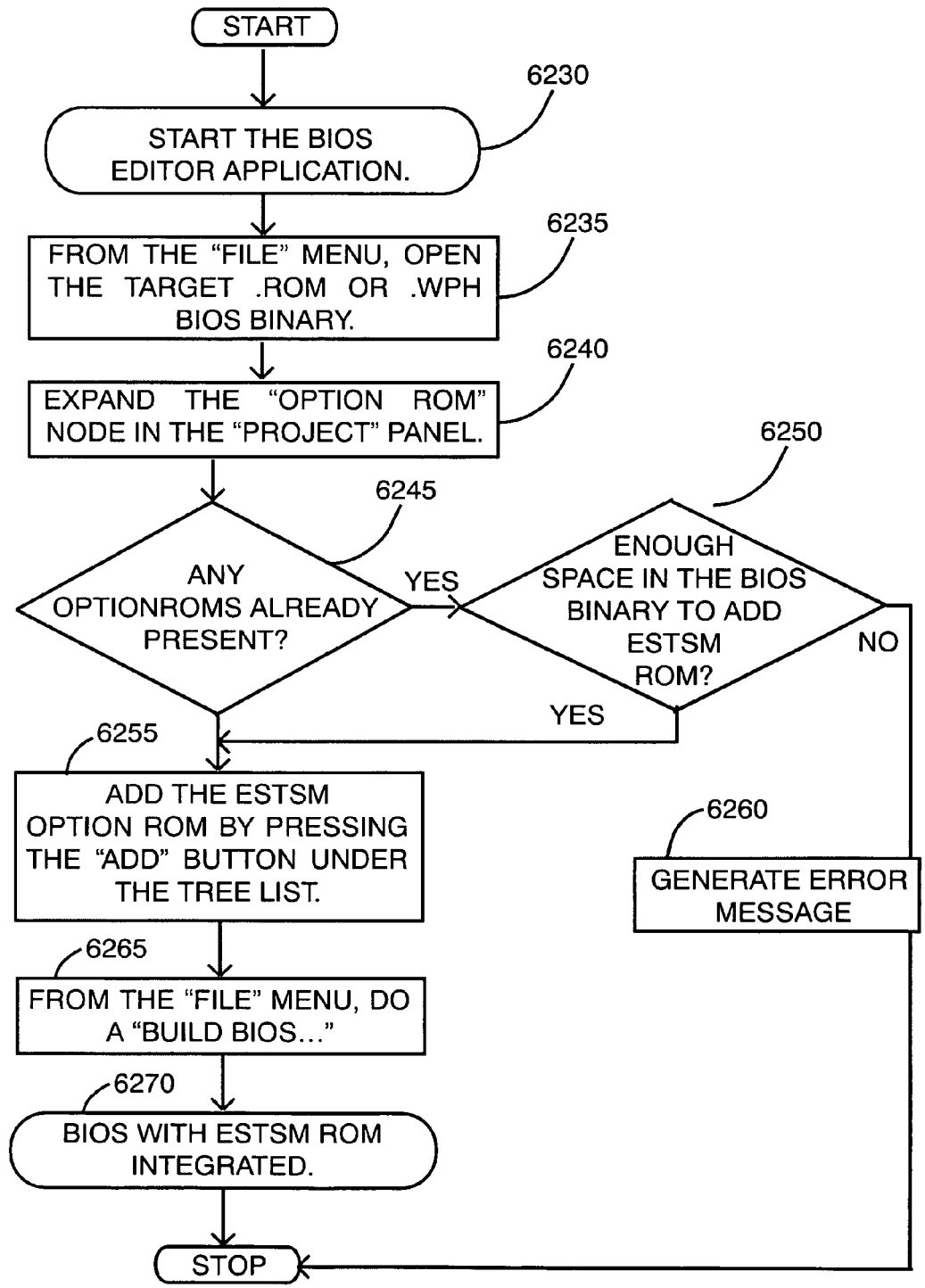
FIG. 62b is a flow diagram showing integration of the ESTSM option ROM into a BIOS binary image.
Figure 63B:
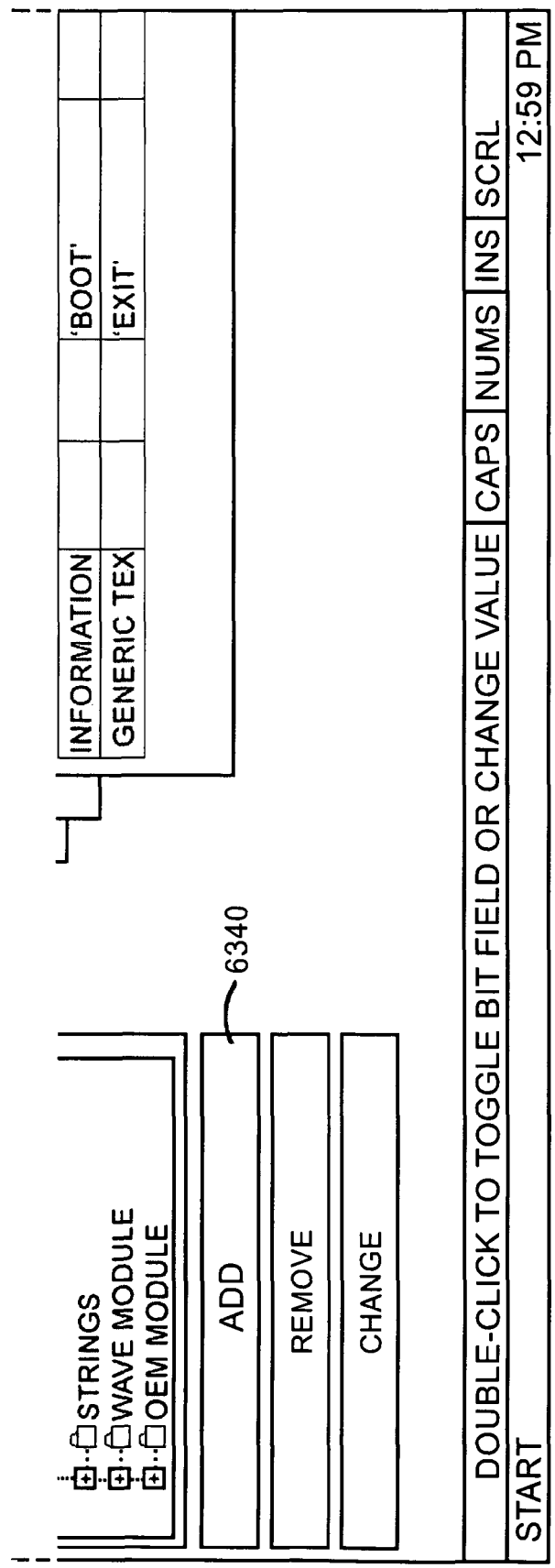
FIG. 63 shows in accordance with another embodiment of the invention integration of ESTSM BIOS image files into electronic device system BIOS using BIOS editor.

FIG. 62b is a flow diagram showing integration of the ESTSM option ROM into a BIOS binary image in accordance with some embodiments of the invention. A BIOS editor application 6300 shown in FIG. 63 is started in block 6230 and the "File" menu option 6315 is selected within the BIOS editor application in block 6235. The target .ROM or .WPH BIOS binary is opened in block 6235. The ESTSM ROM will be placed into the target BIOS binary. An "OPTION ROM" node 6320 in a "PROJECT" panel 6330 may be expanded in block 6240. In block 6245, if option ROMS are present under the "OPTION ROM" node then determine if space is present in the target BIOS binary for the ESTSM ROM in block 6250. If the target BIOS binary does not contain the space for the ESTSM ROM, an error message is generated in block 6260. If the target BIOS binary contains the space needed for the ESTSM ROM or no option ROMS are present in block 6245, then the ESTSM ROM is added to the target BIOS binary in block 6255. In some embodiments of the invention, the ESTSM ROM is added to the target BIOS binary by pressing the "Add" button 6340 shown in FIG. 63. In block 6245, from the "File" menu 6315 "BUILD BIOS" is selected as shown in block 6265. Finally, in block 6270 after the "BUILD BIOS" has been completed, the ESTSM option ROM is present in the target BIOS binary.

Figure 64A:
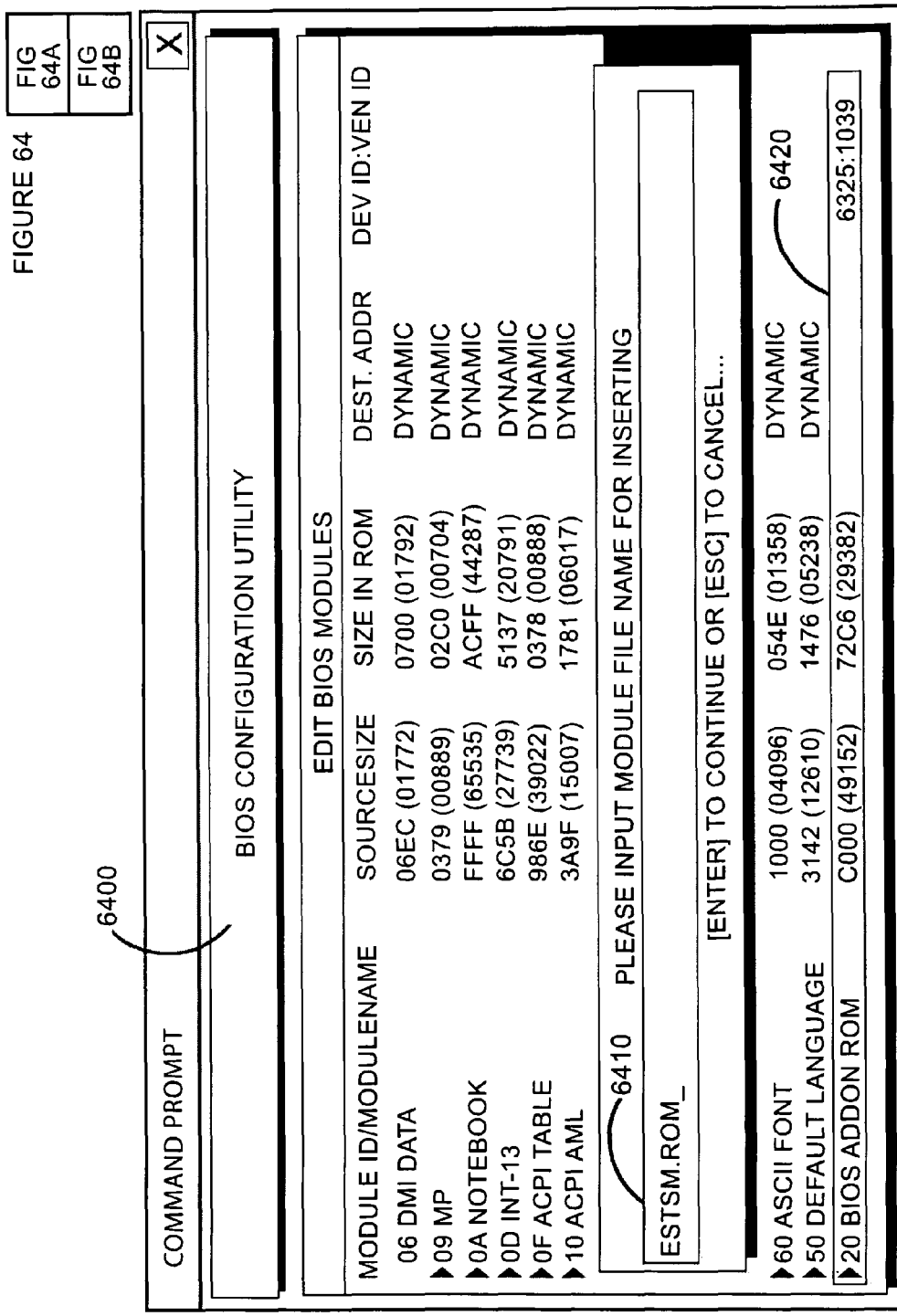
FIG. 64 shows in accordance with another embodiment of the invention integration of ESTSM BIOS image files into electronic device system BIOS using BIOS Configuration utility.
Figure 64B:
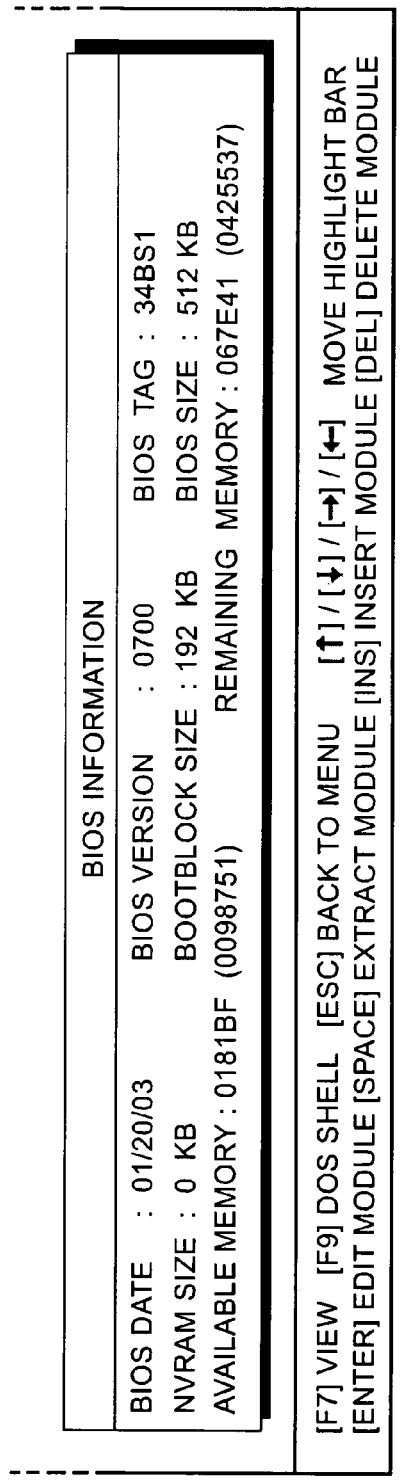

As discussed above, the ESTSM BIOS component is provided to the manufacturer of the electronic device in an encapsulated Option ROM image format that may be ESTSM.ROM as shown in FIGS. 63 and 64. In some embodiments of the invention as shown in FIG. 63, the manufacturer may utilize tools provided by BIOS vendors such as BIOS editors 6300 to merge the encapsulated ROM ESTSM image into the manufacturer's base BIOS image using the Option ROM format 6310. In some other embodiments of the invention as shown in FIG. 64, the manufacturer may use a BIOS Configuration Utility 6400 to insert the encapsulated ROM ESTSM image 6410 into the manufacturer's base BIOS ROM image 6420. In this embodiment, the BIOS calls the ESTSM Option ROM in the same way as it would any other Option ROM image. The ESTSM ROM proceeds in the same manner as it would if it had been integrated into the BIOS using known BIOS integration techniques by checking the system security during INT 19 boot strap call.

Returning now to FIG. 62*a*, maintaining and updating of the electronic device system BIOS is minimized because of the design of the ESTSM BIOS component. When the manufacturer needs to do a system BIOS update for the electronic device, no changes need to be made to the ESTSM BIOS component in the system BIOS. The manufacturer can simply fix the bugs in the BIOS and do a new system BIOS build as shown in FIG. 62*a* (which will include the ESTSM BIOS components) and the new system BIOS will work correctly. The new system BIOS can then be Flash upgraded by the user without any impact to ESTSM operation.

If an update is released for the ESTSM components, the updated versions of the BIOS component image files may be copied into the BIOS build file and a new build performed. Once the new build is complete, the updated system BIOS can be released to the user. No additional coding or maintenance tasks need to be performed to update the ESTSM BIOS components in the system BIOS.

Integration of the ESTSM application component requires no action by the manufacturer of the electronic device. This is because the ESTSM BIOS component restores the application components onto the hard disk drive of the electronic device once the OS is installed on the electronic device. In some other embodiments of the invention, the application component may be installed by the user of the electronic device as described above.

For some embodiments of the invention, creation of the ESTSM hidden partition may be performed immediately after installation of the electronic device's hard disk drive. Various utilities can be used to create the hidden partition. In some embodiments, a scripted installation program including the utility to create the hidden partition may be run at the beginning of the manufacturing process. Typically, this utility should be run just before the FDISK.EXE or some other utility is used to create the OS partition on the hard disk drive.

If the manufacturing process copies a prepared hard disk image directly to a blank hard disk, then the prepared image should be created with the ESTSM hidden partition installed. Thus, when the prepared image is copied to the blank hard disk drive during manufacture, the ESTSM hidden partition will also be copied automatically from the prepared image.

Engineering and electronic device quality assurance test processes may be performed by the manufacturer providing the ESTSM monitoring station with a block of electronic device serial numbers to be used as part of the testing process. The monitoring station will mark these serial numbers as "test" in the ESTSM server computer system and the user will not be billed on the credit card for these systems. This will facilitate the test process at the manufacturer's facilities.

FIGS. 65-70 show screen shots, in accordance with some embodiments of the invention, for registering and using ESTSM in the PDA or mobile phone shown in FIGS. 45 and 50. ESTSM registration as shown in FIG. 65 for a mobile device may be performed using a computer system that can display ESTSM registration web pages. In some other embodiments of the invention, the ESTSM registration pages may be displayed on the mobile device capable of displaying web pages. FIG. 65 shows a service selection screen that may include the cost of each service and the services offered. The services offered and the cost of each service may vary based on the manufacturer and model of the mobile device, the market segment of the mobile device (i.e. business device, home use device) and what the manufacturer has chosen to include for the device. Some manufacturers may want to change the pricing of the services, or offer bundled services to the user. For some embodiments of the invention, as shown below, is a list of the services available to the user.

1. Basic Service—with this service the user has the ability to have the mobile device disabled if it is stolen or lost. The information on the mobile device is made secure so that it cannot be accessed by someone who steals the mobile device or finds the device.
2. Data Recovery Service—this service will recover Contacts, Calendar, and other data such as pictures form the mobile device if the device is stolen or lost. ESTSM may recover this information to the ESTSM server computer system, before performing other service option actions. The user may then restore the data into a new cell phone, Smart Phone or PDA device that they purchase.

In some embodiments of the invention, due to the extendible design of ESTSM, new services can be added for a mobile device such as third party insurance, data destroy service, tracking service, and data encryption service.

In some embodiments of the invention, most of ESTSM services are based on a yearly fee model. Some services such as data recovery may be billed on a per kilobyte basis-that is, the user indicates the number of kilobytes to be recovered during registration and is billed accordingly. However, if the mobile device is stolen and during data recovery more kilobytes are recovered, then a one time fee is charged to the user. The user may be billed at the end of the year to renew the service for one more year. The user may be sent an email before billing to give the user a chance to cancel the service if they wish.

Figure 66:
FIG. 66 shows screen shots of the user registration and information input pages for the ESTSM mobile device such as a Smart Phone.
Figure 67:
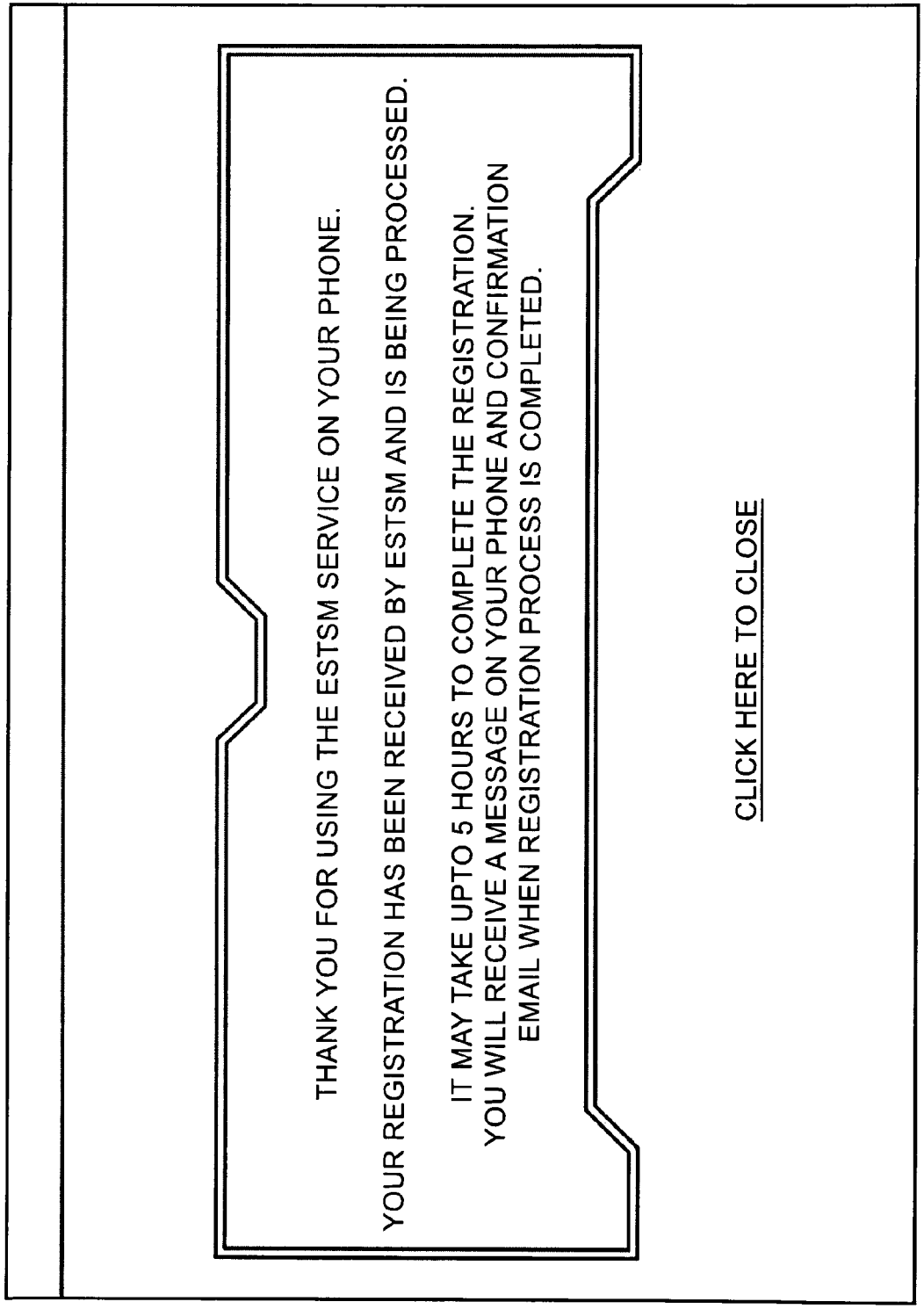
FIG. 67 shows a screen shot from a computer system capable of displaying web pages of a successful registration message for a mobile device.

After the user has selected the ESTSM services for their mobile device, in some embodiments of the invention, the ESTSM system as shown in FIG. 66 may request that the user turn on the cell phone or open the flip cover. In accordance with some embodiments, the user through the computer system capable of displaying ESTSM web pages may then enter the mobile phone number, service provider, International Mobile Equipment Identifier (IMEI) number, and a phone description. The registration process for the mobile device is successfully completed as shown in FIG. 67. In some other embodiments of the invention, ESTSM registration may not require any user intervention with the mobile device except an acknowledgement from the user at the end of the successful registration.

In some embodiments of the invention, an automated voice prompting system at a call center or live call center operator after authentication of the user may communicate with the user to perform ESTSM activities. All ESTSM activities performed through the Internet may also be performed by the call center including registration, reporting a system stolen, reporting system has been recovered and so forth.

Figure 68:
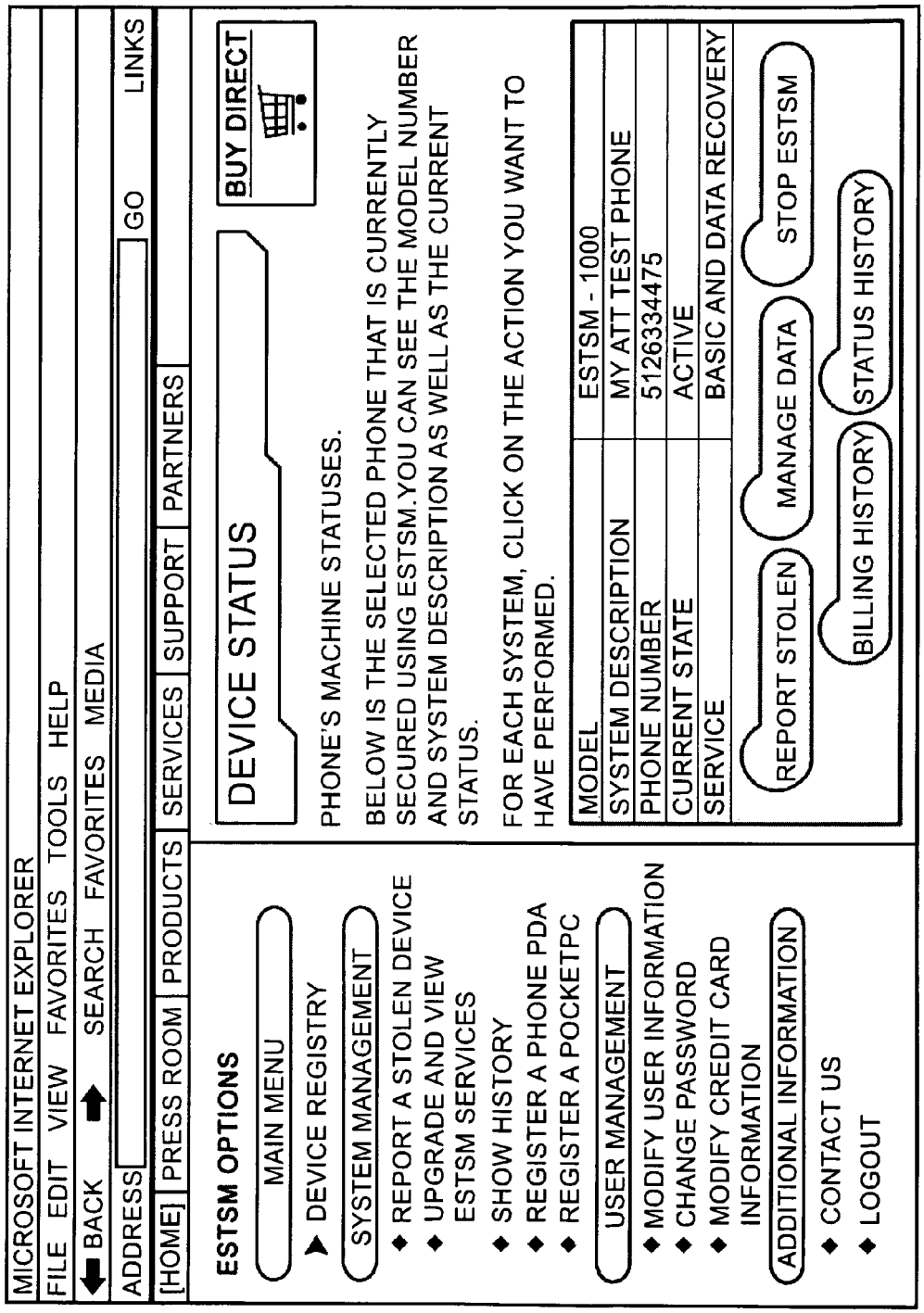
FIG. 68 shows a screen shot of the mobile device status web page that resides in the ESTSM server computer system in accordance with some embodiments of the invention.

FIG. 68 shows a screen shot of the mobile device status web page that resides in the ESTSM server computer system in accordance with some embodiments of the invention. The user can perform the following tasks for the mobile device on the device status web page: (1) View the status of the mobile device running ESTSM; (2) Report a mobile device stolen; (3) Show the Billing and Electronic Device Location/Status Logs; (4) Perform User Management functions such as changing the user information, password and billing information; and (5) Perform Data Management functions such as viewing recovered data and transferring recovered data to another device.

As shown in FIG. 68, the "Device Status" page shows for each mobile device, the Model Name, System Description, Phone Number, Current State, and ESTSM Services Active on the device. Depending on the Current State and the services selected by the user, certain task buttons will appear below the mobile device information. These task buttons let you perform different operations on the device (e.g. report the mobile device stolen and so forth). As shown in FIG. 68, the user may click on the button labeled "Report Stolen" to start the process of reporting a mobile device stolen. The user will be taken to the "Report a Stolen Device" web pages. The user fills out the information on the web page to generate a theft incident report and the ESTSM site will log this report so that it may be given later to the appropriate authorities as proof of filing the theft incident report. This documentation may be provided to the user upon request.

Figure 69:
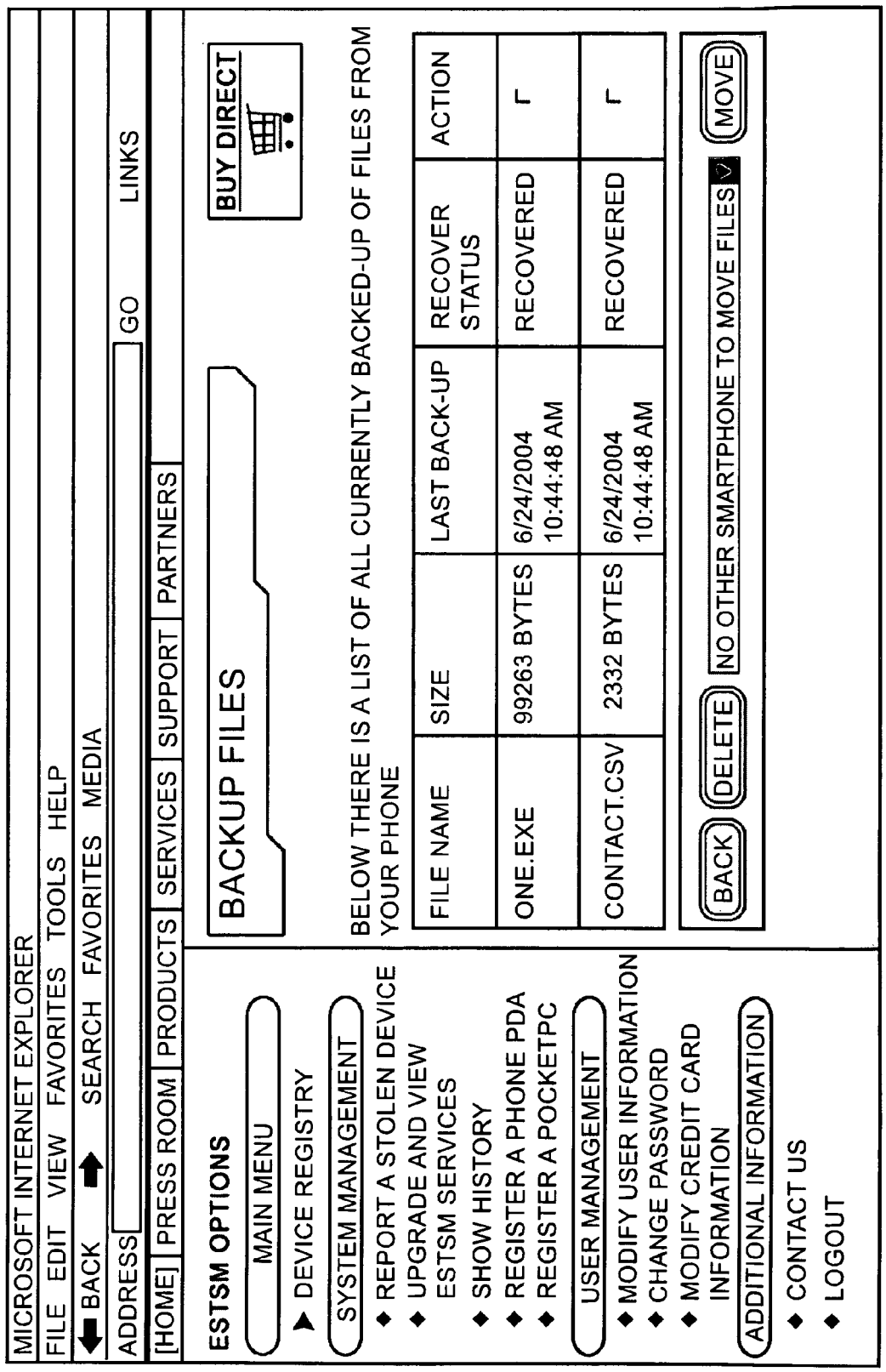
FIG. 69 shows a screen shot of the backup files web page for a mobile device that resides in the ESTSM server computer system in accordance with some embodiments of the invention.

In some embodiments of the invention, once the report is completed, the electronic device will be placed into the REPORTED STOLEN state. At this point, because of the always on connection of the mobile device to the Internet, in some embodiments the mobile device files are backed up and the device state will change to RECOVERED state as shown in FIG. 69. The user may then manage these files to move them into a new cell phone, Smart Phone or PDA device that they purchase. After the data has been recovered, the ESTSM system informs the user that the mobile device is disabled as shown in FIG. 70.

Figure 71:
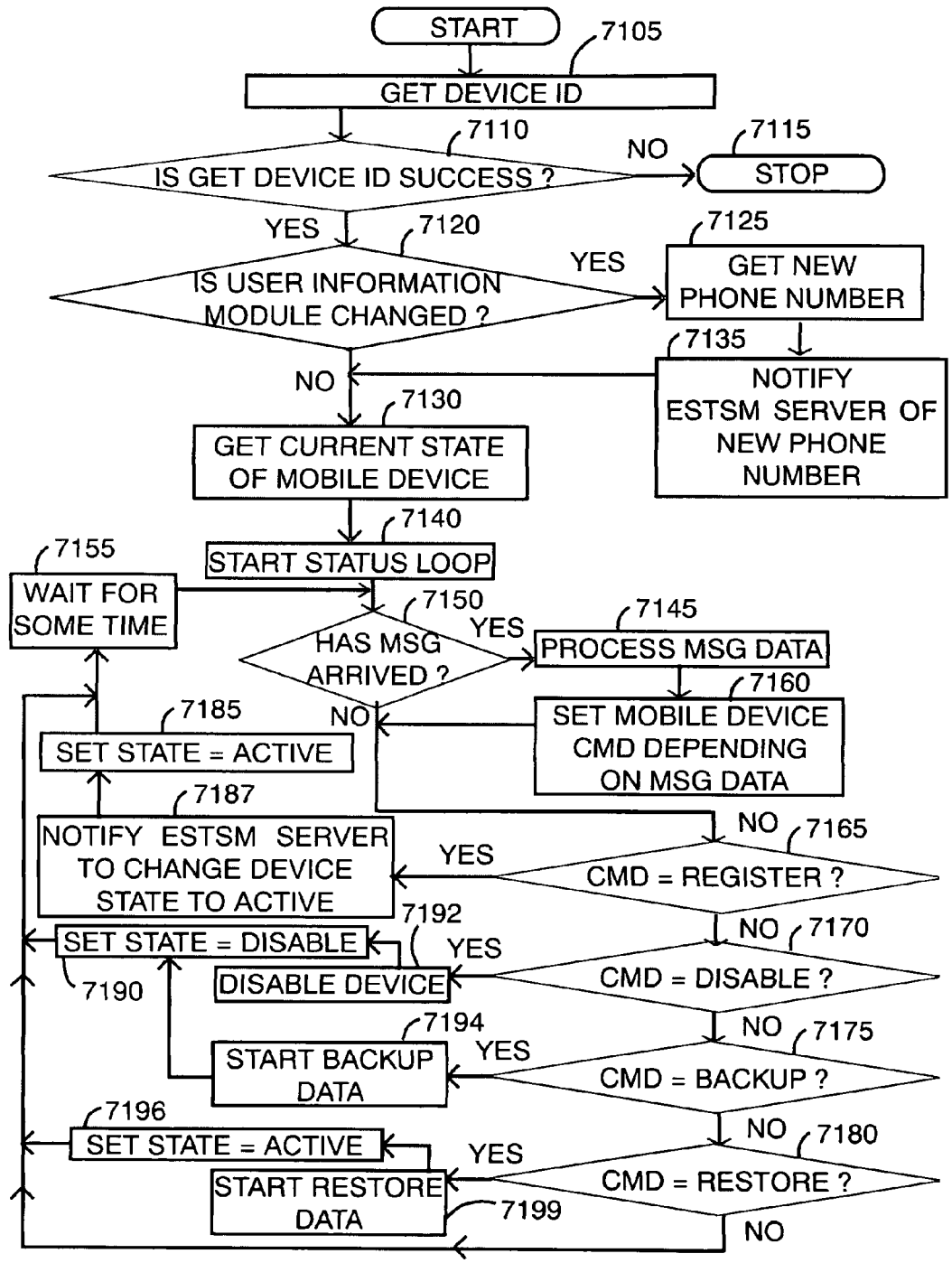
FIG. 71 is a flow diagram showing implementation of ESTSM on mobile devices.

Turning now to FIG. 71, a flow diagram showing implementation of ESTSM on mobile devices such as cellular telephones, Smart Phones, or WLAN capable computers as in FIG. 45 and FIG. 48 that have a messaging capability that may be Short Messaging Service (SMS) is depicted. In some embodiments of the invention, as described above, the ESTSM server computer system may inform the mobile device that it has been reported stolen and backup the data on the device. In some other embodiments of the invention, the ESTSM server may periodically backup the data on the device even if the mobile device has not been reported stolen. The ESTSM server may disable the mobile device (i.e. lock the user out but device can still communicate with ESTSM server) if the Subscriber Identity Module (SIM) card has been changed and the mobile device is reported stolen. The ESTSM server may also disable the mobile device if the IMEI number has been changed and the device is reported stolen.

As shown in FIG. 71, the ESTSM application component located in the system area of the mobile device (FIG. 45) gets the device identifier of the mobile device in block 7105. In some embodiments of the invention, the device identifier is a concatenated string of numbers that may include the IMEI number, manufacturer's model number of the mobile device, and the phone number associated with the mobile device. If the application component is not able to get the device identifier in block 7110, then the application component disables the mobile device 7115. If the application component is able to successfully get the device identifier, then the application component determines if the user information module has been changed in block 7120. In some embodiments of the invention, the user information module may be a SIM card located in the mobile device. In some other embodiments of the invention, the user information module may be stored on a Read-Only-Memory (ROM) that is a FLASH ROM or Electronically-Erasable-Programmable ROM (EEPROM) of the mobile device. The user information module identifies user information with the mobile device. The user information may be the phone number associated with the mobile device, user details, security information, and memory for a personal directory of numbers. If the user information module has been changed in the mobile device, the ESTSM application component gets the new phone number from the mobile device 7125. The application component in block 7135 notifies the ESTSM server of the new phone number. Next, in block 7130, the ESTSM application component determines the current state of the mobile device and begins the status loop 7140, waiting for a message from the ESTSM server. An encrypted and encoded message as described above may be communicated from the ESTSM server to the application component of the mobile device as shown in block 7150.

In FIG. 71, if the application component detects that a new message has arrived, message data is processed in block 7145. A command is extracted from the message data in block 7160 as described above and is stored into the variable Cmd. If the Cmd is "REGISTER" as shown in block 7165, then the user has registered the mobile device for ESTSM services. The ESTSM server is notified to change the mobile device state to "ACTIVE" in block 7187 and the application component sets the current state to "ACTIVE" in block 7185. If the Cmd is "DISABLE" as shown in block 7170, the mobile device is disabled 7192 and the application component sets the current state to "DISABLE" in block 7190. The ESTSM server may send a "DISABLE" command 7170 if the mobile device is reported stolen or the user information module that may be a SIM card has been changed and the device identifier has not changed in the mobile device. If the Cmd is "BACKUP" as shown in block 7175, the ESTSM server requests that the data on the mobile device be copied to the ESTSM server. As shown in block 7194, the ESTSM server begins to backup the data stored on the mobile device. The ESTSM server will recover the data requested by the user during registration for the mobile device. Thus, if during ESTSM registration the user had selected recovery of contacts and calendar data, these items will be backed-up. In some embodiments of the invention, the user may specify other data for recovery such as Mobile Commerce (M-commerce) monetary information stored on the mobile device. The ESTSM server in some embodiments of the invention may request that the mobile device be placed into a disabled state and, thus, the application component in the mobile device sets the current state to "DISABLE" in block 7190. If the Cmd is "RESTORE" as shown in block 7180, the ESTSM server starts to restore the data 7199 backed up from the mobile device back to the original mobile device that may have been recovered or a new mobile device. After restoring the data to the mobile device, the ESTSM server places the mobile device into an active state. The application component in the mobile device sets the current state to "ACTIVE" in block 7196 and waits for some time 7155 before starting the status loop 7140.

Turning now to FIG. 72, the states and transitions of a mobile device with SMS messages for activation and operation of ESTSM services is shown. A mobile device as shown in FIG. 45 including the ESTSM application component is initially in an "UNREGISTERED" state 7205. After completion of the registration process, the ESTSM server sends a SMS message to the mobile device indicating that the device is registered with ESTSM and placing the mobile device into an "ACTIVATION PENDING" state 7210. The mobile device sends a SMS confirmation message to the ESTSM server and transitions into an "ACTIVE" state 7215. In some embodiments of the invention as shown in FIG. 72, the ESTSM server performs periodic backups of the data on the mobile device while in the "ACTIVE" state 7215. While in the active state, the ESTSM server computer system communicates over the Internet with the user to determine if the mobile device has been reported stolen. If the device is reported stolen using the ESTSM website, the mobile device is placed into a "REPORTED STOLEN" state 7225. The ESTSM server informs the mobile device via a secure communications channel to take the appropriate action based on the service options selected by the user (e.g. disabling the electronic device, destroying the storage device (e.g. hard disk drive (HDD)) data, recovering data, encrypting data and more). In some embodiments of the invention as shown in FIG. 72, if the user during registration had selected the basic service, the mobile device is disabled and placed into a "DISABLE" state 7230. If the mobile device has been recovered or the user has purchased a new mobile device and the user re-enables the device using the ESTSM website, an SMS message is sent from the server to the mobile device placing the device into an "ENABLE PENDING" state 7220. The mobile device sends an SMS confirmation message to the ESTSM server indicating that it has received the re-enablement SMS message from the ESTSM server. The mobile device is placed into the "ACTIVE" state 7215.

If the user during registration had selected the data recovery service, the mobile device is placed into "BACKUP IN PROGRESS" state 7235 and data on the mobile device is backed-up to the ESTSM server. If the data is backed up successfully, the mobile device is placed into "DISABLED DATA BACKUP" state 7240, data on the device is deleted, and the mobile device is disabled. The mobile device may be transitioned to "ENABLE AFTER RECOVERY" state 7245 from either the "BACKUP IN PROGRESS" state 7235 or "DISABLED DATA BACKUP" state 7240 if the user re-enables the mobile device while the data backup is in progress. Once the mobile device has been recovered or the user has purchased a new mobile device and the user re-enables the device using the ESTSM website, an SMS message is sent from the server to the mobile device placing the device into an "ENABLE AFTER RECOVERY" state 7245. The mobile device sends an SMS confirmation message to the ESTSM server indicating that it has received the re-enablement SMS message from the ESTSM server. The mobile device is activated and placed into the "ACTIVE DATA BACKUP" state 7250. The data that has been backed-up into the ESTSM server is restored into the new or re-enabled mobile device in the "RESTORE IN PROGRESS" state 7260. After data has been restored into the mobile device, the device is placed into the "ACTIVE" state 7215.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method for securing and disabling an electronic device, comprising:
in an electronic device, automatically determining whether a hidden partition in the electronic device is valid, wherein the electronic device comprises a disk drive, wherein the disk drive comprises the hidden partition and an application component associated with tracking and locating the electronic device, and wherein the hidden partition comprises a non-viewable component associated with tracking and locating the electronic device;
in response to a determination that the hidden partition is valid, automatically loading the non-viewable component and transferring control to the non-viewable component; and
performing, with the non-viewable component, operations comprising:
automatically determining whether the application component operated correctly during last power-up of the electronic device;
in response to a determination that the application component did not operate correctly during last power-up of the electronic device, automatically restoring the application component from a backup fileset; and
automatically placing the electronic device under control of power on self test (POST) to proceed with powering-up the electronic device in response to a determination that the application component operated correctly during last power-up of the electronic device.

2. The method of claim 1, further comprising:
generating an application component failure if an effort is made to prevent operation of the application component.

3. The method of claim 2, wherein the effort includes an effort to delete a portion of the application component.

4. The method of claim 2, wherein the effort includes an effort to bypass operation of the application component.

5. The method of claim 1, further comprising:
automatically prompting that the electronic device will be disabled within a number of device power-ups unless corrective action is taken, in response to a determination that the application component did not operate correctly during last power-up of the electronic device;
automatically disabling the electronic device in response to a determination that the number of device power-ups has been reached; and
automatically prompting for an activation password in response to a determination that the number of device power-ups has been reached.

6. The method of claim 5, wherein the number of device power-ups is five.

7. The method of claim 1, wherein powering-up the electronic device includes allowing the electronic device to boot an operating system.

8. An apparatus comprising:
a non-transitory machine-readable storage medium; and
instructions stored in the non-transitory machine-readable storage medium, which when executed by a machine, cause the machine to perform operations comprising:
automatically determining whether a hidden partition in the electronic device is valid, wherein the electronic device comprises a disk drive, wherein the disk drive comprises the hidden partition and an application component associated with tracking and locating the electronic device, and wherein the hidden partition comprises a non-viewable component associated with tracking and locating the electronic device;

in response to a determination that the hidden partition is valid, automatically loading the non-viewable component and transferring control to the non-viewable component; and performing, with the non-viewable component, operations comprising:
- automatically determining whether the application component operated correctly during last power-up of the electronic device;
- in response to a determination that the application component did not operate correctly during last power-up of the electronic device, automatically restoring the application component from a backup fileset; and
- automatically placing the electronic device under control of power on self test (POST) to proceed with powering-up the electronic device in response to a determination that the application component operated correctly during last power-up of the electronic device.

9. The apparatus of claim 8, wherein the operations comprise:
generating an application component failure if an effort is made to prevent operation of the application component.

10. The apparatus of claim 9, wherein the effort includes an effort to delete a portion of the application component.

11. The apparatus of claim 9, wherein the effort includes an effort to bypass operation of the application component.

12. The apparatus of claim 8, wherein the operations comprise:
- automatically prompting that the electronic device will be disabled within a number of device power-ups unless corrective action is taken, in response to a determination that the application component did not operate correctly during last power-up of the electronic device;
- automatically disabling the electronic device in response to a determination that the number of device power-ups has been reached; and
- automatically prompting for an activation password in response to a determination that the number of device power-ups has been reached.

13. The apparatus of claim 12, wherein the number of device power-ups is five.

14. The apparatus of claim 8, wherein powering-up the electronic device includes allowing the electronic device to boot an operating system.

15. A method for securing an electronic device, comprising:
in an electronic device, automatically determining whether a hidden partition in the electronic device is valid, wherein the electronic device comprises a disk drive and a basic input/output system (BIOS) component associated with tracking and locating the electronic device, wherein the disk drive comprises the hidden partition and an application component associated with tracking and locating the electronic device, and wherein the hidden partition comprises a non-viewable component associated with tracking and locating the electronic device;

in response to a determination that the hidden partition is valid, automatically loading the BIOS component and transferring control to the BIOS component; and performing, with the BIOS component, operations comprising:
- automatically determining whether the application component operated correctly during last power-up of the electronic device;
- in response to a determination that the application component did not operate correctly during last power-up of the electronic device, automatically restoring the application component from a backup fileset; and
- automatically placing the electronic device under control of power on self test (POST) to proceed with powering-up the device in response to a determination that the application component operated correctly during last power-up of the electronic device.

16. The method of claim 15, further comprising:
generating an application component failure if an effort is made to prevent operation of the application component.

17. The method of claim 15, further comprising:
- automatically prompting that the electronic device will be disabled within a number of device power-ups unless corrective action is taken, in response to a determination that the application component did not operate correctly during last power-up of the electronic device;
- automatically disabling the electronic device in response to a determination that the number of device power-ups has been reached; and
- automatically prompting for an activation password in response to a determination that the number of device power-ups has been reached.

18. The method of claim 15, wherein powering-up the electronic device includes allowing the electronic device to boot an operating system.

19. The method of claim 16, wherein the effort includes an effort to delete a portion of the application component.

20. The method of claim 16, wherein the effort includes an effort to bypass operation of the application component.

* * * * *